(12) United States Patent
Dinn

(10) Patent No.: US 9,697,264 B2
(45) Date of Patent: *Jul. 4, 2017

(54) PROCESS AND APPARATUS FOR SELECTING AN ITEM FROM A DATABASE

(75) Inventor: Kevin W. Dinn, St Ives (AU)

(73) Assignee: Kannuu Pty. Ltd., Mount Kuring-Gai, New South Wales (AU)

( * ) Notice: Subject to any disclaimer, the term of this patent is extended or adjusted under 35 U.S.C. 154(b) by 760 days.

This patent is subject to a terminal disclaimer.

(21) Appl. No.: 12/448,601

(22) PCT Filed: Dec. 28, 2007

(86) PCT No.: PCT/AU2007/002010
§ 371 (c)(1),
(2), (4) Date: Feb. 22, 2010

(87) PCT Pub. No.: WO2008/080192
PCT Pub. Date: Jul. 10, 2008

(65) Prior Publication Data
US 2010/0153881 A1 Jun. 17, 2010

Related U.S. Application Data

(60) Provisional application No. 60/878,083, filed on Jan. 3, 2007, provisional application No. 60/960,345, filed on Sep. 26, 2007.

(51) Int. Cl.
G06F 17/30 (2006.01)
G06F 3/023 (2006.01)
H04M 1/2745 (2006.01)

(52) U.S. Cl.
CPC ...... *G06F 17/30572* (2013.01); *G06F 3/0237* (2013.01); *H04M 1/274558* (2013.01)

(58) Field of Classification Search
CPC ............ G06F 3/0237; G06F 17/30572; H04M 1/274558
(Continued)

(56) References Cited

U.S. PATENT DOCUMENTS 3,937,939 A 2/1976 Frenkel
5,128,672 A 7/1992 Kaehler
(Continued)

FOREIGN PATENT DOCUMENTS

CN 1199302 11/1998
DE 3123596 6/1981
(Continued)

OTHER PUBLICATIONS

International Search Report dated Feb. 6, 2008 from corresponding International Application No. PCT/AU2007/002010.
(Continued)

*Primary Examiner* — Aaron Lowenberger
(74) *Attorney, Agent, or Firm* — Jones Day

(57) ABSTRACT

A method and apparatus for selecting items from a collection of items are indexed by a list of item identifiers. The item identifiers may be in the form of text, symbols, graphics, etc. An initial display is generated which includes on or more parts of the item identifiers. Selection of the one or more parts may be made and results in the generation of a display of further one or more parts for selection. The further one or more parts may be selected in order to the selected on or more parts to build a larger part or whole of an item identifier. Accordingly, selection from a large list of item identifiers may be carried out in a relatively short time period.

18 Claims, 35 Drawing Sheets

(58) Field of Classification Search
USPC .................................................. 715/816, 825
See application file for complete search history.

(56) References Cited

U.S. PATENT DOCUMENTS

| | | | |
|---|---|---|---|
| 5,263,174 A | 11/1993 | Layman | |
| 5,299,125 A | 3/1994 | Baker et al. | |
| 5,398,023 A | 3/1995 | Murray | |
| 5,496,992 A | 3/1996 | Madan et al. | |
| 5,633,912 A | 5/1997 | Tsoi | |
| 5,724,069 A | 3/1998 | Chen | |
| 5,754,655 A | 5/1998 | Hughes et al. | |
| 5,787,417 A | 7/1998 | Hargrove | |
| 5,797,098 A | 8/1998 | Schroeder et al. | |
| 5,867,799 A | 2/1999 | Lang et al. | |
| 5,894,276 A | 4/1999 | Altidor et al. | |
| 5,896,321 A | 4/1999 | Miller et al. | |
| 5,901,222 A | 5/1999 | Macor | |
| 5,911,485 A | 6/1999 | Rossmann | |
| 5,953,541 A | 9/1999 | King et al. | |
| 5,983,214 A | 11/1999 | Lang et al. | |
| 6,009,444 A | 12/1999 | Chen | |
| 6,011,554 A | 1/2000 | King et al. | |
| 6,032,053 A | 2/2000 | Schroeder et al. | |
| 6,047,196 A | 4/2000 | Makela et al. | |
| 6,055,439 A | 4/2000 | Helin et al. | |
| 6,150,962 A | 11/2000 | Rossmann | |
| 6,223,059 B1 | 4/2001 | Haestrup | |
| 6,247,043 B1 | 6/2001 | Bates et al. | |
| 6,264,146 B1 | 7/2001 | Hill et al. | |
| 6,311,125 B1 | 10/2001 | Okano et al. | |
| 6,377,965 B1 | 4/2002 | Hachamovitch et al. | |
| 6,580,932 B1 | 6/2003 | Finke-Anlauff | |
| 6,744,423 B2 | 6/2004 | Kraft et al. | |
| 6,748,242 B1 | 6/2004 | Dunleavy | |
| 6,792,287 B1 | 9/2004 | Tuomela et al. | |
| 6,801,659 B1* | 10/2004 | O'Dell | 382/185 |
| 6,826,566 B2 | 11/2004 | Lewak et al. | |
| 7,185,286 B2 | 2/2007 | Zondervan et al. | |
| 7,443,316 B2 | 10/2008 | Lim | |
| 7,487,147 B2 | 2/2009 | Bates et al. | |
| 7,543,244 B2 | 6/2009 | Matthews et al. | |
| 7,616,191 B2 | 11/2009 | Matta | |
| 7,669,111 B1 | 2/2010 | Krause et al. | |
| 7,793,228 B2 | 9/2010 | Mansfield et al. | |
| 7,836,044 B2 | 11/2010 | Kamvar et al. | |
| 7,886,233 B2 | 2/2011 | Rainisto et al. | |
| 2001/0012769 A1 | 8/2001 | Sirola et al. | |
| 2001/0018351 A1 | 8/2001 | Hino et al. | |
| 2002/0049795 A1 | 4/2002 | Freeman | |
| 2002/0061770 A1 | 5/2002 | Ozaki | |
| 2002/0091690 A1 | 7/2002 | Bailey et al. | |
| 2002/0151327 A1 | 10/2002 | Levitt | |
| 2002/0183099 A1 | 12/2002 | Lee | |
| 2003/0073414 A1 | 4/2003 | Capps | |
| 2003/0078069 A1 | 4/2003 | Lindeman | |
| 2003/0095102 A1* | 5/2003 | Kraft et al. | 345/168 |
| 2003/0129570 A1* | 7/2003 | Alabaster | 434/127 |
| 2003/0182274 A1 | 9/2003 | Oh | |
| 2004/0105714 A1 | 6/2004 | Eo | |
| 2004/0125073 A1 | 7/2004 | Potter et al. | |
| 2004/0163032 A1 | 8/2004 | Guo et al. | |
| 2004/0192276 A1 | 9/2004 | Wesby | |
| 2004/0227732 A1* | 11/2004 | Kemppinen | 345/161 |
| 2005/0010605 A1 | 1/2005 | Conrad et al. | |
| 2005/0043063 A1* | 2/2005 | Dinn | 455/566 |
| 2005/0188330 A1 | 8/2005 | Griffin | |
| 2005/0233769 A1 | 10/2005 | Tanaka et al. | |
| 2006/0009861 A1 | 1/2006 | Bonasia et al. | |
| 2006/0031591 A1 | 2/2006 | Hollstrom et al. | |
| 2006/0146028 A1 | 7/2006 | Chang et al. | |
| 2006/0164382 A1* | 7/2006 | Kulas et al. | 345/156 |
| 2006/0217953 A1 | 9/2006 | Parikh | |
| 2006/0221058 A1 | 10/2006 | Fux et al. | |
| 2006/0265648 A1 | 11/2006 | Rainisto et al. | |
| 2006/0265668 A1 | 11/2006 | Rainisto | |
| 2006/0294462 A1 | 12/2006 | Blair et al. | |
| 2007/0016862 A1 | 1/2007 | Kuzmin | |
| 2007/0060114 A1 | 3/2007 | Ramer et al. | |
| 2007/0089070 A1 | 4/2007 | Jaczyk | |
| 2007/0179776 A1 | 8/2007 | Segond et al. | |
| 2008/0059915 A1* | 3/2008 | Boillot | 715/863 |
| 2008/0235621 A1* | 9/2008 | Boillot | 715/810 |
| 2009/0327888 A1 | 12/2009 | Woolf et al. | |
| 2010/0010963 A1 | 1/2010 | Dinn | |

FOREIGN PATENT DOCUMENTS

| | | |
|---|---|---|
| DE | 10019727 | 10/2001 |
| EP | 624965 | 11/1994 |
| EP | 789224 | 8/1997 |
| EP | 1022644 | 7/2000 |
| FR | 2751442 | 1/1998 |
| GB | 2317531 | 3/1998 |
| GB | 2357220 | 6/2001 |
| GB | 2363290 | 12/2001 |
| JP | 09-083402 | 7/1995 |
| JP | 407240776 | 9/1995 |
| JP | 10293640 | 11/1998 |
| JP | 2000267787 | 9/2000 |
| JP | 2002149345 | 5/2002 |
| JP | 2005-159250 | 7/2005 |
| NL | 1011027 | 9/2000 |
| WO | 00/49731 | 8/2000 |
| WO | 00/59181 | 10/2000 |
| WO | 01/05047 | 1/2001 |
| WO | 01/67725 | 9/2001 |
| WO | 02/08876 | 1/2002 |
| WO | 02/13001 | 2/2002 |
| WO | 02/39244 | 5/2002 |
| WO | WO 02/069240 | 9/2002 |
| WO | 02/093338 | 11/2002 |
| WO | 03021418 | 3/2003 |
| WO | 03/077102 | 9/2003 |
| WO | 2004/017188 | 2/2004 |
| WO | WO 2005/064445 | 7/2005 |
| WO | WO 2006/100505 | 9/2006 |
| WO | WO 2007/019610 | 2/2007 |
| WO | 2008/080192 | 7/2008 |
| WO | 2008/106729 | 9/2008 |

OTHER PUBLICATIONS

European Search Report dated Dec. 1, 2006 for PCT/AU2002/01114.
International Search Report dated Apr. 8, 2008 from International Application No. PCT/AU2008/000297.
Office Action dated Sep. 27, 2011 for Japanese Application No. 2008-525341 with English Translation.
International Search Report dated Oct. 25, 2002 from International Application No. PCT/AU2002/001154.
International Search Report dated Aug. 29, 2006 from International Application No. PCT/AU2006/001151.
International Search Report dated Oct. 16, 2002 from International Application No. PCT/AU2002/01114.
"It's a Nokia . . . Game Boy Advance?", Jorgen Sundgot, InfoSyncWorld, Oct. 11, 2001 <http://www.infosyncworld.com/news/n/986.html>.
"iTAP" Predictive Text Input Technology Technical Paper Lexicus, A Division of Motorola, Version 1.0, Jun. 26, 2002, pp. 1-11. Retrieved from the Internet on Aug. 28, 2006 at URL: http://www.toptrend.com.tw/library/produce%20line/Lexicus/iTAP/iTAP%20Technical%20Paper%20for%20ESC.pdf.
"New Nokia 5510 is Entertainment Phone", Ana Leticia Sigvartsen, InfoSatellite.com, Oct. 11, 2001, <http://www.infosatellite.com/news/2001/10/a111001nokia_5510.htm>.
"Nokia 5510 User's Guide", Copyright 2001-2002, Selected Pages. Available at <http://nds1.nokia.com/phones/files/guides/5510_usersguide_en.pdf>.
Examination Report dated Apr. 11, 2008 from Australian Application No. 2002331407.

(56) References Cited

OTHER PUBLICATIONS

First Office Action dated Mar. 10, 2006 for Chinese Patent Application No. 02825059.1.
Supplemental Search Report dated Dec. 1, 2006 for European Patent Application No. 02766922.5.
Examination Report dated Nov. 15, 2010 for European Patent Application No. 02766922.5.
Examination Report dated Feb. 17, 2010 for European Patent Application No. 02766922.5.
Examination Report dated Oct. 17, 2007 for European Patent Application No. 02766922.5.
Examination Report dated May 22, 2007 for European Patent Application No. 02766922.5.
Supplemental Search Report dated Feb. 19, 2007 for European Patent Application No. 02766922.5.
Supplemental Search Report dated Mar. 2, 2011 for European Patent Application No. 08714345.
First Office Action dated Feb. 2, 2010 for Chinese Patent Application No. 200710153468.4.
Examination Report dated Jun. 22, 2011 for Australian Patent Application No. 2010200095.
Examination Report dated Sep. 29, 2009 for New Zealand Patent Application No. 566172.
Examination Report dated Apr. 12, 2011 for New Zealand Patent Application No. 566172.
First Office Action dated Jun. 26, 2009 for Chinese Patent Application No. 2006800364961.
Examination Report dated Feb. 10, 2010 for Singapore Patent Application No. 200801128-0.
Examination Report dated Oct. 29, 2010 or Australian Patent Application No. 2006281970.
"Optimizing predictive text entry for short message service on mobile phones" by How et al. School of Computing, National University of Singapore, 2005. Retrieved from the Internet: http://en.scientificcommons.org/43594032.
"An Efficient Text Input Method for Pen-based Computers" by Toshiyuki Masui, Sony Computer Science Laboratory Inc., Shinagawa, Tokyo, Japan. In: Proceedings of the ACM Conference on Human Factors in Computing Systems (CHI'98), Apr. 1998. Retrieved from the Internet: http://www.pitecan.com/papers/CHI98/CHI98.pdf.
"The Use of Syntax in Word Completion Utilities" by Afsaneh Fazly, Graduate Department of Computer Science, University of Toronto, 2002, Retrieved from the Internet: http://www.cs.toronto.edu/pub/gh/Fazly-thesis.pdf.
KeyStick Text Entry System for Series 60 Mobile Phones Version 2.8.0; 2003.
International Search Report dated Jan. 15, 2002 from International Patent Application No. PCT/AU2002/001467.
Office Action dated Aug. 19, 2016 for CA 2,711,400.
Ali K., Van Stam, W., TiVo: Making Show Recommendations using a Disturbed Collaborative Filtering Architecture, pp. 394-401, KDD 2004, Seattle, WA, 2004.
Gargi et al, "QuickSuggest: Character Prediction on Web Appliances", Google, Inc., 2010.
Bellman et al, "A Probabilistic Character Layout Strategy for Mobile Text Entry", 1998.
Ingmarsson et al, "TNT—A Numeric Keypad Based on Text Input Method", vol. 6, No. 1, pp. 639-646, 2004.
Isokoski, "Performance of Menu-Augmented Soft Keyboards", 2004.
MacKenzie, "KSPC (Keystrokes per Character) as a Characteristic of Text Entry Techniques", 2002.
Ward, et al, "Dasher—A Data Entry Interface Using Contiguous Gestures and Language Models".
Moffat, "Implementing the PPM data compression scheme", IEEE, 1990.

\* cited by examiner

FIG. 3

| a | Chnically | legraph | mporary | nor | rrible | stosterone |
|---|---|---|---|---|---|---|
| ach | Chnician | lephone | mpt | ns | rribly | sts |
| acher | Chnicians | lephoned | mptation | nse | rrier | tanus |
| achers | Chnique | lephones | mptations | nsion | rrific | xt |
| aches | Chniques | lephonist | mpted | nsions | rrified | xtbook |
| aching | Chnological | lescope | mpting | nt | rrifying | xtbooks |
| am | Chnologies | levision | n | ntative | rritorial | xtile |
| ams | Chnology | levisions | nancy | nth | rritories | xtiles |
| amwork | Ddy | ll | nant | nths | rritory | xting |
| ar | Dious | lling | nants | nts | rror | xts |
| aring | E | lls | nd | rm | rrorism | xture |
| ars | En | mper | nded | rmed | rrorist | |
| as | Enage | mperature | ndencies | rminal | rrorists | |
| ase | Enager | mperatures | ndency | rminals | rtiary | |
| ased | Enagers | mpest | nder | rminate | st | |
| aspoonful | Ens | mplate | ndering | rminology | stament | |
| atime | Eth | mple | nders | rms | sted | |
| chnical | Lecom | mples | nding | rrace | stes | |
| chnicalities | Lecommunications | mpo | nds | rraced | stimony | |
| chnicality | Legram | mporarily | nnis | rraces | sting | |

FIG. 4

| xt |
|---|
| l |
| n |
| a |
| r |
| chn |
| st |
| mp |

FIG. 5

| Total Entries | Average Clicks |
|---|---|
| 51 | 3.14 |
| 423 | 5.14 |
| 1,096 | 5.52 |
| 8,555 | 7.22 |
| 31,838 | 8.45 |
| 503,756 | 11.30 |

FIG. 6

| Selection | PWC (joystick) | Mobile phone contacts (multi-tap) | PC based contacts (screen, KB, mouse) |
|---|---|---|---|
| Harland Close | 4.1 | 3.4 | 6.3 |
| Martie Harrow | 3.3 | 6.9 | 5.5 |
| Harold Reed | 4.4 | 8.8 | 4.8 |
| Leanora Foster | 3.1 | 6.4 | 5.6 |
| Wendi Woollard | 4.1 | 6.5 | 10.2 |
| Rachel Holdsworth | 2.5 | 9.0 | 4.7 |
| Maurine Lineman | 2.5 | 6.0 | 5.5 |
| Alanis Hoffhants | 4.3 | 6.0 | 8.1 |
| Kaylyn Johnston | 4.9 | 6.0 | 7.0 |
| Deana Cypret | 3.1 | 4.6 | 4.5 |
| Giselle Highlands | 4.7 | 8.8 | 7.4 |
| Perry Pyle | 4.3 | 8.7 | 5.6 |
| Average: | 3.8 | 6.8 | 6.3 |

FIG. 7

| Selection | PWC (joystick) | PC music player (screen, KB, mouse) | Audio player (wheel) |
|---|---|---|---|
| Love over gold - Dire Straits | 5.0 | 6.3 | 14.1 |
| Material girl - Madonna | 3.2 | 4.4 | 13.7 |
| Rikki don't lose that number - Steely dan | 3.1 | 4.5 | 13.8 |
| Run like Hell - Pink Floyd | 3.0 | 5.5 | 12.8 |
| Doctor my eyes - Jackson Brown | 3.1 | 3.8 | 5.3 |
| Girls talk - Dave Edmunds | 4.3 | 5.0 | 9.5 |
| Hungry like the wolf - Duran Duran | 3.3 | 3.8 | 11.0 |
| Average: | 3.6 | 4.8 | 11.5 |

FIG. 8

| Selection | PWC (joystick) | PWC (touchscreen) | PC music store (screen, KB, mouse) |
|---|---|---|---|
| Love over gold - Dire Straits | 8.4 | 6.4 | 11.0 |
| Material girl - Madonna | 7.5 | 9.2 | 11.9 |
| Rikki don't lose that number - Steely dan | 6.8 | 7.5 | 9.5 |
| Run like Hell - Pink Floyd | 8.4 | 8.1 | 11.0 |
| Doctor my eyes - Jackson Brown | 7.2 | 6.0 | 11.5 |
| Girls talk - Dave Edmunds | 8.1 | 7.6 | 8.7 |
| Hungry like the wolf - Duran Duran | 8.1 | 7.1 | 10.2 |
| Average: | 7.8 | 7.4 | 10.5 |

```
        T
  L    ..    S
        I
```

```
        W
  M    ..    B
        D
```

```
        a
  e    ..    o
        I
```

```
           a
  ockbu...    inded ..
        ue_
```

```
              ck Or White»
     me It O...    ck Is Bl...
              ck Water»
```

Black Or White
Michael Jackson
Dangerous
R&B
1992
Chars: 49
Clicks: 5

| Menu options presented | | | | User action | Call parameter | Values at end of call | | Comments |
|---|---|---|---|---|---|---|---|---|
| 1 | 2 | 3 | 4 | | | "Entry so far" | "Current menu" | |
| | | | | Start selection | Start | "" | (5) | "Entry so far" is cleared; "Current menu" is moved to initial menu (5); the system may generate and return a transaction ID to be used for subsequent calls |
| "s" | "c" | "a" | "p" | Select "more" | More | "" | (1) | The user is looking for "l" to start their word "leadership" and continues to press more until "l" is found |
| "l" | "e" | "i" | "r" | Select "more" | More | "" | (2) | |
| "m" | "d" | "b" | "l" | Select "more" | More | "" | (7) | |
| "w" | "l" | "o" | "h" | Select "l" | Option 2 | "l" | (8) | User has found and selected "l" to start the word |
| "e" | "i" | "o" | "a" | Select "e" | Option 1 | "le" | (9) | Continuing word with "e" |
| "a" | "g" | "t" | "e" | Select "a" | Option 1 | "lea" | (10) | |
| "d" | "m" | "y" | "gue " | Select "d" | Option 1 | "lead" | (11) | |
| "ers" | "er " | "ing " | "s " | Select "ers" | Option 1 | "leaders" | (4) | |
| "hip " | " " | | | Select "hip " | Option 1 | "leadership" | none | The word is complete |

| ... | ... |
|---|---|
| knowledge | 14586 |
| known | 22432 |
| knows | 8419 |
| labour | 26488 |
| lack | 8898 |
| lady | 6514 |
| land | 17301 |
| language | 18771 |
| large | 33768 |
| largely | 7350 |
| larger | 7639. |
| largest | 5778 |
| last | 68063 |
| late | 20068 |
| later | 39496 |
| latest | 6331 |
| latter | 7762 |
| laughed | 4585 |
| law | 24510 |
| laws | 4816 |
| lay | 6875 |
| lead | 11721 |
| leader | 8669 |
| leaders | 7234 |
| leadership | 4686 |
| leading | 9619 |
| league | 8103 |
| learn | 6204 |
| learning | 4257 |
| least | 4642 |
| leave | 18388 |
| leaving | 9240 |
| led | 15451 |
| lee | 3587 |
| leeds | 4522 |

| left | 39454 |
|---|---|
| leg | 5333 |
| legal | 13103 |
| legislation | 6965 |
| legs | 6507 |
| length | 7171 |
| less | 35669 |
| let | 23322 |
| let's | 8161 |
| letter | 13589 |
| letters | 7880 |
| level | 25360 |
| levels | 11894 |
| lewis | 3730 |
| liability | 3760 |
| liberal | 5164 |
| library | 8206 |
| licence | 3492 |
| lies | 3828 |
| life | 56592 |
| lifespan | 3698 |
| light | 20090 |
| lights | 4336 |
| like | 142767 |
| likely | 22592 |
| limited | 5146 |
| line | 22333 |
| lines | 10172 |
| link | 3494 |
| lips | 5032 |
| list | 11644 |
| listening | 3506 |
| literary | 3385 |
| Literature | 5210 |
| Little | 46355 |

| Live | 13995 |
|---|---|
| Lived | 3648 |
| Liverpool | 5517 |
| Lives | 7172 |
| Living | 13317 |
| Loan | 3815 |
| Local | 44220 |
| Location | 4030 |
| London | 35142 |
| Long | 50267 |
| Longer | 4834 |
| long-term | 4103 |
| Look | 54354 |
| Looked | 35178 |
| Looking | 25477 |
| Looks | 9118 |
| Lord | 11218 |
| Lose | 4771 |
| Loss | 11601 |
| Losses | 3841 |
| Lost | 16625 |
| Lot | 18319 |
| Lots | 4077 |
| Love | 16167 |
| Lovely | 6263 |
| Low | 16144 |
| Lower | 10882 |
| Ltd | 5066 |
| Lucky | 4008 |
| Luke | 3531 |
| Lunch | 4998 |
| Lying | 4401 |
| Machine | 8902 |
| Machines | 4461 |
| Made | 94386 |
| ... | ... |

FIG. 18e
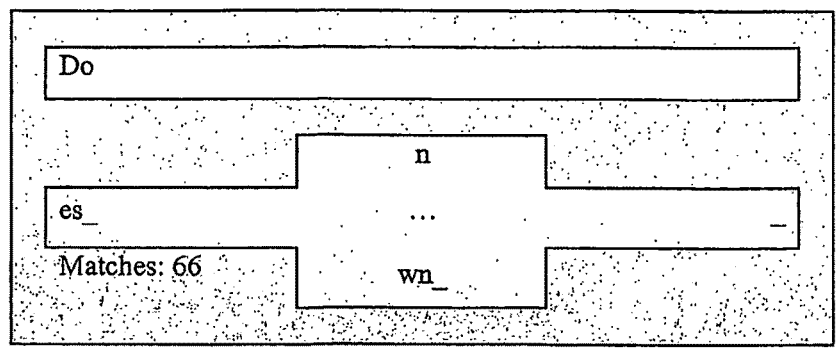
FIG. 18f
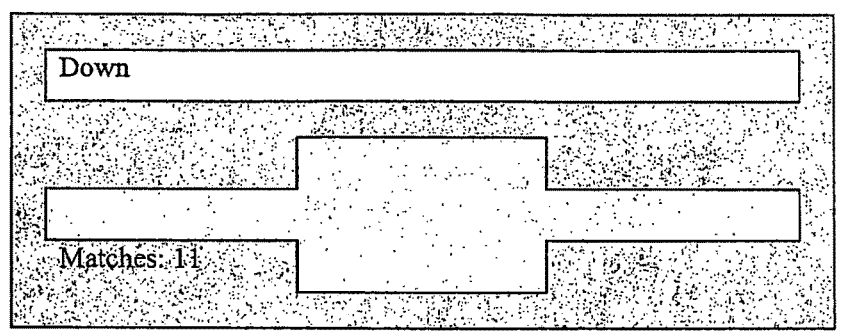
FIG. 19
| Burning Down The House |
| --- |
| Don't bring me down |
| Down On The Corner |
| Down to the Waterline |
| Get Down Tonight |
| Right Down the Line |
| Rockin' Down the Highway |
| Roll Over Lay Down |
| The Fire Down Below (Live) |
| Tie Your Mother Down |
| Won't Back Down |

FIG. 20

| Word | Frequency |
|---|---|
| back | 1 |
| below | 1 |
| bring | 1 |
| burning | 1 |
| corner | 1 |
| don't | 1 |
| fire | 1 |
| get | 1 |
| highway | 1 |
| house | 1 |
| lay | 1 |
| line | 1 |
| live | 1 |
| me | 1 |
| mother | 1 |
| on | 1 |
| over | 1 |
| right | 1 |
| rockin' | 1 |
| roll | 1 |
| the | 6 |
| tie | 1 |
| to | 1 |
| tonight | 1 |
| waterline | 1 |
| won't | 1 |
| your | 1 |

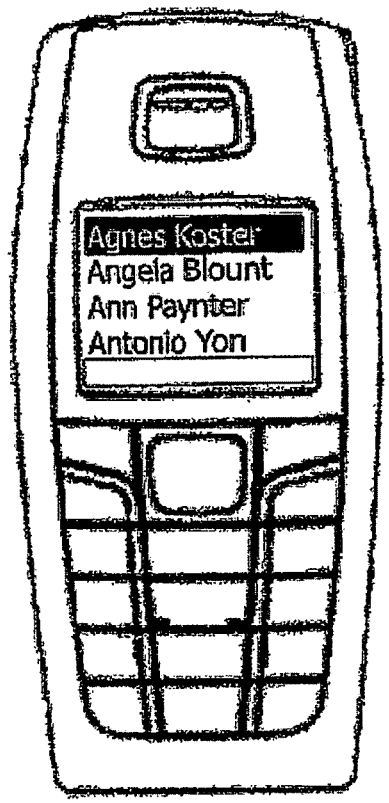
FIG. 26
FIG. 27
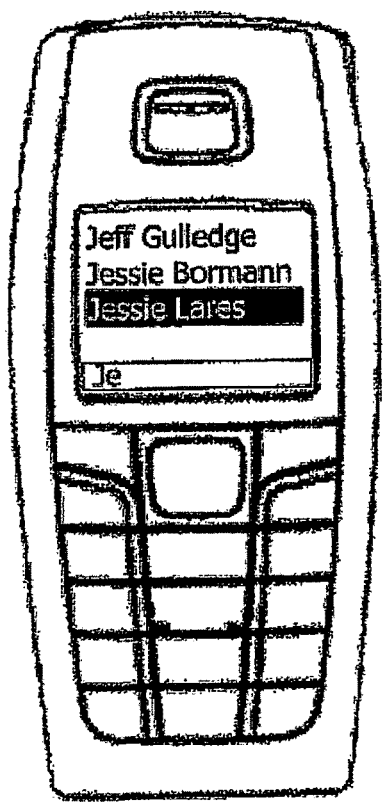

FIG. 28
| Meal | Components | | | | Popularity |
|---|---|---|---|---|---|
| Muffin break |  |  | | | 33 |
| Pretzel break |  |  | | | 15 |
| Bagel break |  |  | | | 27 |
| Pizza meal |  |  |  |  | 37 |
| Burger meal |  |  |  |  | 23 |
| Burger snack |  |  |  | | 38 |
| Hotdog snack |  | 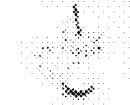 |  | | 62 |
| Taco snack |  |  |  | | 39 |

Matches: 73

Meal selected: Burger Snack

PROCESS AND APPARATUS FOR SELECTING AN ITEM FROM A DATABASE

CROSS-REFERENCE TO RELATED APPLICATIONS

This application is a National Stage application of International Application No. PCT/AU2007/002010, filed Dec. 28, 2007, which designates the United States and was published in English, and which claims the benefit of U.S. Provisional Application No. 60/878,083 filed Jan. 3, 2007, and U.S. Provisional Application No. 60/960,345 filed Sep. 26, 2007. This Application is also related to U.S. Provisional Application No. 60/905,295 filed Mar. 7, 2007, International Application No. PCT/AU2006/001151, filed on Aug. 11, 2006, Australian provisional application AU2005904378 filed Aug. 12, 2005, U.S. application Ser. No. 10/495,585 filed on Aug. 20, 2002, PCT/AU02/01114 filed Aug. 20, 2002, and Australian provisional application PS-1072, filed Mar. 13, 2002. Each of these applications is incorporated herein by reference in its entirety.

BACKGROUND OF THE INVENTION

1. Field of the Invention

The present invention relates to an improved process and apparatus for selecting an item from a database, and more particularly, but not exclusively, to a method and apparatus for rapidly selecting items from a list of items identified by an informational field.

2. Description of Related Art

There are many applications on computing devices which require selection from a list where the item identifier for the list is text based. Such applications include selecting a contact from an address book, selecting a record from a database, selecting a word from a dictionary, etc. In these applications, the user has to enter enough information to narrow a search of the list down to a single entry or a subset of entries for selection. This selection process requires entering several of the initial letters of the search term resulting in a smaller subset of the list and then scrolling through the subset to manually point out the desired items.

The process is cumbersome and requires the user to be able to enter any letter in their language's alphabet as well as possibly numbers and other symbols. This is particularly onerous on devices with limited interfaces such as mobile phones, personal digital assistants (PDAs), remote controls, games consoles, etc.

On hand held devices with a keypad such as mobile phones (see, FIG. 1), the entry of alphabetic characters as well as numbers and symbols is achieved by repeatedly pressing the 12 number keys (0 to 9 and "*" and "#"). This method is complicated and unnatural. It requires accurate presses of generally very small buttons and results in accidental pressing of adjacent buttons. This conventional system also requires the user to be able to read and discern very small labels on the buttons, requires constant shift of gaze between buttons and the screen to track the input, and only allows the entry of one character at a time.

Other handheld devices, such as a PDA, accept input through a touch screen (see, FIG. 2). These devices allow entry of search terms through generally two methods—an on-screen keyboard and handwriting recognition.

The on-screen keyboard method involves presenting an image of a keyboard on the screen. The buttons on the on-screen keyboard are often too small to be selected using fingers so a stylus is required. Additionally, the process is slow, and selection of individual characters is prone to errors. There are additional disadvantages to the on-screen keyboard method. For example, in the on-screen keyboard method, access to numbers and additional symbols usually requires at least two presses as they require the keyboard to go into another mode to allow access to them, small key images are hard to see for those with any impairment of vision and hard to select for those with limited dexterity, characters are only entered one at a time, and the process generally requires two hands.

Handwriting recognition systems are disadvantageous because of the high error rate in recognising characters, the need for a stylus for input, the time required to enter each letter, the constant cycle of entry and checking the entry and correction of misinterpretation of entries, characters are only entered one at a time, and the process generally requires two hands.

Even using a full keyboard to specify the characters to select is disadvantageous because it is still necessary to enter one character at a time; it is still necessary to enter enough characters to generate a manageable subset list and then select from it or it is necessary to enter sufficient characters each time to uniquely identify the entry which may require all of the entry to be specified; except for adept touch typists there is still a need to constantly move one's gaze between the keyboard and the screen.

In addition to the text based systems described above, selection from a list may also be done through a directional control input or some similar method.

Devices that do not have additional keys or input mechanisms for text input, are often limited to one or more directional input mechanisms such as a joystick or selection wheel plus, in some instances, a number of other buttons dedicated to certain functions. Devices in this category include such things as games consoles, handheld games systems, music players, and video players. Other devices, such as mobile phones, combine text input and/or other directional means to make selections.

In order to select an item using these systems the user has to use the directional control in conjunction with an on-screen representation of the list to navigate through the list of available items. This process becomes increasingly slow and complex in proportion to the size of the list.

Refining the list using character entry to enter a filter string is particularly difficult for devices with no additional controls for text entry as text entry is often achieved through selecting each character by navigating around an onscreen list of characters.

Accordingly, there is a need for an improved method of selecting items from a list.

SUMMARY OF THE INVENTION

In accordance with an aspect, the present invention may provide a method of selecting items from a collection of items. The items may be identified by a sequence of components. In an embodiment, the method may include: generating an initial display including one or more parts of item identifiers for selection, enabling selection of the one or more parts and in response to selection of the one or more parts, generating a display of a further one or more parts for selection, and enabling selection of the further one or more parts in order to add to the selected one or more parts to build a larger part or whole of an item identifier.

In accordance with an aspect, the present invention may provide a method of selecting database items from a database collection of items. The database items may be indexed or identified by a list of item identifiers or sequence of components. In an embodiment, the method may include: generating an initial display including one or more parts of item identifiers for selection, enabling selection of the one or more parts and in response to selection of the one or more parts, generating a display of a further one or more parts for selection, and enabling selection of the further one or more parts in order to add to the selected one or more parts to build a larger part or whole of an item identifier.

In accordance with an aspect, the present invention may provide a method of selecting items from a collection of items. The items may be identified by a sequence of components. In an embodiment, the method may include: generating an initial display including one or more parts of item identifiers for selection, enabling selection of the one or more parts and in response to selection of the one or more parts, generating a display of a further one or more parts for selection, and enabling selection of the further one or more parts in order to add to the selected one or more parts to build a larger part or whole of an item identifier.

In accordance with another aspect, the method may include: means for generating an initial display including one or more parts of item identifiers for selection, means for enabling selection of the one or more parts and in response to selection of the one or more parts, means for generating a display of a further one or more parts for selection, and enabling selection of the further one or more parts in order to add to the selected one or more parts to build a larger part or whole of an item identifier In embodiments, the invention includes a method of selecting an item from a list indexed by a text based field. The invention may allow for selection from the list by presenting one or more string sections, (the item identifier parts in this embodiment), containing one or more characters (the components in this embodiment), at a time in a list for the user to select from.

In embodiments, the invention includes a method of selecting an item from a list indexed by a text based field. The invention may allow for selection from the list by presenting one or more word sections, (the item identifier parts in this embodiment), containing one or more characters, at a time in a list for the user to select from.

In embodiments, the word or string sections presented are based on some knowledge of the text indices in the list and the likelihood of the string or word sections to be the ones the user wants to enter.

In embodiments, where the list of expected string or word sections does not contain the desired entry the user is given an option to list "more" string or word sections and is presented with a new list which indicates the next most likely set of string or word sections.

In embodiments, when a string or word section is selected, a new list of string or word sections is presented to form a continuation of the text selection based on the string or word sections selected so far being the start of the desired selection.

In embodiments, once all the string or word sections have been selected and concatenated, the item in the list is identified and any associated action, such as, for example, presenting a telephone book contact's contact details, is carried out.

In embodiments, the string or word sections are presented as labels on the screen to be selected by various methods depending on the type of device.

In embodiments, where the device is a PC, the string or word sections would be selected by mouse presses or mapping to keyboard keys.

In embodiments, where the device has a touch screen, such as, for example, on a PDA or Tablet PC, the string or word sections would be selected by pointing at the labels with either a finger or stylus.

In embodiments, for example, where the device has a small screen and a joystick such as a mobile telephone or watch sized device, the string or word sections may be selectable from a menu which indicates which string or word section is selected for corresponding movements of the joystick.

In embodiments, for example, where the device has function keys with the ability to associate an on-screen label with a button press the string or word sections may be presented for selection as labels with corresponding function keys.

In accordance with another aspect, the present invention may provide a method of selecting items from a collection of items. The items may be indexed by a list of item identifiers. In embodiments, the method may include: enabling a display of one or more parts of item identifiers for selection, the item identifiers being generated on a display being chosen for generation in accordance with predetermined criteria.

In accordance with another aspect, the present invention may provide a method of selecting items from a collection of items. The items may be indexed by a list of item identifiers. In embodiments, the method may include: enabling a display of one or more parts of item identifiers for selection, the item identifiers being generated on a display being chosen for generation in accordance with predetermined criteria.

In accordance with another aspect, the present invention may provide an apparatus or means for selecting items from a collection of items. The database items may be indexed by a list of item identifiers, and the apparatus may include a means for display, an input means, a generating means for generating an initial display including one or more parts of item identifiers for selection, means for enabling selection via the input means of the one or more parts, means responsive to selection of the one or more parts for generating a display of a further one or more parts for selection, means for enabling selection via the input means of the further one or more parts, and addition means to add the further one or more parts to the selected one or more parts to build a larger, or whole of an item identifier In accordance with another aspect, the present invention may provide an apparatus or means for selecting database items from a database. The database items may be indexed by a list of item identifiers, and the apparatus may include a means for display, an input means, a generating means for generating an initial display including one or more parts of item identifiers for selection, means for enabling selection via the input means of the one or more parts, means responsive to selection of the one or more parts for generating a display of a further one or more parts for selection, means for enabling selection via the input means of the further one or more parts, and addition means to add the further one or more parts to the selected one or more parts to build a larger, or whole of an item identifier In accordance with another aspect, the present invention may provide an apparatus for selecting items from a collection of items. The items may be indexed by a list of item identifiers and the apparatus may include a means enabling a display of one or more parts of item identifiers for selection, the means selecting the item identifiers for display in accordance with predetermined criteria.

In accordance with another aspect, the present invention may provide an apparatus with means for selecting items from a collection of items. The items may be indexed by a list of item identifiers and the apparatus may include a means for enabling a display of one or more parts of item identifiers for selection, and the means for selecting the item identifiers for display in accordance with predetermined criteria.

In accordance with another aspect, the present invention may provide an apparatus with means for selecting database items from a database. The database items may be indexed by a list of item identifiers and the apparatus may include a means for enabling a display of one or more parts of item identifiers for selection, and the means for selecting the item identifiers for display in accordance with predetermined criteria.

BRIEF DESCRIPTION OF THE DRAWINGS

Features and advantages of the present invention will become apparent from the following description of embodiments thereof, by way of example only, with reference to the accompanying drawings, in which:

FIG. 3 is a table showing all possible word completions for the string "te" out of a dictionary of approximately 14,000 words;

FIG. 4 is a table showing all possible partial word completions for the string "te" out of a dictionary of approximately 14,000 words;

FIG. 5 is a table of the average number of clicks required to select items from lists of various sizes using a joystick based Partial Word Completion system in accordance with an embodiment of the present invention;

FIG. 6 shows a table of timings of selection of 12 contacts out of approximately 900 using partial word completion and two other methods;

FIG. 7 shows a table of timings of selection of 7 songs out of approximately 1000 using partial word completion and two other methods;

FIG. 8 shows a table of timings of selection of 7 songs out of over 500,000 using partial word completion based joystick selection and touch screen selection and one other method;

FIG. 12 illustrates the selection sequence based on a static tree structure in accordance with an embodiment of the present invention;

FIG. 13 is a table showing a section of a word list for English out of a total list of 2,500 words including all words starting with "l" and all words forming the branch for words starting with "lea" indicated in bold in accordance with an embodiment of the present invention;

FIGS. 18A-18F shows a menu sequence for the selection of the keyword "down" with a view to selecting the song "Down by the water line" from a library of 1041 songs in accordance with an embodiment of the present invention;

FIG. 19 shows a possible list of the song titles which have the word "down" in them in accordance with an embodiment of the present invention;

FIG. 20 is a list of all words (with their frequencies) that appear in song titles with "down" in them in accordance with an embodiment of the present invention;

FIG. 26 is a representation of a traditional address book at the start of the selection process, showing the first four entries in an address book with selection indicator over first one. There is no entry in search refinement field;

FIG. 27 is a representation of a selection from a reduced list of contacts from an address book using a traditional selection process where the user has entered "je" to refine the search to a manageable number of entries and then used the cursor to move and highlight "Jessie Lazes";

FIG. 28 is a table of fast food items selectable as images using Partial Word Completion in accordance with an embodiment of the present invention;

DETAILED DESCRIPTION OF EMBODIMENTS OF THE INVENTION

Figure 1:
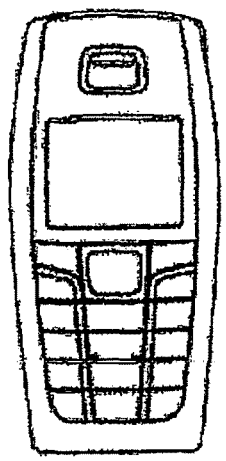
FIG. 1 is a representation of a traditional mobile telephone layout.
Figure 2:
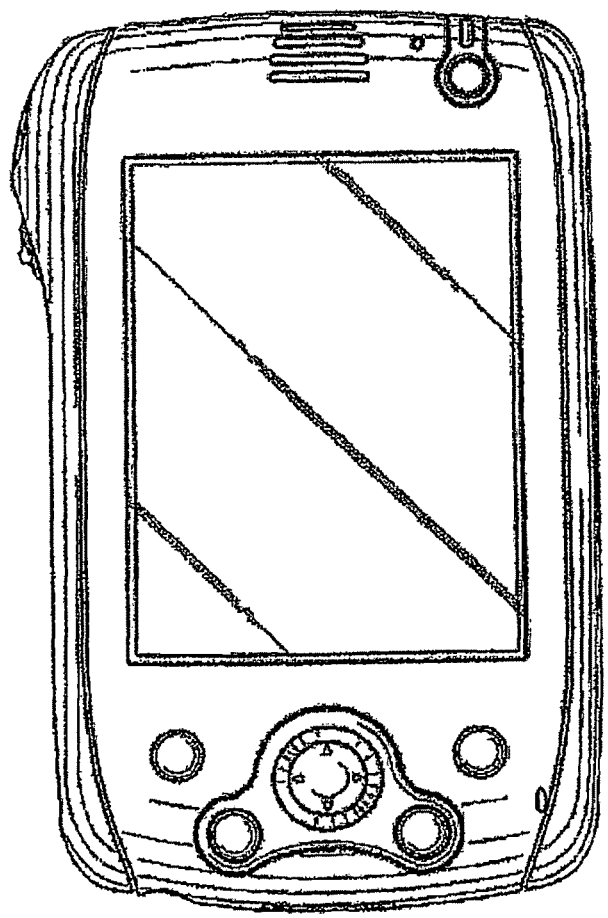
FIG. 2 is a representation of a touch screen input device.

The present invention provides a method and apparatus for rapidly selecting an item from a collection of items the method being referred to as "partial word completion". Each item being identifiable through a sequence of a common set of components (the "identifier"). A system based on the present invention performs an analysis of all the identifiers in order and determines where the sequences of components diverge or branch. The collection of one or more components between each branch makes up a "segment". A partial word completion system allows the user to narrow a search by selecting segments in order to be concatenated to make up some or all of an identifier. The system presents the segments to the user through some output means and the user indicates through some input means which of the presented segments is the next section of the identifier they are building up.

In an embodiment, in order to allow the user to make their selection, the system may first present the set of initial segments for the user to start the select with. As each segment is selected it is concatenated to the identifier section and the system then presents the segments that continue the build up of the identifier. This process is continued until the complete identifier is built up and the desired item has been identified or it becomes apparent that the desired item does not match any identifier and hence is not in the collection of items. Alternatively the identifier may be only partially specified which results in all matching items being selected.

The system may apply some ranking to items in the collection and present segments that correspond to higher ranked items with more prominence. The components making up the item identifier may include characters, symbols, graphics, sounds, gestures, DNA nucleotides, chess moves, dance steps or combinations of the above. In one aspect of the present invention any component that can be combined in sequence to form an identifier may be used.

In presenting the segments to the user for selection the system may present a subset of the segments at a time. The system may provide the user with some means to indicate that the desired segment is not currently being presented and so the system should present further segments for consideration. The segments may be presented on an output means such as a display on a computing device and the number of segments presented at a time may be determined by the input means. For instance the input means may be a joystick with four discrete directional movements in which case it may be appropriate to present four segments at a time, in addition the joystick may have an additional operation of a press "in" which could be used to indicate that the desired segment is not being presented. In addition to a joystick being used as an input mechanism many other means may be used including a toggle switch, touch screen, movement sensors, touch sensitive zones on the device, buttons with corresponding on-screen menus or dedicated buttons or combinations of the above.

A common system for identifying items in a collection of items is through identifiers which are text strings whereby the components making up the identifiers are text characters. Examples of this include identifying a contact in an address book by name, a music track in a music library by artist and track name, a web page by keywords, etc. In embodiments of systems to allow for selection of such items, a means is provided to refine a search by entry of a text string which matches to some or all of the desired identifier. However, this requires text input which can be cumbersome on devices with keyboards or keypads and is particularly onerous on devices with even less text input ability. As should be readily understood by a person of ordinary skill in the art, certain embodiments of the present invention may provide rapid selection of an item from a collection on almost any computing device but may be particular beneficial to devices with limited or no text entry means. Such devices include mobile phones, music players, PDAs, tablet PCs, cameras, games systems, navigation systems, information kiosks and "lounge room" media devices or combinations of the above. Additional, exemplary devices are discussed below.

In an embodiment of the present invention, the method and apparatus improves on list selection processes by providing a means to navigate through a list of textually indexed items a string section at a time. So rather than presenting the user with a list of all the possible selections, the embodiment of the present invention uses partial word completion to present a hierarchical tree of string sections that make up the list of selectable items. This results in the user making selections from a more manageable number of options each time and enabling selection with an exponential like efficiency.

For example, a system may provide list selection of English words from a dictionary of 14,000 words. In such an instance, once the user has entered "te", out of a list of the 14,000 word dictionary there are about 130 possible completions, these possibilities are listed in the table in FIG. 3. It is very difficult to present all these options for the user to easily select from. There are only approximately 10 word part continuations for the word start of "te" these are listed in the table in FIG. 4. In an embodiment of the present invention, this smaller number of options can be presented to the user as a menu of items which can be selected by some limited means such as a joystick.

In embodiments, a list selection system of the present invention may allow the user to select one of the proposed part continuations (based on the selection string specified thus far), append the selection to the selection string specified thus far, determine a new set of most likely part continuations and present them for selection. The user could then repeat this cycle until the selection was complete. This method facilitates efficient list selection on devices which have traditionally cumbersome list selection means.

Using this method the desired result can be entered as menu selections from the first letter onwards without the need for explicit character entry from a keyboard or keypad. Use of the present invention may result in one or more user benefits, including, but not limited to, allowing text entry at a rate comparable or better than other systems for devices with a limited user input. Additionally, the present invention may be less stressful due to the fact that there may be significantly less key presses or movements of the joystick. Additionally, by not having to use a small device keypad, there are fewer mispresses of small keys and less fatigue and less damage to the user's fingers and hand. Furthermore, in embodiments, it may be possible to enter several characters with one user input such as a key press or other user action. Additional benefits of embodiments of the present invention include, for example, less flicking of focus between the controls and screen since the user's gaze generally remains on the screen. Further, the user may be guided through known text in the items in the list so it is more difficult to misspell a selection. Typically, only the joystick is used so there is no need to transfer the thumb or finger between buttons and risk mis-hitting buttons. It is also possible in certain embodiments to combine the joystick with other mechanisms for entering information. In certain embodiments, the present invention may also allow an application to be used efficiently with just a joystick whereas previously it relied on touch screen inputs—this may avoid the disadvantages of touch screen usage such as poor tactile feedback and marking of the screen with finger prints. The user may also be informed on the menu of what is available for selection.

It also possible in certain embodiments to prioritise entries which make list selection more efficient by making more common words, phrases, or selections easier and faster to select. This prioritization is useful when applied to list selection tasks such as contacts lookup. Furthermore, the system does not rely on hardware labels printed on keys, for instance Asian mobile phones generally need to have different characters printed on their keys than those for countries using the Latin alphabet, and with a partial word completion based system the presentation of letters may be done on-screen in software. Another potential advantage of certain on-screen labels is that it is possible to increase the size of the labels to make them more readable for those with vision impairment, an option not possible for labels on small keypad keys. Additionally, in embodiments, partial word completion based text entry encourages entry of full words rather than abbreviated text like "c u l8r", this may desirable in certain applications such as, for example, for enterprise level messages and emails. It may also be desirable in certain languages with large words such as German.

The present invention is not limited to words. It could also work with phrases, numbers, abbreviations, Asian characters, images, sounds or any other list of items which are composed of a collection of components in sequence. Partial word completion as disclosed in the present invention provides the ability to select an item from a list of known items in general. In addition to provision of text based partial word completion based list selection, it may be advantageous in certain embodiments to provide selection of items made up of components other than characters. These components may be graphical, audible, tactile, etc. These benefits and advantages are only some of the benefits and advantages provided in using partial word completion as disclosed in the present invention. Other advantages and benefits are disclosed herein.

In general, whenever a system provides selection of items from a list of multiple items, the items being composed of a sequence of components, then partial word completion could be applied to the selection of those components. In embodiment, the items may be entirely graphical for instance and unrelated to text or character sets. An example of this may be a fast food selection mechanism (described in more detail below).

Additionally, because each option selection marks a choice of one branch out of a tree of options the result is that traversal through the tree, and hence selection of the desired item, happens at a rate which is more exponential than linear. To illustrate this point, FIG. 5 shows a table of the average number of clicks required to select items from lists of various sizes using a joystick based Partial Word Completion system. As can be seen, as the number of items in the list increases, the average number of clicks does not increase in linear proportion but more approximates an exponential curve.

To further illustrate this point, FIG. 6 shows a table that compares selection of 12 items from a list of approximately 900 items, in this case contacts from an address book, using partial word completion joystick based list selection as disclosed in the present invention. The table also sets out timings for: selecting the same items using a standard address book application on a mobile phone using the phone keypad to refine the search; and a PC based contacts application using a full screen, keyboard and mouse to make selections. As can be seen, of the 12 items selected using the partial word completion method, selection of each item requires an average of 3.8 seconds. In comparison, using the mobile phone based selection method the average amount of time per selection is 6.8 seconds and with a PC based contacts application the average selection time is 6.3 seconds.

In addition, FIG. 7 shows a table comparing selection of 7 items from a list of approximately 1,000 items, in this case songs in a music library. The selection methods listed are: partial word completion based joystick selection on a handheld device; selection of music tracks using a "click wheel" on a portable music player and selection of music tracks using a full screen, mouse and keyboard of a music application running on a PC. As can be seen, of the 7 items selected using the partial word completion method, selection of each item requires an average of 3.6 seconds. In comparison, using the portal music player wheel based selection method the average amount of time per selection is 11.5 seconds and with a PC based music application the average selection time is 4.8 seconds.

In addition, FIG. 8 shows a table comparing selection of 7 items from a list of more than 500,000 items, in this case songs in a large music database. The selection methods listed are: partial word completion based joystick selection on a handheld device; partial word completion based touch screen selection on a handheld device; and selection of music tracks using a full screen, mouse and keyboard of a music application running on a PC. As can be seen, of the 7 items selected using the partial word completion joystick method, selection of each item requires an average of 7.8 seconds and using the partial word completion touch screen method selection of each item requires an average of 7.4 seconds. In comparison, using the PC based music application the average selection time is 10.5 seconds.

The above timings were an average of recorded sessions performed by users who were of average competency of the systems described. Users had at least 30 minutes experience of the systems being tested for familiarity purposes. For each selection reading, the user was told the target item, and navigated to the opening screen of the selection system. The timer was then started and the user proceeded to select the target item as quickly as possible, once the target item was uniquely selected or highlighted the timer was stopped and a reading recorded. Where navigational errors were performed, this reading was discarded and the selection restarted in order to record the best error-free timings. It should be noted that the partial word completion based systems encountered the least amount of navigation errors.

The process for selecting on each of the systems described above were: for joystick based partial word completion selection the user started at the top menu of the selection tree and navigated through the menu tree to the point where a joystick movement selected the target item; for touch screen based partial word completion selection the user started at the top menu of the selection tree with nine options shown at a time on a PDA touch screen and navigated through the menu tree by selecting items with a stylus to the point where they selected the target item; for mobile phone contacts, the standard contacts application on a Nokia N93 was used, the user entered refining letters on the keypad using multi-tap until the desired item was displayed in the list on the screen, this was then selected with the joystick; for PC based contact lookup, the Contacts option in Microsoft Outlook was used with the user first selecting the letter at the start of the target item name, then scanning through and selecting the target item using the mouse from the contacts displayed on the screen; for the audio player with wheel selection an iPod Nano was used and the user started at the top of the Music list, to make the selection, the user used the click wheel to scroll through the list to the target item; for the PC music store selection, the iTunes application was used to access the iTunes Store using the "Power Search" facility, to make a song selection the user entered what they thought were the most efficient refining search terms in the "Artist" and/or "Song" fields and then used the mouse to select the target item from the resultant on-screen list, where the response from the system was slowed by communications issues, the timing for that test was discarded and the test repeated until response time was close to instant.

In another test, users of various ages, genders and levels of expertise were asked to select ten contacts from an address book of approximately 900 contacts as quickly as possible using the two methods described below.

Partial word completion selection was performed through a joystick based contacts lookup application running on a mobile phone.

The comparison system involved selection of contacts on a mobile phone using the traditional system of a scrolling list of contacts. Searches for particular contacts could be refined by entering characters through the phone keypad.

Each selection was timed from start to completion. Total key presses were counted. In addition error rates were noted. An error was defined as key presses made in excess of the minimum required to make the selection.

The resultant average values per selection were as follows:

|  | Traditional phone address book | Partial word completion | Pwc proportion |
| --- | --- | --- | --- |
| Seconds | 10.17 | 5.10 | 50% |
| Key presses | 9.63 | 5.70 | 59% |
| Errors | 0.93 | 0.20 | 21% |

In summary, for this test, partial word completion based list selection applied to contacts lookup using only a joystick compared to traditional mobile phone contacts lookup allows for selection in 50% of the time, with 59% of the key clicks and 21% of the errors.

In yet another test, users of various ages, genders and levels of expertise were asked to select ten contacts from an address book of approximately 900 contacts as quickly as possible using the two methods described below.

Partial word completion selection was performed through a joystick based contacts lookup application running on a mobile phone.

The comparison system involved selection of contacts on a personal computer using a typical address book application. A mouse was used to select the first letter of the desired contact then scrolling and mouse selection were used to highlight the desired contact.

Each selection was timed from start to completion.

The resultant average seconds per selection were as follows:

| Traditional PC address book | Partial word completion | Pwc proportion |
| --- | --- | --- |
| 8.38 | 5.10 | 61% |

In summary, for this test, partial word completion based list selection applied to contacts lookup using only a joystick compared to traditional personal computer contacts lookup allows for selection in 61% of the time.

The details of these previous two tests are described in the below tables:

|  | Minimum clicks | | | |
| --- | --- | --- | --- | --- |
|  | Partial word completion | | Traditional phone address book | |
|  | By first name | By surname | By first name | By surname |
| Harland Close | 6 | 4 | 3 | 9 |
| Martie Harrow | 5 | 7 | 6 | 13 |
| Harold Reed | 6 | 6 | 9 | 9 |
| Leanora Foster | 5 | 8 | 8 | 10 |
| Wendi Woollard | 6 | 6 | 6 | 11 |
| Rachel Holdsworth | 5 | 5 | 8 | 9 |
| Maurine Lineman | 4 | 6 | 6 | 11 |
| Alanis Hoffhants | 6 | 6 | 6 | 8 |
| Kaylyn Johnston | 7 | 6 | 7 | 13 |
| Deana Cypret | 4 | 4 | 4 | 6 |
| Total | 54 | 58 | 63 | 99 |
| Average | 5.40 | 5.80 | 6.30 | 9.90 |

| Test subject: | Partial word completion | | | Traditional phone address book | | | Traditional PC address book | | |
| --- | --- | --- | --- | --- | --- | --- | --- | --- | --- |
| Adult male | Time | Clicks | Errors | Time | Clicks | Errors | Time | Clicks | Errors |
| Harland Close | 4.62 | 6 | 0 | 1.96 | 3 | 0 | 4.00 | na | na |
| Martie Harrow | 3.12 | 5 | 0 | 6.06 | 6 | 0 | 8.46 | na | na |
| Harold Reed | 3.50 | 6 | 0 | 8.03 | 9 | 0 | 4.62 | na | na |
| Leanora Foster | 3.90 | 5 | 0 | 4.56 | 8 | 0 | 3.62 | na | na |
| Wendi Woollard | 3.75 | 6 | 0 | 10.65 | 6 | 0 | 8.15 | na | na |
| Rachel Holdsworth | 3.21 | 5 | 0 | 6.90 | 9 | 1 | 6.21 | na | na |
| Maurine Lineman | 2.84 | 4 | 0 | 5.15 | 6 | 0 | 4.68 | na | na |
| Alanis Hoffhants | 4.43 | 6 | 0 | 4.50 | 6 | 0 | 8.53 | na | na |
| Kaylyn Johnston | 4.03 | 7 | 0 | 5.28 | 8 | 1 | 4.06 | na | na |
| Deana Cypret | 4.18 | 6 | 2 | 6.46 | 8 | 4 | 5.28 | na | na |
| Total | 37.58 | 56 | 2 | 59.55 | 69 | 6 | 57.61 | na | na |
| Average | 3.76 | 5.60 | 0.20 | 5.96 | 6.90 | 0.60 | 5.76 | na | na |

| Test subject: | Partial word completion | | | Traditional phone address book | | | Traditional PC address book | | |
|---|---|---|---|---|---|---|---|---|---|
| 11 year old male | Time | Clicks | Errors | Time | Clicks | Errors | Time | Clicks | Errors |
| Harland Close | 3.12 | 4 | 0 | 6.68 | 9 | 0 | 4.62 | na | na |
| Martie Harrow | 7.37 | 7 | 0 | 20.28 | 15 | 2 | 12.03 | na | na |
| Harold Reed | 7.84 | 6 | 0 | 12.06 | 13 | 4 | 5.62 | na | na |
| Leanora Foster | 4.78 | 5 | 0 | 5.40 | 10 | 0 | 8.53 | na | na |
| Wendi Woollard | 6.06 | 6 | 0 | 9.40 | 11 | 0 | 9.37 | na | na |
| Rachel Holdsworth | 3.59 | 5 | 0 | 10.25 | 9 | 0 | 18.59 | na | na |
| Maurine Lineman | 8.31 | 6 | 2 | 7.31 | 12 | 1 | 7.90 | na | na |
| Alanis Hoffhants | 7.90 | 8 | 2 | 20.37 | 20 | 12 | 11.68 | na | na |
| Kaylyn Johnston | 7.09 | 6 | 0 | 25.65 | 13 | 0 | 11.46 | na | na |
| Deana Cypret | 7.15 | 4 | 0 | 4.21 | 6 | 0 | 19.25 | na | na |
| Total | 63.21 | 57 | 4 | 121.61 | 118 | 19 | 109.05 | na | na |
| Average | 6.32 | 5.70 | 0.40 | 12.16 | 11.80 | 1.90 | 10.91 | na | na |

| Test subject: | Partial word completion | | | Traditional phone address book | | | Traditional PC address book | | |
|---|---|---|---|---|---|---|---|---|---|
| Adult female | Time | Clicks | Errors | Time | Clicks | Errors | Time | Clicks | Errors |
| Harland Close | 2.65 | 4 | 0 | 11.56 | 9 | 0 | 5.21 | na | na |
| Martie Harrow | 7.21 | 7 | 0 | 20.68 | 13 | 0 | 10.00 | na | na |
| Harold Reed | 6.03 | 6 | 0 | 14.15 | 9 | 0 | 10.31 | na | na |
| Leanora Foster | 6.81 | 8 | 0 | 10.25 | 10 | 0 | 7.75 | na | na |
| Wendi Woollard | 7.50 | 6 | 0 | 14.09 | 12 | 1 | 8.28 | na | na |
| Rachel Holdsworth | 4.09 | 5 | 0 | 10.62 | 9 | 0 | 17.43 | na | na |
| Maurine Lineman | 4.62 | 6 | 0 | 9.21 | 13 | 2 | 6.31 | na | na |
| Alanis Hoffhants | 4.40 | 6 | 0 | 8.15 | 8 | 0 | 7.59 | na | na |
| Kaylyn Johnston | 5.62 | 6 | 0 | 19.43 | 13 | 0 | 4.56 | na | na |
| Deana Cypret | 3.28 | 4 | 0 | 5.87 | 6 | 0 | 7.43 | na | na |
| Total | 52.21 | 58 | 0 | 124.01 | 102 | 3 | 84.87 | na | na |
| Average | 5.22 | 5.80 | 0.00 | 12.40 | 10.20 | 0.30 | 8.49 | na | na |

| Summary | Partial word completion | | | Traditional phone address book | | | Traditional PC address book | | |
|---|---|---|---|---|---|---|---|---|---|
| | Time | Clicks | Errors | Time | Clicks | Errors | Time | Clicks | Errors |
| Adult male | 3.76 | 5.60 | 0.20 | 5.96 | 6.90 | 0.60 | 5.76 | na | na |
| 11 year old male | 6.32 | 5.70 | 0.40 | 12.16 | 11.80 | 1.90 | 10.91 | na | na |
| Adult female | 5.22 | 5.80 | 0.00 | 12.40 | 10.20 | 0.30 | 8.49 | na | na |
| Average | 5.10 | 5.70 | 0.20 | 10.17 | 9.63 | 0.93 | 8.38 | na | na |
| PWC proportion | 100% | 100% | 100% | 50% | 59% | 21% | 61% | na | na |

In still a further test, users of various ages, genders and levels of expertise were asked to select ten music tracks from a music library of approximately 1,000 music tracks as quickly as possible using the two methods described below.

Partial word completion selection was performed through a joystick based music selection application running on a mobile phone.

The comparison system involved selection of music tracks through a music player presenting an onscreen list through which the user can scroll to make their selection using a "click wheel".

Each selection was timed from start to completion. In addition error rates were noted. For the partial word completion based system, an error was defined as key presses made in excess of the minimum required to make the selection. For the click wheel system an error was defined as the user changing direction in their scrolling.

The details of this test included the following results:

| | Partial word completion | | | "Click wheel" player | |
|---|---|---|---|---|---|
| Test subject: Adult Male | Time | Clicks | Errors | Time | Errors |
| Stay With Me Till Dawn | 3.84 | 5 | 0 | 12.40 | 3 |
| To Sir With Love | 3.09 | 4 | 0 | 15.71 | 4 |
| Takin' Care of Business | 3.00 | 5 | 0 | 13.62 | 9 |
| That Don't Impress Me Much [Dance Mix] | 3.46 | 4 | 0 | 13.28 | 2 |
| Does your mother know | 4.31 | 5 | 0 | 7.28 | 2 |
| Strawberry Letter 23 | 2.59 | 4 | 0 | 11.50 | 5 |
| Hairy Piano | 5.31 | 8 | 1 | 8.21 | 1 |
| Hold on tight | 3.84 | 6 | 0 | 8.93 | 5 |
| S-s-s single bed | 2.84 | 4 | 0 | 8.53 | 1 |
| Keep It Comin' Love | 5.68 | 10 | 1 | 10.31 | 5 |
| Total | 37.96 | 55 | 2 | 109.77 | 37 |
| Average | 3.80 | 5.50 | 0.20 | 10.98 | 3.70 |

| Test subject: | Partial word completion | | | "Click wheel" player | |
|---|---|---|---|---|---|
| 11 year old male | Time | Clicks | Errors | Time | Errors |
| Stay With Me Till Dawn | 4.46 | 5 | 0 | 16.71 | 3 |
| To Sir With Love | 5.12 | 4 | 0 | 21.90 | 3 |
| Takin' Care of Business | 5.56 | 5 | 0 | 12.50 | 5 |
| That Don't Impress Me Much [Dance Mix] | 4.40 | 4 | 0 | 23.53 | 2 |
| Does your mother know | 3.81 | 5 | 0 | 7.31 | 0 |
| Strawberry Letter 23 | 3.53 | 4 | 0 | 8.90 | 2 |
| Hairy Piano | 5.68 | 6 | 0 | 34.28 | 11 |
| Hold on tight | 5.62 | 6 | 0 | 19.31 | 3 |
| S-s-s single bed | 3.53 | 4 | 0 | na | na |
| Keep It Comin' Love | 9.93 | 10 | 2 | 37.50 | 5 |
| Total | 51.64 | 53 | 2 | 181.94 | 34 |
| Average | 5.16 | 5.30 | 0.20 | 20.22 | 3.78 |

| Test subject: | Partial word completion | | | "Click wheel" player | |
|---|---|---|---|---|---|
| Adult female | Time | Clicks | Errors | Time | Errors |
| Stay With Me Till Dawn | 4.03 | 5 | 0 | 18.34 | 1 |
| To Sir With Love | 4.59 | 4 | 0 | 7.68 | 1 |
| Takin' Care of Business | 4.84 | 5 | 0 | 11.06 | 2 |
| That Don't Impress Me Much [Dance Mix] | 3.59 | 4 | 0 | 6.12 | 2 |
| Does your mother know | 4.15 | 5 | 0 | 17.65 | 3 |
| Strawberry Letter 23 | 2.62 | 4 | 0 | 21.31 | 1 |
| Hairy Piano | 5.34 | 6 | 0 | 20.09 | 2 |
| Hold on tight | 5.15 | 6 | 0 | 8.25 | 2 |
| S-s-s single bed | 3.78 | 4 | 0 | na | na |
| Keep It Comin' Love | 6.40 | 8 | 0 | 26.65 | 2 |
| Total | 44.49 | 51 | 0 | 137.15 | 16 |
| Average | 4.45 | 5.10 | 0.00 | 15.24 | 1.78 |

| | Partial word completion | | | "Click wheel" player | |
|---|---|---|---|---|---|
| Summary | Time | Clicks | Errors | Time | Errors |
| Adult male | 3.80 | 5.50 | 0.20 | 10.98 | 3.70 |
| 11 year old male | 5.16 | 5.30 | 0.20 | 20.22 | 3.78 |
| Adult female | 4.45 | 5.10 | 0.00 | 15.24 | 1.78 |
| Average | 4.47 | 5.30 | 0.13 | 15.48 | 3.09 |
| PWC proportion | 100% | 100% | 100% | 28.88% | 4.32% |

The resultant average values per selection were as follows:

| | "Click wheel" music player | Partial word completion | Pwc proportion |
|---|---|---|---|
| Seconds | 15.48 | 4.47 | 29% |
| Errors | 3.09 | 0.13 | 4.3% |

In summary, for this test, partial word completion based list selection applied to music track selection using only a joystick compared to music selection on a "click wheel" music player allows for selection in 29% of the time, with 4.3% of the errors.

Finally, a further test involved a user of moderate expertise selecting 7 music tracks from a music library of approximately 500,000 music tracks as quickly as possible using the two methods described below.

Partial word completion selection was performed through a joystick based music selection application running on a mobile phone.

The comparison system involved selection of music tracks through a web site which provided a search engine mechanism to allow the user to refine the search based on artist, album, etc. The user entered a search term and then selected the desired track from the resultant list using the mouse.

Each selection was timed from start to completion. The details of this test included the following results:

| | Seconds taken to perform selection | |
|---|---|---|
| | Partial word completion | Online music site |
| Bing Crosby - Danny Boy | 6.8 | 12.9 |
| Nine Inch Nails - We're in This Together | 9.9 | 10.6 |
| Love over gold - Dire Straits | 8.4 | 11.0 |
| Material girl - Madonna | 7.5 | 11.9 |
| Rikki don't lose that number - Steely dan | 6.8 | 9.5 |
| Run like Hell - Pink Floyd | 8.4 | 11.0 |
| Doctor my eyes - Jackson Brown | 7.2 | 11.5 |
| Girls talk - Dave Edmunds | 8.1 | 8.7 |
| Hungry like the wolf - Duran Duran | 8.1 | 10.2 |
| Average | 7.91 | 10.81 |
| PWC proportion | 100% | 73% |

The resultant average seconds per selection were as follows:

| Online music site | Partial word completion | Pwc proportion |
|---|---|---|
| 10.81 | 7.91 | 73% |

In summary, for this test, partial word completion based list selection applied to music track selection using only a joystick compared to music selection on an online music site using a PC keyboard and mouse allows for selection in 73% of the time.

In general, partial word completion takes less time, requires fewer clicks and results in fewer errors than conventional selection techniques.

In embodiments, partial word completion may require between about 20% and about 85% (e.g., between about 35% and about 50%, between about 40% and about 75%, about 30%, about 45%, about 50%, about 65%, about 75%, and between about 40% and about 60%) less time than that of conventional systems. In embodiments, partial word completion may require between about 20% and about 90% (e.g., between about 25% and about 50%, between about 40% and about 65%, about 30%, about 45%, about 50%, about 65%, about 75%, about 90%, and between about 40% and about 75%) of the clicks required in conventional systems. In embodiments, partial word completion may result in between about 15% and about 95% (e.g., between about 25% and about 50%, between about 40% and about 55%, about 30%, about 55%, about 50%, about 65%, about 75%, about 90%, and between about 40% and about 70%) fewer errors than that of conventional systems. In embodiments, the invention may benefit from any combination of these improvements, including, but not limited to, for example, partial word completion may require between about 20% and about 85% (e.g., between about 35% and about 50%, between about 40% and about 75%, about 30%, about 45%, about 50%, about 65%, about 75%, and between about 40% and about 60%) less time than that of conventional systems; between about 20% and about 90% (e.g., between about 25% and about 50%, between about 40% and about 65%, about 30%, about 45%, about 50%, about 65%, about 75%, about 90%, and between about 40% and about 75%) of the clicks required in conventional systems, and/or may result in between about 15% and about 95% (e.g., between about 25% and about 50%, between about 40% and about 55%, about 30%, about 55%, about 50%, about 65%, about 75%, about 90%, and between about 40% and about 70%) fewer errors than that of conventional systems.

In embodiments for implementing a partial word completion based system the functions there may be two main components, the interface and the engine. The components can be separate or combined. Additionally, this implementation is exemplary, other implementations of the present invention do not have to follow this architecture and other implementation methods are possible. The roles of the interface component and engine component described herein may be shifted such that one component performs some of the roles of the other component. Alternatively there may be no separation of components in the system such that the partial word completion based selection process is entirely handled by one module, or there may be many more modules than described herein to implement the system. Although the separation of tasks into the interface component and the engine component may or may not exist in an embodiment of a partial word completion based system, it does not necessarily reflect a separation implemented in the architecture of the system. The interface component and the engine component or any other combination of processing modules may coexist in any configuration including: within a computer application where the two components are implemented as objects or functions within a computer application or similar; within a device where the two components are implemented as separate systems running on the same device, for example: the interface component could be implemented in an application which is communicating with an engine component which is implemented as a server application running in the operating system of the device (in embodiments, the partial word completion engine component server may be providing its services to several connected interface component applications); between devices or systems over some communications mechanism (including wired or wireless networks, serial or parallel communications, or any other means for computing systems to communicate within or between devices).

In certain configurations, a list being selected from could reside remotely with the engine component and hence have the benefits of being centrally located and maintained and applications on devices could provide partial word completion based access to this data from applications running on remote devices via communications between the partial word completion based interface application and the engine component located on a server and accessed by the communication means. In addition, the functions of the engine component may be distributed between locations. For instance a system may have multiple dictionaries being accessed simultaneously with those dictionaries being at different locations (possibly one remote and one local to the device). A communication mechanism would be used to access the various engine component sections to derive the options to present for partial word completion selection.

In embodiments, partial word completion implementation may require a dynamic means or way of displaying one or more partial word options and control mechanism or means that the user may use to indicate which of the one or more options presented they want to select. In certain embodiments of the present invention the dynamic means or way of displaying the partial word option would include any or numerous methods. Some of the options would include, but are not limited to, a small screen on a device, a large screen such as a television connected to a device, a "dialog" on a screen where the information is presented in a section of the screen whilst leaving other images or applications to use the rest of the screen, a system for audibly indicating the current options, presentation by touch, or any other means that conveys the information and combinations thereof.

Furthermore, the entry may be displayed separately or within some broader text such as a document being edited. In embodiments, the system could indicate which word was being edited possibly by underlining it and partial word completion options would be appended to this word within the document as they are selected. Alternatively, in embodiments, the system may not present the entry at all, in which case the user may be expected to maintain their own memory of what has been entered so far.

In the present invention, partial word completion implementation may also require a control mechanism or means used by the user to select the desired option from the one or more options presented to them. Examples of the control means the user may use to indicate which of the one or more options presented they want to select, include, but are not limited to any of the following or combinations of the following: a joystick; "dPad", a switch with the ability to indicate selections through two or more movements, an array of buttons, touch sensitive zones or other user input mechanism with some indication of how each button corresponds to a dynamic menu option, (e.g., side keys where buttons are placed adjacent to the edge of the screen and option labels are displayed on the edge of the screen opposite the corresponding button); pedals; movement sensors in a device, gesture based interfaces detecting movements of the body of the user by means of cameras, motion sensors, or other means, a touch screen where the user presses the portion of the screen corresponding to the desired option using fingers, a stylus or some other means, auditory input—using sound to indicate a selection, time based selection where a device could indicate selections cycled through over time and the user indicates a selection by activating some control means at the time that the desired option is indicated, and wheel based selection where the user may scroll through options to highlight the desired one and then perform some action to select it.

In conjunction with, or instead of, the above there may be controls with static option strings that may be for options that are sufficiently common to warrant a permanent, dedicated control input. These controls may or may not have labels indicating their function.

In embodiments, the system may present all possible options and thus present a variable number of options each time or provide, for example, a control means used to indicate the "more" function for the user to activate to indicate that their desired option has not been-presented instead of selecting one of the one or more options presented. The mechanism for this control means could also include any of the ways listed above for the option selection control but, due to the fact that the "more" option may be provided by some action which does not vary—it may also be provided by a simple static button, switch, etc. which does not need a dynamic means for indicating its function.

Additionally, the controls may include an input means which allows the user to explicitly enter characters. This could include, for example, a computer keyboard, mobile phone keypad, an on-screen keyboard on a touch screen device, and the user may take this option if the partial word completion system is not presenting the partial continuation that the user desires for the current string input. In certain embodiments, this may be an alternative to use of a "more" function for situations where explicit input is for some reason preferable or the Partial Word Completion system does not provide a "more" function. When the user enters explicit characters, the partial word completion menu may have to update itself to reflect the completion options for the newly entered word part. Although, with the option of entering explicit characters, the user may enter a word part that does not correspond to any words known to the Partial Word Completion system which may then result in the menu showing no options to select and may need to be flagged as an error to the user if the system restricts input only to strings in the Partial Word Completion database. The selection process may be carried with zero or more rounds of menu selection or explicit entry combined in any order.

Any other means for continuing input where the presented options do not correspond with the text that the user intends to input may also be used.

In addition to the above minimal configuration, it may be desirable to also provide a "back" or "undo" function to allow the user to return to a previous state if they inadvertently made a selection or performed an action they didn't want. This also can be provided through any static or dynamic input means similar to the "more" function.

Some examples of interfaces for applications using partial word completion may include, for example: a minimal configuration with a display of the entry so far and a single line menu display which indicates a single option with two buttons: one to indicate selection of the displayed item, the other to indicate "more"; a 5-way joystick where the options are presented in a menu as in the example illustrated in FIGS. 9A-9F. Four options being presented as movements in the 4 directions of the joystick, and a press in of the joystick indicating "more"; a 5-way joystick similar to the configuration in the previous item but only 3 of the directions are used to present options (e.g. left, up and right) and the remaining direction indicating "back" to return to a previous state after an inadvertent action, and a press in of the joystick indicating "more"; a touch screen device like a personal digital assistant presenting a grid of 3 by 3 onscreen buttons wherein the top 6 buttons may be partial word completion options for the user to select by pressing them and the bottom left being "back", the bottom right being "more", and the bottom middle button being available for some other application specific operation; a gesture based console game where the Partial Word Completion device is using a television screen to provide the menu of options in a circle of 4 options with the "more" option being in the middle (e.g., the system would monitor the user's arm movements and use them as indications of selections of the options, a punch in the direction of the middle of the screen may activate "more"); a personal computer where a four-way menu is displayed with options being selected by presses of the arrow keys wherein the "more" function could be provided by a press of the "Enter" key and the main keyboard could be used to enter explicit characters where the user wanted to bypass Partial Word Completion entry for some or all of the text.

The above is just a short list of the many possibilities of implementations of partial word completion applications. Many other means of implementation of the present invention are possible and the above is not meant to exclude these other possibilities.

As discussed herein, in order to implement a partial word completion based system on a computing device using any interface means the system may use an interface component and an engine component. The interface component performs the management of the user input and output and queries the engine to supply the Partial Word Completion options strings to be presented in the menu for selection by the user activating some input means. The engine component performs the internal logic of determining the best partial word completion strings to be presented and it may be supplied with the following exemplary pieces of information: the "entry so far", i.e. the part of the word or item being selected that has been entered so far, a list identifying zero or more menu items that have already been presented and rejected due to a "more" press or a number indicating how many levels in the menu to go down (e.g. how many times the "more" button has been pressed on the current entry so far), and the number of menu options to return.

As described herein, the user interface format could vary greatly and the number of options presented and the means by which they are presented and selected could vary as well. This is why the engine component may take as one of its parameters the number of options required. In the case of a system using a joystick based menu such as those illustrated in FIGS. 9A-9F the system would request four options (one for the menu locations for up, down, left and right). Other interface variations may require other numbers of options from one upwards.

Figure 10:
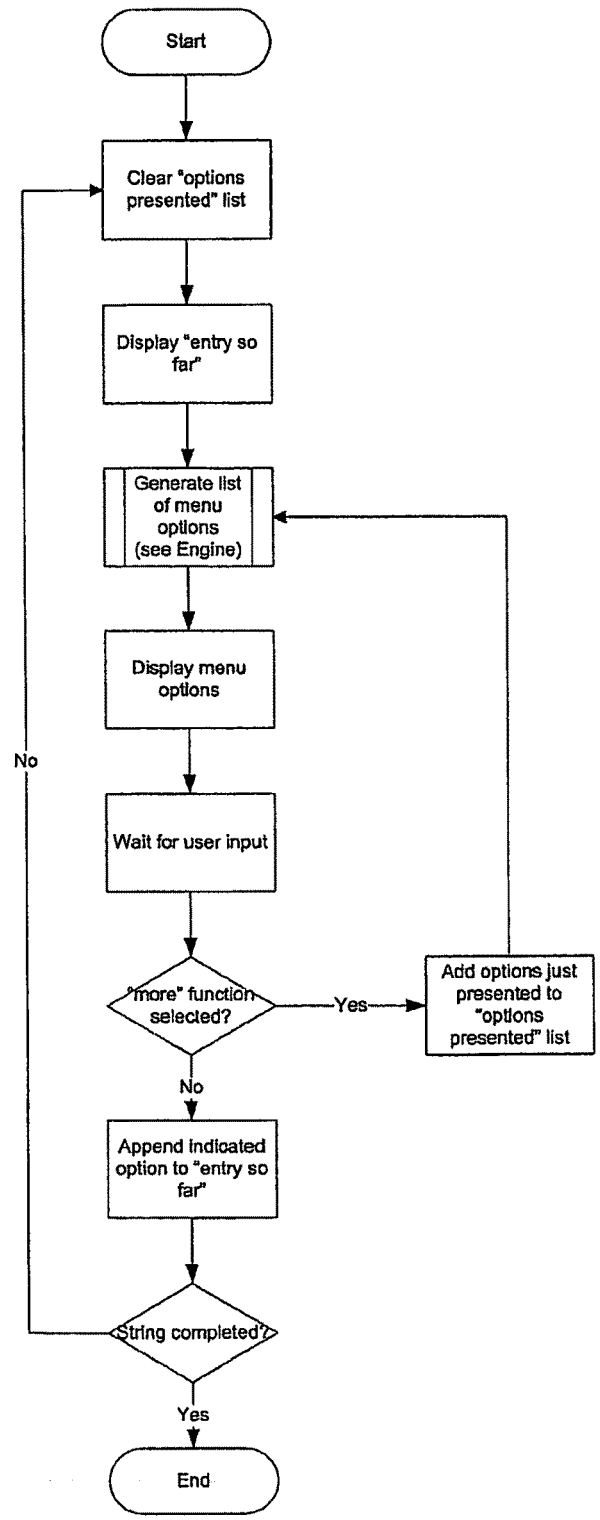
FIG. 10 shows a flowchart for interface component logic in accordance with an embodiment of the present invention.

FIG. 10 illustrates a flow chart which summarises the logic that the interface component would apply to allow list selection based on Partial Word Completion menus in certain embodiments of the present invention. In this particular embodiment, throughout the process from start to end, the system maintains the state of two items of data: (1) the entry so far, i.e., the part of the word or item being selected that has been entered so far, and (2) the options presented list, a list identifying zero or more menu items that have already been presented and rejected due to a "more" press. At the start point, the "entry so far" may be empty or it may have the beginning of a string which has been entered prior to beginning Partial Word Completion selection. In the flowchart, the system starts by clearing the list of "options presented". Next, the system uses its output means to display the entry so far. The system then calls the engine component providing it: the "entry so far", the "options presented" list and the number of options it requires. The engine component will then return a list of options to present which would number from zero up to the maximum number of options specified. The system then populates the options menu on the output means with the items returned. The system then waits for the user to make some input action. Next, if the input action is the action that activates the "more" function then the system appends the list options it has just presented to the "options presented" list so that the engine component will not present these again, it then returns to the calling step above. The option that has been specified by the input action is then appended to the "entry so far", extending the string that is being entered. Lastly, if the string is complete then the system exits, otherwise it goes back to the first step for further input. This flowchart represents an implementation of processing to operate a partial word completion menu system.

The present invention contemplates other implementation systems with additional logic steps. For example, in certain embodiments the system may also provide a "back" function which may result in the last action being undone. This would be incorporated as an additional test for the appropriate input action after the "Wait for user input" stage. If this action is detected, the system may undo the last action then go back to the second step discussed above. The system may also allow for input actions to perform explicit character entry. This also would be tested for after the "Wait for user input" stage. If this action is performed the character specified may be appended to the entry so far.

In order for the engine component to respond to a request from the interface component to supply a set of options to present, the engine component in certain embodiments may have knowledge of: the "dictionary data" that that the system should use to base its menu option suggestions on—this may be a reference to a file, a pointer to internal memory or any other means of indicating the location or contents of the data—this data may be in any format that can be processed by the engine component; the "entry so far", i.e. the part of the word, string or item being selected that has been entered so far; the "rejected options"—the menu options that have already been presented and rejected through selection of the "more" function (if any) by the user for the current "entry so far" or a number indicating the number of full menus of options that have been rejected through the "more" function (if any) for the current "entry so far"; and the "number of options"—the number of menu options to return. The above knowledge can be obtained in a number of ways it may, for example, be supplied at the time of the interface component request, maintained in memory between requests, and/or calculated from some other information.

There are numerous possible methods for the interface component to provide the above information to the engine component. For example, a stateless set is a set of parameters that is highly versatile. All the information needed to derive the set of menu options is supplied at the time of request and there is no assumption made that the engine component has maintained any information about the state of the entry/selection process. When the interface component makes a call to the engine component to provide it with a set of menu options, it may provide the exemplary parameters discussed above.

An exemplary variation of this may be to replace the list of options already presented with a number indicating how many full menu sets of options have been rejected for the current "entry so far" through the selection of the "more" option. With this information, assuming the "dictionary data" and the "number of options" hasn't changed between requests, the menu items that have been rejected through the "more" option can be calculated. For example, if there have been two menus rejected through the "more" option and the "number of options" is 4 then the system would determine the first 8 items that would be presented and bypass them (as they have previously been rejected by the user for the current "entry so far") and return the subsequent 4 items in the lookup logic.

Additionally, if the application level state is maintained this is a more pragmatic approach (as compared to the stateless set) whereby information that is not likely to vary between requests is maintained by the engine component. This information may include the "dictionary data" and the "number of options". When the interface component makes a call to the engine component to provide it with a set of menu options, it may provide the following parameters: the "entry so far"; the "rejected options"—a list identifying zero or more menu items that have already been presented and rejected due to a "more" press for the current "entry so far". A variation of this, as discussed above, may be to replace the list of options already presented with a number indicating how many full menu sets of options have been rejected for the current "entry so far" through the selection of the "more" option.

In a transaction level state maintained embodiment, the engine component maintains a memory of previous calls from the interface component for one or more selection/entry transactions and/or the current state of the selection process such that the interface component may only have to supply information about the last action the user performed and the engine component updates its state information and responds with the menu options accordingly. In this mode the interface component may not need to maintain state information but, if the engine component is tracking more than one transaction at a time, the interface may need to maintain a knowledge of an identifier to identify to the engine component the transaction that corresponds to that instance of the interface component. As with the "Application level state maintained" mode described above, in this mode the engine component is likely to maintain knowledge of the "dictionary data" and "number of options" such that this information does not need to be supplied at each request. When the interface makes a call to the engine component to provide it with a set of menu options, it may provide the following parameters: a transaction identifier if the engine component is able to maintain multiple transaction states, and the action last performed by the user, this may include, for example, Start—to start or restart the selection, clear the "entry so far" (note—the system may provide the option to have an "entry so far" value supplied on this call such that the selection starts at a particular "entry so far"); More—reject the last set of options presented and go to the next set of options for the current "entry so far"; Back—undo the most recent action, and revert back to the previous state including the previous menu and "entry so far"; Selection—An identifier indicating that one of the menu options has been selected and which one—the engine component may react to this by appending the siring for that selection to the "entry so far" and then presenting the initial menu of options for the new "entry so far"; Reload—indicates that there is no change of state required for this request—this call may be useful when the interface wants the engine component to report back its state information; and/or End—finish the current transaction.

As with other parameter set modes, the engine component is likely to respond to requests with a set of menu options for the interface component to present. But in this mode, as the engine component is maintaining the state of the transaction, it may be beneficial for the engine component to respond with additional information such as: the "entry so far"; and the transaction identifier—this may only be returned on a "Start" action to be retained by the interface component and supplied as a parameter to subsequent calls, or returned on each call as a verification mechanism. In order to implement the engine component for providing the present invention on a computing device several components should be considered: source data—what form will the source data be in to make up the options that are presented and how will this data be imported into the system, internal data—the system may find it advantageous to process the source data into some other format to expedite the processing and presentation of the Partial Word Completion options, lookup logic—what is the process of analysing the data to devise the best set of options to present at any particular state of string entry or selection.

In general, the internal implementation of the system could take several approaches, for example, the static tree index and the dynamic tree index In the "static tree" methodology, the system maintains internal data in a tree form reflecting the structure of the menu of options to be presented to the user as they navigate a selection as opposed to the structure of the source data strings. Unlike dynamic tree structures (discussed below), static tree structures are more limited in their ability to dynamically change the priorities and hence the order in which options are presented without the need for a restructuring of the internal data. Static tree structures have the advantage of requiring minimal processing by the application to determine the desired menu options at a particular point in the selection process. This facilitates, in certain circumstances, partial word completion based selection to run more efficiently on computing devices with limited processing power. When a set of partial word completion options are needed, the internal logic traverses the tree and returns the best options to present. For example, a partial word completion based system may determine and present a series of menus of options for the user to select from. As the user selects options and builds up their selection to the point where the full text of the item is entered a tree structure of menu items is navigated through. If a system was to take the role of the user and traverse the tree of options that were generated by a partial word completion based selection mechanism and store the contents of each menu at each level by following all branches in turn to the end points, the system would build up an internal tree structure which directly reflected the menus to present for navigation to any of the items that have been indexed. Embodiments using a static tree structure may be based on the structure of the menus to be presented as selections are made. As such a static tree structure may be specific to a particular value for the number of menu items being presented, e.g. a static tree structure generated for a system presenting 4 items at a time may not be capable of being used efficiently to generate options 5 at a time.

Figure 9A:
FIGS. 9A-9F show a menu sequence for selection of the song "Black or White" using joystick based Partial Word Completion; in accordance with an embodiment of the present invention.
Figure 9B:
Figure 9C:
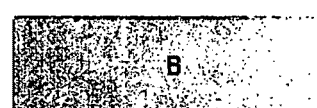
Figure 9D:
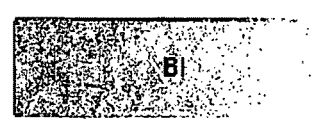
Figure 9E:
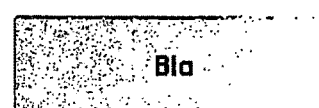
Figures 9F, 11:
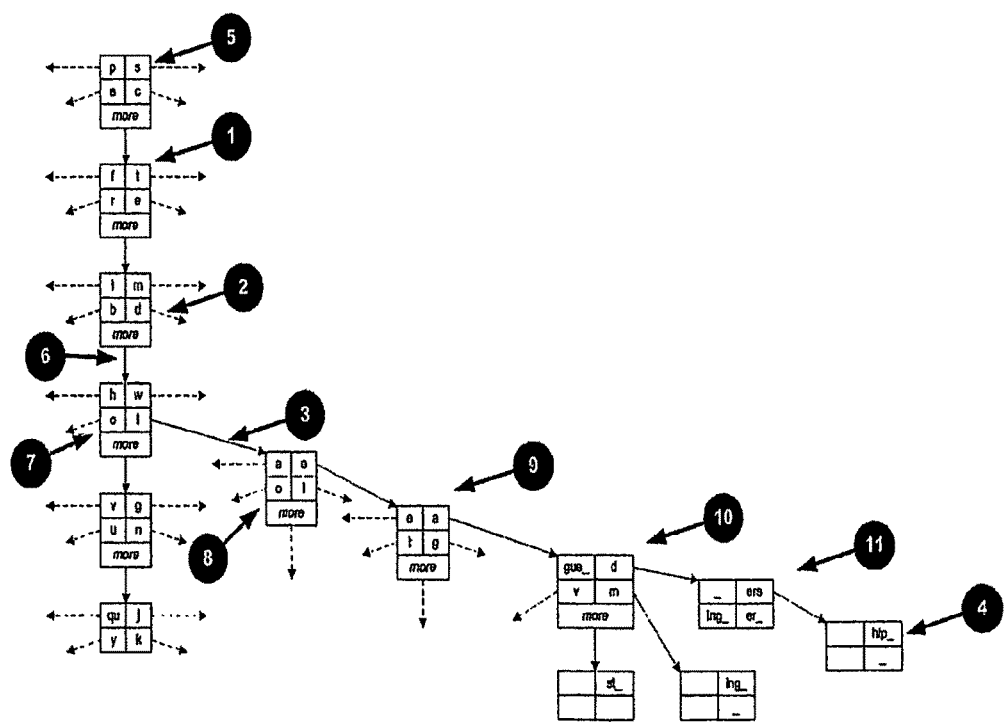
FIG. 11 shows an internal static data tree diagram out of a sample of approximately 2,500 words showing the branch for menus leading to a selection of the word "leaders" in accordance with an embodiment of the present invention.

FIG. 11 illustrates a sample section of a static tree structure. Each node in the diagram (1) represented by a rectangular box corresponds to a menu to be presented. The tree structure illustrated is for a partial word completion based system which is presenting four options plus, possibly, a "more" option on each menu. This may be typical for a joystick driven system when the four options correspond to joystick movements in the directions up, right, down and left and the "more" option is some other action such as a press in the middle of the joystick. As shown in FIG. 11, the selection of an option leads onto another menu (and hence another node (1)) this is represented by a directional line ((2) and (3)) showing the links. Links (2) with a dashed line indicate that the selection of that item leads onto further menu branches but they have not been illustrated in FIG. 29, however links (3) with a solid line indicate that the selection leads on to further menus and these have been illustrated in FIG. 11. Where a selection has no link line off it such as that illustrated by (4) this is an end selection. When the systems allows the user to traverse through the menus from the from the root node (5) to an end selection and concatenates the strings of each selection in sequence they would build up the string associated with the end selection reached. For example, if a system traverses to the end selection (4), it would build up the string sections: "l", "e", "a", "d", "ers", "hip" making the word "leadership". The selection of a "more" option navigates to the indicated menu but does not result in the appending of any string sections.

The static tree structure is menu-oriented and an efficient way for the interface component to issue requests to the engine component would be by using the "transaction level state maintained" communication method described above. This does not preclude the use of one or more other methods to pass information between the interface component and the engine component. As such it is possible that the "rejected options" data is more likely to be the number of rejected full menus rather than a list of rejected options as the latter could theoretically result in an option set to be presented that does not mesh with the menu structure in the static tree. For example, if the "number of options" is 4 then having 2 menus rejected is simply a matter of bypassing those menus in the tree structure, however, having 6 menu options rejected when the first two menus are composed of 8 menu options may not be compatible with data in a static tree structure. The following description of the lookup logic for the system assumes that the system is using the "transaction level state maintained" communication method described herein.

Given the information described herein, the engine component must traverse the tree to identify the appropriate menu option set to return to the interface component to present to the user. In one embodiment of the system the engine may maintain a memory of the "current menu" pointer. On a request from the interface component for a menu option set, the system may apply the following logic on each call to the engine component to traverse the static tree and return to the interface component the options it should present. At the start of a selection or when the action parameter supplied was "start", the system would move the "current menu" pointer to the initial menu (in FIG. 11 this is indicated with (5)) and clear the "entry so far". If the parameter is "more" and the "current menu" has a "more" option, the "current menu" would be moved to the menu indicated by the "more" link in the node (for example (6)) and no text would be appended to the "entry so far". If the parameter is "back" then the system would revert back to the previous state including the previous menu and value of "entry so far"—this may entail moving the "current menu" pointer back to its previous location, or if the "current menu" is at the initial menu, removing the last appended string from the "entry so far". If the parameter indicates an option has been selected then the string for that option may be appended to the "entry so far" and the "current menu" may be moved to the menu linked to by that option in the current menu. For example, if the "current menu" is that indicated by (7) in FIG. 11 (and hence the user is presented with the four selections: "w", "l", "o" and "h") and the user selects "l" then "l" may be appended to the "entry so far" and the "current entry" may be moved down the corresponding link (3) to menu node (8) and the new menu with values: "e", "i", "o" and "a" may be presented to continue the text starting with "l". If there is no link corresponding to the selected option, then this is the end of a selection—this may be indicated to the calling system by appending some end-of-word character to the "entry so far". If the parameter is "reload" the system may not make any changes to the state.

After each of the above actions, the system then may return the strings that correspond to each of the options in the "current menu", if the system has reached an end selection, there may be no options returned. The system may also return the "entry so far" or information about how the "entry so far" string has been modified by the last action (e.g. "append 'l'") so that the interface component can present the modified entry so far.

In an exemplary explanation of this logic the user may intend to enter the word "leadership". The interface is based on a five way joystick input with a menu indicating partial word completion options in four directions of movement of the joystick similar to the menu in FIG. 9A. The interface component would initiate the selection by calling the engine component with a "start" action. A possible sequence of actions based on the internal static tree structure illustrated in FIG. 11 would follow the sequence illustrated in FIG. 12.

As disclosed herein with partial word completion based list selection systems, it is possible to apply a priority to the items being selected from. Depending on the lookup logic, a higher priority for an item can result in the string sections that make up that item appearing higher in the tree of menus presented and hence the item being quicker to select than lower priority items.

The determination of a priority for an item may be as simple as allocating a fixed value to each item. However, much greater power and usability can be provided to the system if the priority is allocated based on some metric which reflects the likelihood that a particular item is the one that the user is trying to select. This priority may be static and set at the time of the installation of the system, or dynamic and changing between or within selections depending on the state of historical and current data maintained by the system.

In embodiments, it may be advantageous to keep track of usage of the system and adjust the priority based on the likelihood of an item to be the one that is the current desired selection. Some mechanisms that could be used to adjust the priority to reflect this may include, for example, frequency, location, time, and sequence. In the frequency based mechanism, items that are more frequently used or selected have higher priorities. For example, on a music player, the user may have a favourite song which they select to play frequently; this song could be given a higher priority to make selection of it quicker. In the location based mechanism, if a device has access to the current location it could take this into account in adjusting the priorities of items based on knowledge of the likelihood of selection of items at the current location. For example, an address book lookup system on a mobile phone may take into account the cell that the user is currently in and make contacts that are accessed more frequently in the current cell have a higher priority—thus people the user calls at the office, for instance, will have a higher priority when they are at the office. In the time based mechanism, priority could be based on the current time of day and/or day of week whereby items that are more often selected at the current time get a higher priority for that period. For example, a system allowing selection of favourite web pages may have recorded the fact that the user often reads a particular web page in the morning, such as a local news web page, in this case, around this period the system could give that web page a higher priority and hence improve the ease with which it is selected for that period. In a sequence based mechanism, the user may have a history of following a particular selection with another particular selection. If this was the case, the system could increase the priority of the second item once the first items was selected. For example, a system may be providing the ability to look up stock quotes and the user usually checks their stocks in order. Once the user selects a particular stock to view, the system could apply historical information to increase the priority of the stock(s) that the user generally views following that selection.

In exemplary dynamic tree implementations, the system maintains internal data in a tree form reflecting the structure of the text's supplied in the source data. In conjunction with each text, there may be an associated priority value which may influence the relative priorities of the items in the tree when the system is performing the analysis of which items to present as partial word completion options. This structure provides the ability to dynamically change the priorities and hence the sequence that options are presented without the need for a restructuring of the internal data. This facilitates applications which have priorities changing dynamically such as increasing the priority of words that are used more frequently. When a set of partial word completion options are needed, the internal logic traverses the tree and returns the best options to present. The tree structure is built up from some raw data. The simplest form of this data would take the form of a list of strings with, optionally, an associated priority value for each string. If the data has no specified priority values the system can assign each string a constant value such as 1, this would allow the system to function but would remove any advantages of prioritisation.

FIG. 13 is a table showing a section of a word list for English out of a total list of 2,500 words. The section includes all words starting with "l" as well as some words before and after these words. All words forming the branch for words starting with "lea" are indicated in bold. It is from this list that the tree in FIG. 14 has been built up. In addition to a simple flat list, the data may come from any other source which could supply a set of strings with, optionally, a priority value for some or all of the strings. The data may come from a feed from a database for instance. Alternatively the system may avoid the pre-processing stage of translating such a list and be provided the data directly in the tree structure described in the next section.

Figure 14:
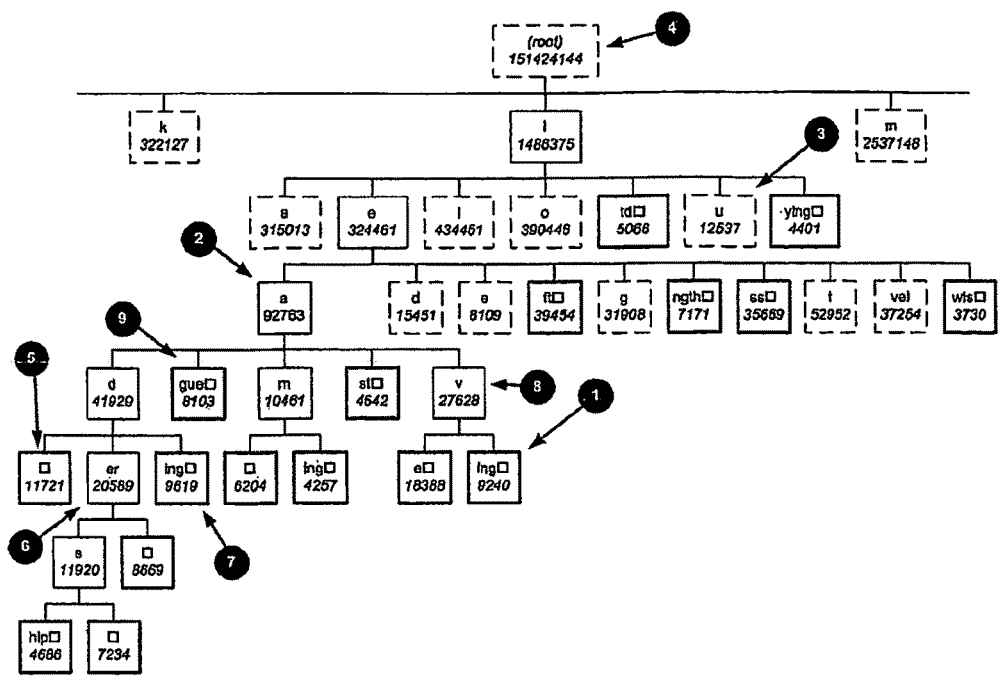
FIG. 14 shows an internal dynamic data tree diagram out of a sample of approximately 2,500 words showing the branch for words starting with "lea" in accordance with an embodiment of the present invention.

FIG. 14 illustrates a section of an example dynamic tree structure for a dictionary. The section illustrated shows a region of the tree around the branch containing words starting with the letter "l". In the figure, each box represents a branch node or leaf node. Boxes with a bold border such as that indicated by (1) are leaf nodes which are at the periphery of the tree and correspond to the end of an item. Nodes with a thin solid border such as that indicated by (2) are branch nodes which have all the branches below them expanded in FIG. 14. Nodes with a dashed border such as that indicated by (3) are branch nodes that have branches below them but these have not been fully expanded in FIG. 14. As illustrated in FIG. 14, each node may have the following information associated with it: a string section of one or more characters or symbols which corresponds to that location; a priority value; for leaf nodes this may correspond to the priority for the item that that node is the termination of, for branch nodes it is the sum of the priorities of all the nodes below it; a pointer to zero or more child nodes; a pointer to the patent node; and optionally a link or identifier or additional data describing an action to be performed when that node is selected or other data associated with the node/item selected. For example, in a contacts application, leaf nodes may have a phone number to call when the leaf node is reached; or in a database lookup scenario, each leaf may contain the database identifier of the database item(s) that it corresponds to so that navigating to that node in the tree enacts the selection of the corresponding item(s) from the database and the application would then perform the appropriate actions on those selected items such as bring up a form to edit the items' details. If a program traverses from the root node (4) to any leaf node and concatenates the strings of each node in sequence they would build up the string associated with the leaf node reached. For example, if a system traverses to the leaf node (1), it would build up the string sections: "l", "e", "a", "v", "ing" making the word "leaving" which, based on the priority field in leaf node 4, has a priority of 9240. In FIG. 14 it can be seen that the branch composed of all words starting with "lea" has been fully expanded. The top of the branch is indicated by (2).

To assist processing, each string may have an "end of word" symbol added to it. This allows a word termination to exist as a separate branch to other branches which are further continuations based on the same string. An example of this is the word "lead". In FIG. 14 the branch to the complete word "lead" ends at node 5, however, there is also a branch node leading on to words starting with "leader" (6) as well as another termination node competing the word "leading" (7).

Figure 15:
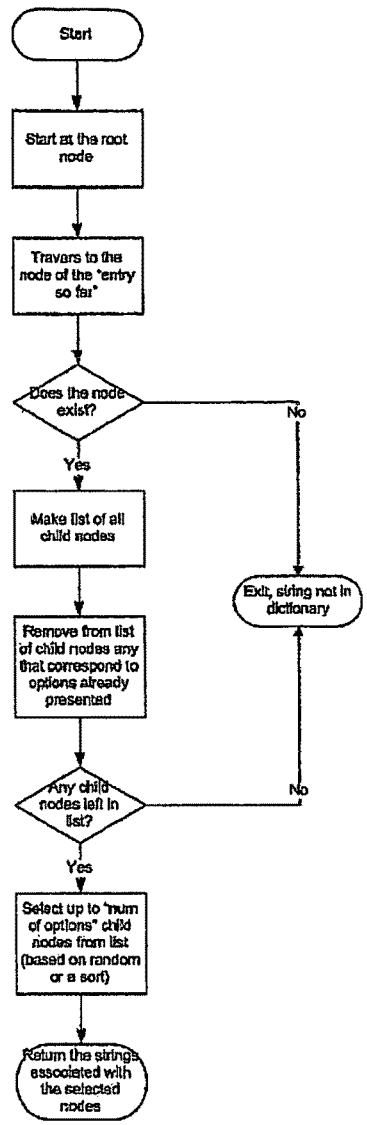
FIG. 15 shows a basic engine component lookup logic flowchart in accordance with an embodiment of the present invention.

In one embodiment of the system the engine component could choose the candidates for presentation by the simple logic of returning the child nodes of the "entry so far". FIG. 15 represents a flowchart of the logic that may be applied to do this. The system would start with a pointer at the root node of the dictionary. It would the traverse the tree to the node corresponding to the supplied "entry so far". If no corresponding node is found then the engine component would respond to the interface component to indicate that the supplied "entry so far" is not a known string in the dictionary. The interface component would then respond to the user according to the task being performed. In the case of text entry, it may provide an explicit character entry facility to spell out a word and then have that word added to the dictionary for subsequent entry. In the case of list selection the interface component may inform the user that the desired selection is not available. If the node is found then the system would compile a list of all the child nodes of that node. The system would then remove from that list all nodes of menu options that have already been presented. If, after the above step, there are no nodes left in the candidate list then the system would respond to the interface component that the entry was not found as in step 3 above. If the number of candidates is less than the supplied parameter "number of options" then the system would return all the candidates in the list, otherwise the system would select "number of options" items from the candidates and return them. The selection of the subset of nodes to return from the list and the order that those nodes are presented could be based on the objects with highest priority first, or random selection, or the first candidates based on some sort such as alphabetical order or some other means.

For example, if the user has entered the string "lea" and intends to enter the word "leaving". The interface is based on a five way joystick input with a menu indicating Partial Word Completion options in four directions of movement of the joystick similar to the menu in FIG. 9A. The first call from the interface component would specify the following parameters: (1) entry so far: "lea", (2) menu items already presented: none, and (3) number of options: 4.

Referring to FIG. 14, the system would start at the root node (4) and, based on the entry so far ("lea") traverse to the branch node 2. From that node it would identify all the child nodes (all the nodes below (2) in FIG. 14: "d", "gue_", "m", "st_" and "v"—note the character "_" is being used here to represent an end of word character). From these 5 candidates, if it was selecting based on alphabetical order it would return the 4 menu options: "d", "gue_", "m" and "st_". The interface component would then present these four options in the menu for the user to select from. As none of these options leads on to the user's desired word "leaving" they may select a "more" function, in which case the interface component may call the engine component again with the following parameters: entry so far: "lea"; menu items already presented: "d", "gue_", "m" and "st_"; and number of options: 4. Once again the system would traverse to node 2 in FIG. 24 and it would then identify the same five child nodes as candidates ("d", "gue_", "m", "st_" and "v") and then it would remove from this list of candidates the menu items presented already ("d", "gue_", "m" and "st_") leaving one candidate item ("v"). As the number of candidates (1) is less than the "number of options" (4)—all the candidates would be returned to the interface component for presentation. The interface component would then present the one option returned ("v"). As this is a continuation of the word the user wants to enter, they would operate the input means to select that option. The interface component would then make another call to the engine component with the following parameters: entry so far: "leav"; menu items already presented: none; and number of options: 4. The engine component would then traverse to node 8 in FIG. 14 which corresponds to the string "leav". It would then build the candidate list of the two child nodes ("e_" and "ing_") and as they number less than "number of options", both would be returned as options to the user interface component which would then present them for selection to the user. The user then selects the option "ing_" and their word or selection is complete.

Using this "basic lookup" logic, once the tree structure has been built, the system managing the data may remove the priority figures from the nodes as this may not be necessary for determining the options to return. Even with the system wanting to present the options in priority order, as long as the tree structure reflects the correct ordering of the options such that they can be returned based on that ordering, it may not be necessary to maintain storage of the actual priority value. Removing this data from the tree structure should result in less storage being necessary for the data. The above sequence is a viable implementation of partial word completion menuing and provides a means of selection of menu options. The following table summarises another example (selection of the word "leaders"):

| step | entry so far | already presented | number of options | options returned | user action |
|---|---|---|---|---|---|
| 1 | "lea" | none | 4 | "d", "gue_", "m", "st_" | select "d" |
| 2 | "lead" | none | 4 | "_", "er", "ing_" | select "er" |
| 3 | "leader" | none | 4 | "s", "_" | select "s" |
| 4 | "leaders" | none | 4 | "hip_", "_" | select "_" |

The above took four steps but it can be seen that in steps 2, 3, and 4, less options than the "number of options" value (4) were returned.

Figure 16:
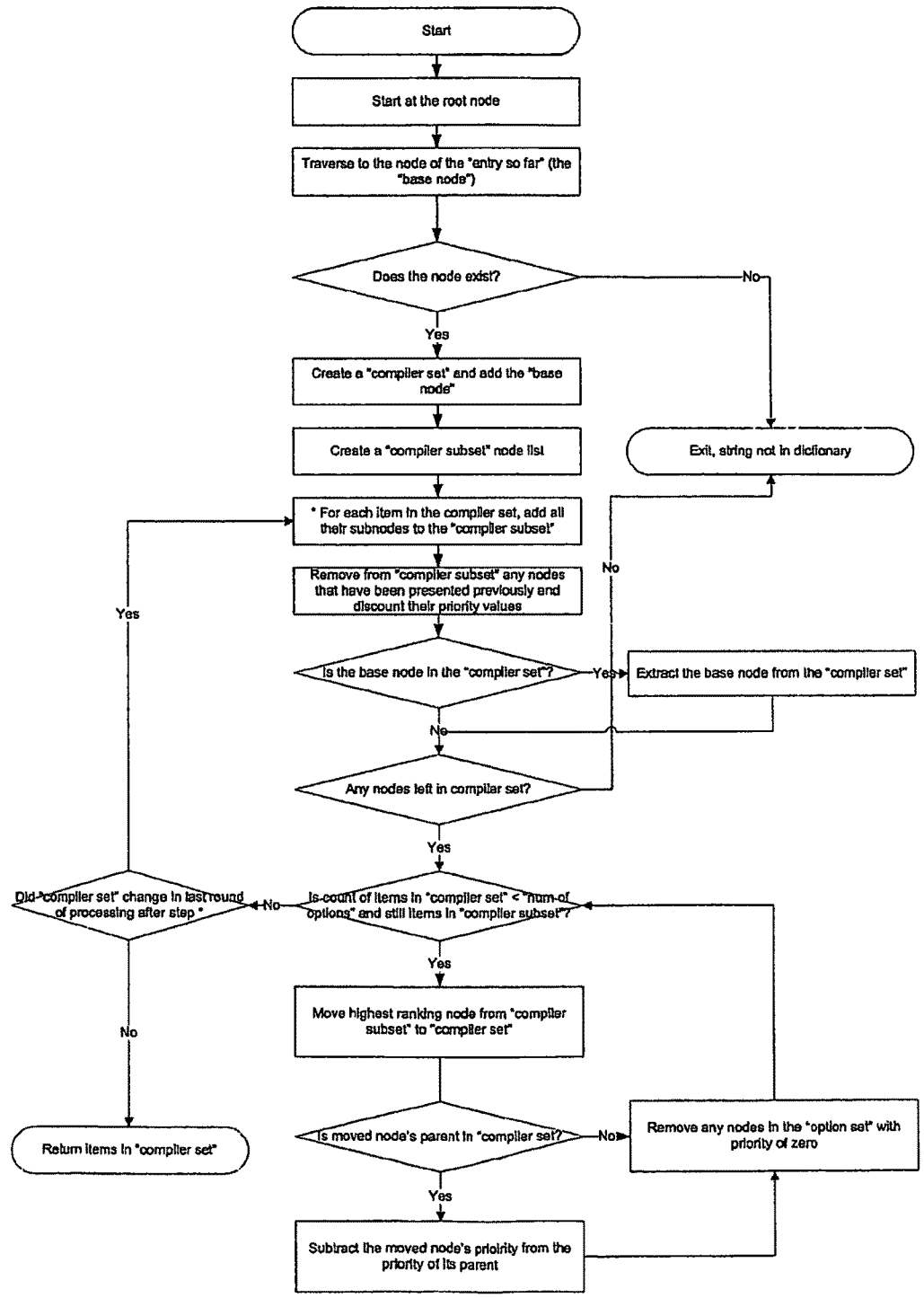
FIG. 16 shows an advanced engine component lookup logic flowchart in accordance with an embodiment of the present invention.

In another embodiment the logic used may perform additional processing when the child nodes were selected. This would fill out remaining slots in the menu by travelling further down the tree and picking the higher priority nodes further down the branch until all the "number of options" slots were full. One method for doing this is illustrated in the flowchart at FIG. 16. The system would start with a pointer at the root node of the dictionary. It would then traverse the tree to the node corresponding to the supplied "entry so far" (the "base node"), create a list for holding nodes (the "compiler set") and put the "base node" in it, create an additional list for holding nodes (the "compiler subset"), for every node in the "option compiler list" get all their child nodes and put them in this list, remove from the "compiler subset" any nodes that have already been presented (and rejected as a result of the user selecting the "more" function), and subtract their priority value from their parent's so they no longer contribute to this round of processing. If the "base node" is still in the "compiler set", extract it—it is only needed there to kick start this process. While the number of items in the "compiler set" is less than "number of options", take the node with the highest priority out of the "compiler subset" and add it to the "compiler set", in the process subtract the priority value of the node just moved from any of its parent nodes in the "compiler set". This is so that its priority does not get double counted. If the above process resulted in any node in the "compiler set" having its priority reduced to zero then take it out of the "compiler set", this node has been completely subsumed by its child nodes and delete the "compiler subset" as the remaining nodes will no longer be candidates and repeat the above steps until the "compiler set" contains "number of options" items and a cycle through the loop does not add or remove any nodes to the list, or "compiler set" contains less than "number of options" but all child nodes have been added to it.

Using this logic, the following table summarises the sequence used to select the word "leaders" from the data (note: the "number of options" column has been removed as it is always 4, the "already presented" column has been removed as it is always none):

| step | entry so far | "option set" | "option subset" | options returned | user action |
|---|---|---|---|---|---|
| 1a | "lea" | base node | "d", "v", "rn", "gue_", st_" | | |
| 1b | | "d", "v", "rn", "gue_" | | "d", "v", "rn", "gue_" | select "d" |
| 2a | "lead" | base node | "er", "_", "ing_" | | |
| 2b | | "er", "_", "ing_" | "ers", "er_" | | |
| 2c | | "ers", "er_", "_", "ing_" | | "ers", "er_", "_", "ing_" | select "ers" |
| 3a | "leaders" | base node | "hip_", "_" | | |
| 3b | | "hip_", "_" | | "hip_", "_" | select "_" |

As can be seen from the table, the user now has to make only 3 selections rather than 4 as in the method described in the previous section.
Referring to steps 2a to 2c above:
2a: From the base node, all the child nodes ("er","_", "ing_") are added to the "option subset", as these number less than "number of options" they are all transferred to the "option set".
2b: Then all the children of the nodes in the "option set" are loaded into the "option subset" ("ers", "er_").
2c: These are then transferred into the "option set" and, as they are added their priorities are subtracted from their parent ("er") and ultimately this results in "er" having a zero priority so it is removed from the "option set" as "ers" and "er" have completely subsumed the parent "er".
As this results in "number of options" nodes, these are returned to the interface component. This method selects menu options ensuring all candidate branches that are children of the base node are presented and where there is room for more options, these are chosen from nodes further down the branches based on priority.

A further method of selecting the optimal nodes in the tree for determining the Partial Word Completion options to present would be to make priority the main driver for selection. In this case the system traverses the tree below the node for the "entry so far" (the "base node") and selects up to the "number of options" nodes with the highest priority with the following proviso: the priority value is the node's priority value minus the priorities of any nodes below them on the tree which are being returned as candidates. To determine this the system would apply logic similar to that illustrated in FIG. 16 and described below based on the example of determining the options for the "entry so far" of "lea" in FIG. 14. The "number of options" figure in this example would be 4 and there would be no items displayed already.

| Step | Commentary | Selections |
|---|---|---|
| 1 | Determine the "number of options" (4) top priority nodes | "d" (41929), "v" (27628), "der" (20589), "ve" (18388) |
| 2 | For each node with child nodes as candidates, subtract the candidate child's priority from the parent's (changed values in bold) | "d" (21340), "der" (20589), "ve" (18388), "v" (9240) |
| 3 | Based on the new values determine the "number of options" (4) top priority nodes again | "d" (21340), "der" (20589), "d_" (11721), "ve" (18388) |
| 4 | Once again subtract the priorities of the child nodes just added from the parent nodes | "d" (9619), "der" (20589), "d_" (11721), "ve" (18388) |
| 5 | Based on the new values determine the "number of options" (4) top priority nodes again | "der" (20589), "ve" (18388), "ders" (11920), "d_" (11721) |
| 6 | Once again subtract the priorities of the child nodes just added from the parent nodes | "der" (8669), "ve" (18388), "ders" (11920), "d_" (11721) |
| 7 | Based on the new values determine the "number of options" (4) top priority nodes again | "ve" (18388), "d_" (11721), "ders" (11920), "rn" (10461) |
| 8 | There are now no candidate nodes which are children of other candidate nodes whose priority has not been discounted for the child so the processing is complete. | "ve" (18388), "d_" (11721), "ders" (11920), "rn" (10461) |

Thus the option that would be presented are "ve", "d_", "ders" and "rn".

Figure 17:
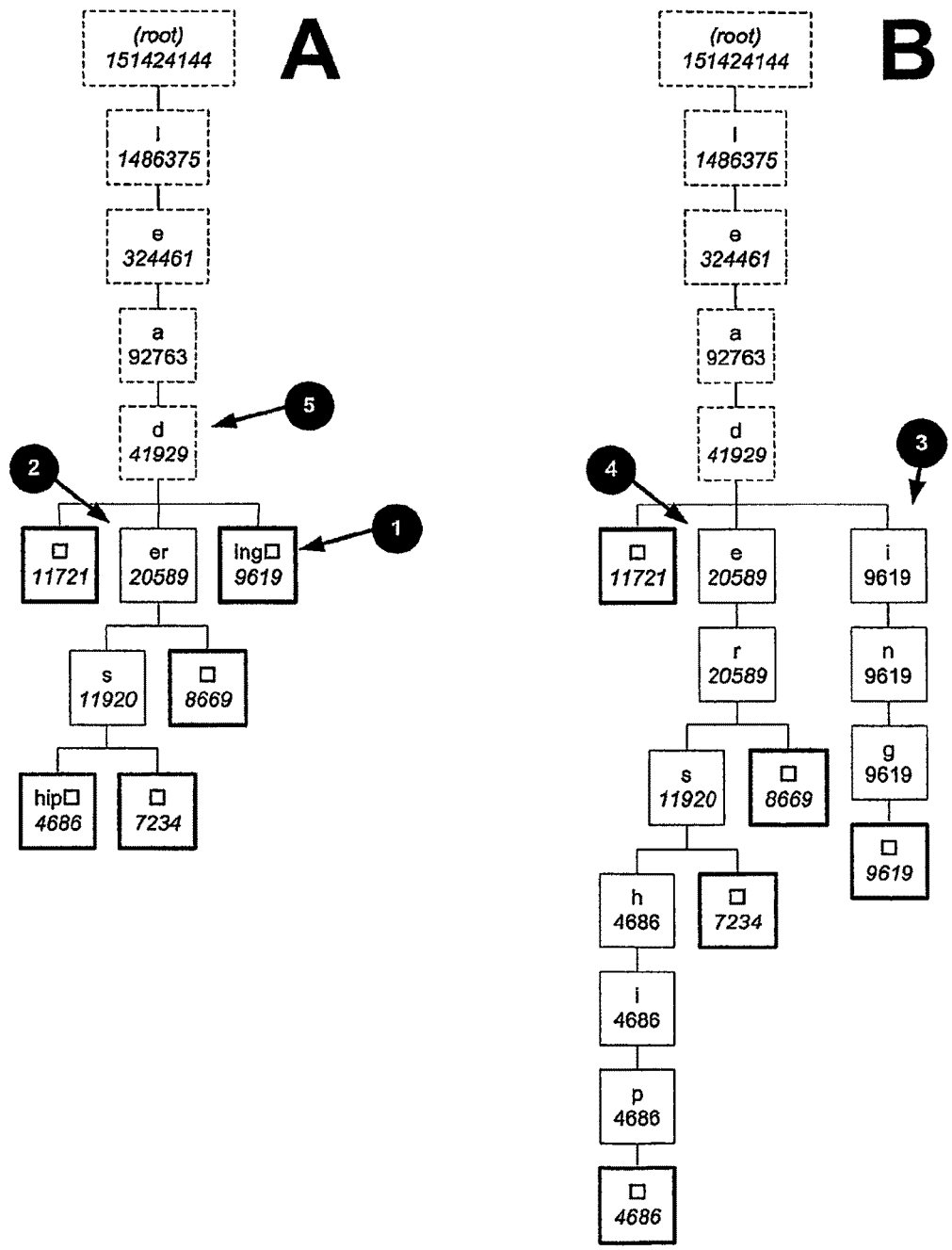
FIG. 17 shows a dynamic tree with multi-character nodes (A) and single character nodes (B) in accordance with an embodiment of the present invention.

In the above descriptions, the dynamic tree structure is illustrated with one or more characters (or the end of word symbol) making up the string at each node. This is because the logic of the system is based on where the strings in the dictionary branch and options are presented based on this notion. However, there may be circumstances where the structure has to be changed slightly to limit each node to a single character. FIG. 17 illustrates an example of how this may be implemented. Referring to FIG. 17, tree section (A) illustrates the nodes that make up the words beginning with "lead" (the nodes for the letters to this point are likely to have several other branches not illustrated in FIG. 17) and the fully expanded tree of nodes that may make up all the words starting with "lead". As can be seen in FIG. 17 (A), leaf node (1) contains the multi-character string section "ing_", similarly the branch node (2) contains the multi-character string section "er". The tree structure can be reconfigured to that illustrated in FIG. 17 (B) whereby all nodes with more than one character in them can be expanded to a sequence of single character nodes all with the same priority value and a single link to a subsequent node. So node (1) is expanded to a string of 4 nodes starting at (3) and node (2) is expanded to a string of 2 nodes starting at (4). The lookup logic for this modified structure is similar to that described above with the additional consideration that when determining a string for a node, the system should include that node as well as the characters for the nodes under the node up to the first branch or end node.

There are potentially many situations where this structure may be useful, two are described below: If a system allows for entry, or selection, of characters outside the string sections that make up the branches of the partial word completion based dictionary (the "options"), the "entry so far" may end up resulting in a string which maps to part way through the text of a node. For example the user may use a partial word completion based system to enter the initial string of "lead" using a tree of data as illustrated in FIG. 17 (A), they may then use some explicit character entry means to enter the letter "i". The next time the engine component is called to present options, the entry so far will be "leadi" and given a structure as in FIG. 17 (A), this leads to a point which is within the string for node (1). As a result it may not be possible to determine the options to present. However given a structure as in FIG. 17 (B) it is a simpler task for the system to traverse to node (3) and hence present the string made up of the child nodes (just the one string "ng_") as the options to present.

In embodiments, there may be circumstances where selection is provided through multiple simultaneous dictionaries being traversed in parallel. In this situation, it cannot be guaranteed that for any particular entry so far that all the dictionaries will traverse to the start of a node string in the case where there are multiple characters per node. However, if each dictionary structure is limited to a single character per node this issue is removed. The above description suggests converting single nodes with multiple characters into multiple, single character nodes. However, it may be advantageous to implement the described structure in a "virtual" way such that the internal storage of the dictionary still allows for multi-character nodes as this may be more efficient in terms of storage and processing required. However, as the system traverses through the tree it works a character at a time as if there was just one character per node but maintains additional information internally to allow it to traverse the multi-character string of a node a character at a time. This may be done through a virtual node pointer. In previous descriptions, traversal of the tree was managed through a pointer which was navigated through the nodes. A virtual pointer could be implemented through the maintenance of a memory of a node pointer plus an index of the character that the virtual pointer is at within the node that the node pointer is pointed at.

For example, if the word so far is "lead" then the node pointer may point to node (5) in FIG. 17 (A) and a character index value of 0 indicating that the virtual pointer is at the first character. If the user then enters "e" by some other means the node pointer would move to node (2) with the character index value of 0 indicating that the virtual pointer is at the first character "e". This would mean that the "r" component would be treated as a virtual subnode. If the user then entered or selected "r", the node pointer would remain at node 2 but the character index would change to 1 indicating that the virtual pointer is now at the second character in "er".

Although the above description provides several approaches to determining the menu options to present to the customer, other methods may be used within the scope of the present invention.

In addition to the core functionality described above, there are many enhancements that could be included in implementations of partial word completion based list selection. For example, the partial word completion based systems of the present invention may include list selection based on multiple, simultaneous dictionaries. Embodiments of the present invention may be used to provide selection from multiple languages. For example, if the user wants to select items from lists in French and/or English it may be advantageous to provide this as two partial word completion dictionaries being traversed simultaneously. Embodiments of the present invention may also be used to provide list selection from multiple sources, for instance an online media portal may allow for a user to select media to purchase via a device. This media may be in the form of music or video however, some customers only have access to music purchases, some only to video and some to both. Having the music and video libraries as separate partial word completion dictionaries but allowing for the possibility of simultaneous selection will allow for the simple separation of the two lists. Embodiments of the present invention may also be used for the purposes of optimising storage or other computer resources it may be advantageous to be able to split a large dictionary into several smaller dictionaries which are still selected from as one. Where multiple dictionaries (or databases) are used, it would be preferable in certain circumstances for the partial word completion based system to provide a single selection process which seamlessly provides selection from one or more lists simultaneously without the user's method of operation of the system having to change. Below is described an implementation of such a system.

As described such a system could be implemented with an interface component which handles the interaction with the user and an engine component which manages the process of traversing the partial word completion based dictionary(s) and determines the options to be presented to the user. The logic to implement selection from multiple simultaneous dictionaries may reside in the interface component, the engine component or combination of both. In certain embodiments such a scheme the logic to implement selection from multiple simultaneous dictionaries is likely to largely reside in the engine component.

Implementation of multiple simultaneous dictionaries indexed in a dynamic tree structure in certain embodiments would work as follows: On a request for a set of options to present the engine component would perform the following operations. For all active dictionaries, traversing the tree to the node that corresponds with the entry so far (some dictionaries may not have a corresponding node for the current entry so far in which case those dictionaries would be removed from consideration for this selection), and if at least one node is found. Determine all branches off all the nodes found in the above step, where there are branches from different dictionaries which correspond to the same continuation, combine their relative priorities and treat them as a single "virtual" node, compile a set of all branches either combined in this manner or unique throughout the dictionaries. From the set of branches derived in the above set, remove any branches that have been rejected through a previous selection of a "more option". Select the "num of entries" remaining branches in the set that have the highest priority and return them for presentation as Partial Word Completion options to the user.

For the above logic there are some considerations that may need to be taken into account. A particular "entry so far" may not exactly equate to a node in the tree structures of each of the dictionaries so it may be advantageous to implement the dictionary tree structures with a structure that limits each node to having one character. In determining the priority of a "virtual" node (in step 2 above) which is the result of a combination of multiple nodes it may be sufficient to simply sum the priorities of all the component nodes together. However, there is scope for the system to apply more complex prioritisation logic. For instance it may apply different weights to nodes from different dictionaries before summing them together, possibly by applying different multiples to the base priority of each node in different dictionaries. For instance, if there is a static, language dictionary, as well as a dynamically learning usage dictionary which holds new words and modified usage values of used words, the system may give the usage dictionary higher priority as it is more likely that the desired word will be one that has been used previously. Similarly, if the user has active an English and French dictionary in order to enter text in either language but their native language is French and hence they enter more text in French, the system may allow the user the option of applying higher priority to the French dictionary nodes. In implementing multiple simultaneous dictionaries where the dictionaries are indexed using a static structure it may be possible for the engine component to provide this by getting the proposed options from each dictionary for the entry so far, compiling them into a larger list and removing duplicates, then presenting them "number of options" at a time for each request for more options from the interface component.

Furthermore, at the end of the selection process, the system may provide functionality to allow the user to choose some action(s) to perform upon the selected item or the system may automatically invoke some action based on the selection without further user input. For example, once a music track was selected the system could present information about that track such as artist, title, album, track length then give the user options to play the track, delete it, add it to a play list etc. Similarly for an address book lookup, once the desired item is selected then the system could provide options to call the contact by mobile phone, email them, send them a message, etc. Alternatively the system may present a selection of a video in a local library of videos and as soon as the desired video is uniquely identified in the selection process, the system may start the selected video playing without further input from the user.

In certain embodiments it may be useful to combine partial word completion based list selection with other selection mechanisms. For instance an application may provide the ability to start the selection using partial word completion but at any point allow the user to have the remaining items presented as a list to scroll through and select from. For example, if a system provides selection of music tracks and is indexed on artist concatenated with album name then track name, the user may want to look up an album for a particular artist but then may want to browse through a list of all the tracks on that album. The user may use a partial word completion list selection means to select a particular artist then album but then revert to a scrolling list selection means to browse through all remaining items (i.e. the tracks for that album). Another possible reason for resorting to multiple selection means is if the object of the selection process is to select multiple items within a particular partial word completion selection. As with the example above, if the user was using a music selection system and wanted to go to a single specific album by a single specific artist but then wanted to select several tracks (to copy elsewhere for instance) then it may make sense to provide partial word completion based selection for the specification of the artist and album but the tracks may be presented using some other selection means such as a scrolling list which is more amenable to selecting several items at once. Another possible reason for a need for an additional selection means is if the items that the partial word completion based list selection is indexed on do not resolve to a single, unique result. This may be an intentional part of the design of the system. For instance a contact lookup application may provide selection based on a contact's name but the user may have more than one "John Smith" so the system may provide a scrolling list or some other mechanism to select the intended contact by some other differentiator such as postal address. The above examples describe embodiment where the system switches from one mode to one other, in some instances there may be any number of different selection modes used throughout a selection session. It is acceptable for a subsequent selection mode to also be partial word completion based, for example a contacts application may provide partial word completion based selection indexed by name and once a name is selected, a subsequent partial word completion based list selection mechanism may provided the choice between the contact means (e.g., "home phone", "business phone", "fax", "email", "SMS", etc.). The system may start the selection by some other means and then switch to partial word completion based selection, e.g. in the above contact lookup example, the selection of the contact may be through a scrolling list mechanism but the choice of contact means may be through Partial Word Completion selection. Whilst the alternative selection mechanism described in the above examples is often a scrolling list, any other selection mechanisms may be combined with partial word completion selection such as voice selection, direct touch screen indication, etc. In the process of partial word completion based list selection it may prove useful to have an indication of the total number of items matching the selection so far in order to assist the user in gauging at what point the number of options has reduced to a manageable number to be browsed by some other means such as a scrolling list.

Often, when providing a partial word completion based list selection system the object of the exercise may be to select from a sequence of lists which hierarchically follow on from one another. A typical example is selection of music tracks. It may be convenient to allow the user to first specify the artist and then select a specific album from a list of all the albums by that artist and then select a particular track from the specific album that was just selected. This scenario may be achieved in a partial word completion based list selection by concatenation of the index strings. In the example above, each index would be a concatenation of the artist name, then the album name, then the track name. Each of the resultant indices would then correspond to a particular track in the system which is then played (for instance) once the selection is made.

As discussed previously, in a partial word completion based list selection system a single index can correspond to a single item in a list. However this is not the only possible implementation. It is also possible to implement partial word completion based list selection such that multiple indices correspond to a single item in the list. An example may be contact lookup where the system allows the user to select a contact from their address book and that contact is then dialed. For example, the system may allow for selection based on an index of a concatenation of first name then surname as well as an index of a concatenation of surname then first name. Thus the strings "John Smith" and "Smith John" may be two of the indices in the list for selection but they result in the selection of the same item for processing (in this case a contact record which is dialed).

Further to the above it may also be desirable for a single index string to correspond to multiple items. For example, by allowing selection based on keywords: a list of items may each have one or more keywords associated with it such that a particular keyword can be associated with one or more items in the list. For example, a system may provide access to articles by journalists where each item for selection is an article and all articles about war have a keyword of "war" but they may also have any number of other keywords as well, for example an article about war in Iraq may have the keywords "war" and "Iraq" but there may be other articles in the database which are about agriculture in Iraq which may have the keywords "Iraq" and "agriculture". Thus there are overlaps of items for each keyword. Additionally, allowing selection based on subsections of indices: a Partial Word Completion based list selection may provide selection of items indexed on sections or components of the index string instead of, or in addition to, the complete index string. An example of this may be indexing of song names not only by the complete titles from the start but also the separate words or phrases within each title. Thus, a system may index the song "Black or White" by Michael Jackson with a string "Michael Jackson, Black or White" which uniquely identifies the song but there may also (or instead) be index strings "Michael Jackson", "Black" and "White" added to the partial word completion based list selection system to select from. Furthermore, any other scenario where a single index may correspond to zero or more items or when a single index results in one or more list items, it may be necessary for the user to go through more than one selection phase. The user may initially be presented with partial word completion based list selection to specify a first index out of all the known indices. Once this initial index is entered there may be one or more resultant items, in order for the user to narrow the selection down further there may need to be additional selection phases. These additional selections may be one of many means including, for example, presenting the remaining items in a list for the user to browse over and select the desired item(s), or going into subsequent partial word completion based list selection sessions to refine the search by specifying additional indices selected from only indices that apply to items that match all the indices entered so far, the result(s) of the overall selection being the items in the list matching all the specified indices.

As an exemplary embodiment, assume a user has 1,041 songs on a device indexed by song title. The user wants to select the song "Right down the line" by Gerry Rafferty. In this example the system provides selection based on individual words within indices rather than restricting selection to specifying the complete index from the start. The selection of words is managed through partial word completion selection. The system allows the user to input words until a single unique entry is identified, alternatively the system may provide a mechanism for the user to indicate that they do not want to be more specific and that the system should present all the items that match the entry so far specified, in order for the user to select one or more of them through some other means.

In the example, the partial word completion based list selection is managed through a joystick based interface with 4 options presented and a central click used to indicate "more".

Figure 18A:
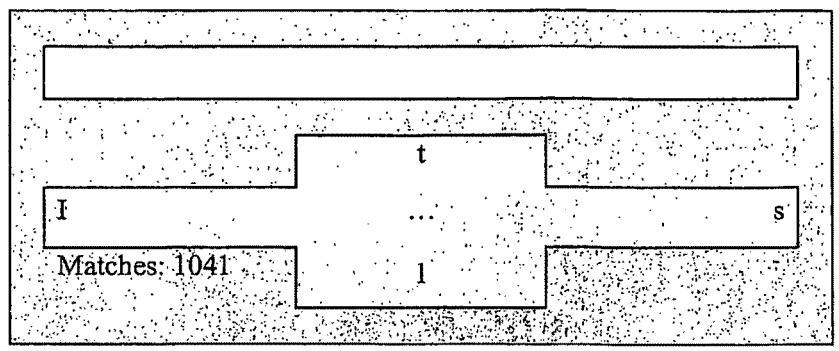
Figure 18B:
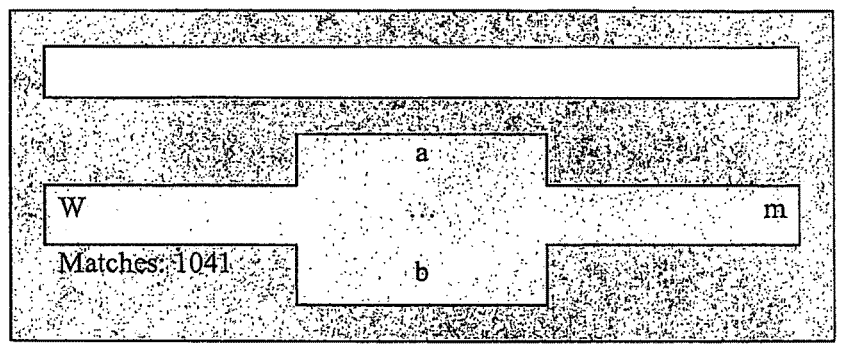
Figure 18C:
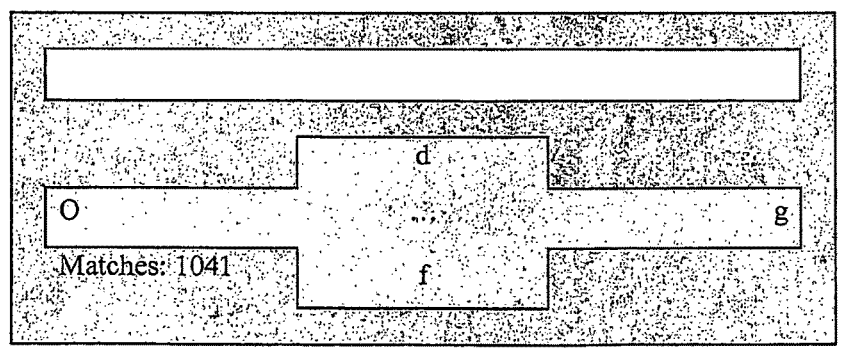
Figure 18D:
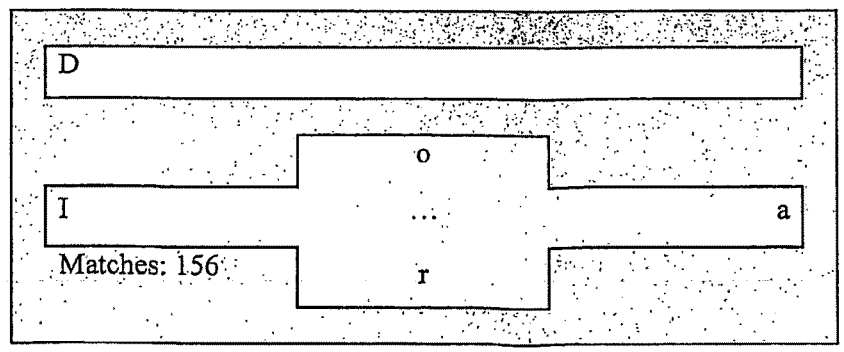

As the user is looking for "Right down the line" in the example they decide to first specify "down". Referring to FIG. 18A-18F the following sequence may be executed to firstly enter the word "down":

| Step | FIG. | Description |
|---|---|---|
| 1. | FIG. 18a | This is the opening screen of options, the desired letter "d" to start down is not visible so the user selects the center option "more". At the bottom left is an indicator showing how many items match the current selection (match indicator), at this stage all the songs match the selection so this match indicator reflects the total number of items (1041). |
| 2. | FIG. 18b | The seconds screen still does not show "d" so the user select "more" |
| 3. | FIG. 18c | The letter "d" is shown as the top option so the user selects this with a press up of the joystick |
| 4. | FIG. 18d | The word entered so far is now "d" and the "o" to continue the word is at the top position so the user selects this with a press up of the joystick. The match indicator now shows how many items have a word in the title that starts with "d", this is 156 items. |
| 5. | FIG. 18e | The word entered so far is now "do" and the rest of the desired word "wn_" is at the bottom position so the user selects this with a press down of the joystick. The match indicator now shows that there are 66 items with words in their title that start with "do". |
| 6. | FIG. 18f | The word "down" has now been successfully entered and there are 11 items which have the word "down" in their title. |

Figure 21A:
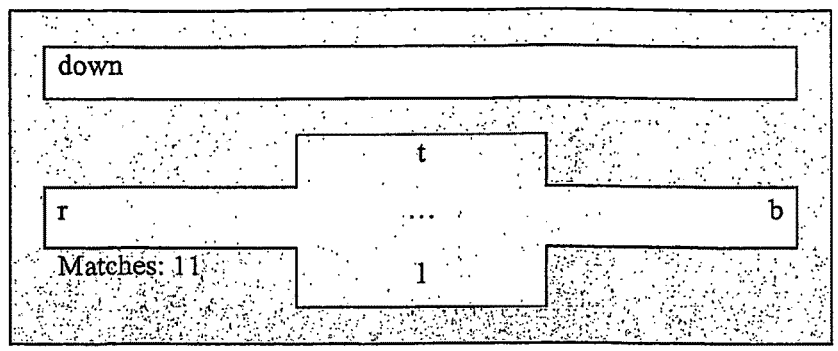
FIGS. 21A-21C show a menu sequence for the selection of the keyword "line" after the keyword "down" has already been selected with a view to selecting the song "Down by the water line" from a library of 1041 songs in accordance with an embodiment of the present invention.
Figure 21B:
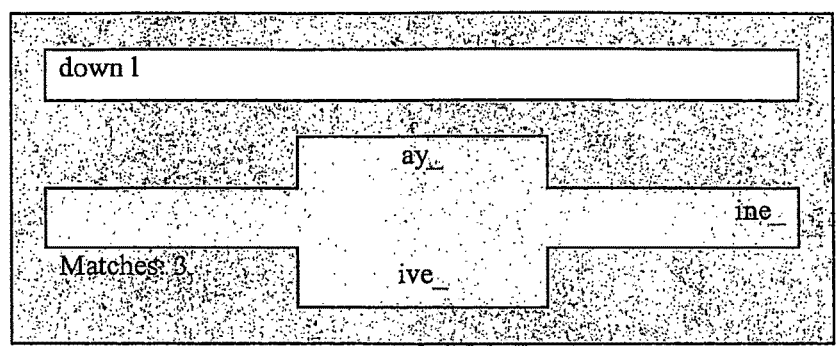
Figure 21C:
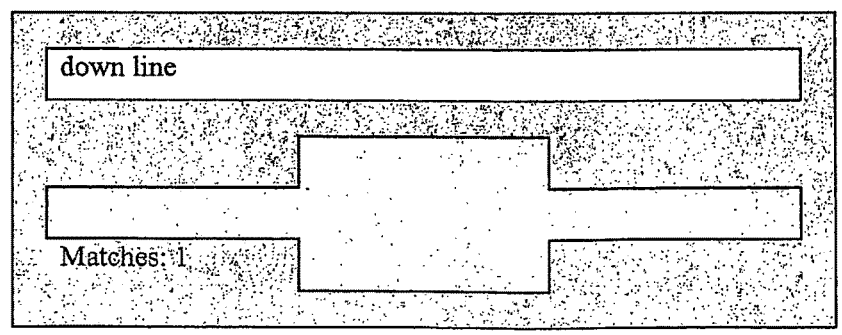

The user has now specified down and has been made aware that there are 11 song titles which have the word "down" in them. FIG. 19 shows a possible list of the 11 song titles which have the word "down" in them. The user now enters Partial Word Completion selection again to refine the search further by entering an additional word to match on, in this case they will enter the word "line". The system now presents menus to perform partial word completion based list selection out of only the words (except "down" unless there are songs with "down" in their title twice) that are in the titles of songs with "down" in their title. This is a much reduced list and is shown in FIG. 20. As can be seen in FIG. 20, the remaining words are prioritised by how many times they occur however they could be prioritised on some other basis with a value assigned to each item (in this case song) so that each word gets a priority based on the sum of the priority values of the items that that word occurs in. Referring to FIG. 21A-21C the user now progresses with partial word completion based list selection to specify the next word "line":

| Step | FIG. | Description |
|---|---|---|
| 1. | FIG. 21a | The start of specifying the next word "Line". The "l" to start line is at the bottom so that is selected through a movement of the joystick down. |
| 2. | FIG. 21b | "l" has been selected and there are only 3 options left (songs that have "down" in them as well as another word starting with "l"). A movement of the joystick right will complete the selection of "line". |

| Step | FIG. | Description |
|---|---|---|
| 3. | FIG. 21c | Both words "down" and "line" have been specified, as there is only one song title that has both words in it then this is now uniquely identified. |

Once the selection has been made the system may then automatically perform some action to apply to the selection, in this case as it is a song that has been selected, the device may start the song playing. Alternatively the system may present further menus or other mechanism for presenting choices to the user (including partial word completion based list selection) to allow the user to select an action to be performed on the selected item.

The above example illustrates one scenario whereby the partial word completion based list selection system does not have a one-to-one relationship between items and indices, however, there are many other implementations which may use this concept. For example, the indices may be keywords or any other system of strings which may or may not be contained in the title or unique identifier of the item. Each keyword or string may be linked to one or more items. Alternatively, for example, the items may not have a one-to-one identifier (e.g. song title) at all, and each item may be uniquely specifiable by a unique combination of index strings. Additionally, the items may have priorities such that the string identifier(s) associated with that item receive corresponding increase in priority when being presented in Partial Word Completion based list selection, The above exemplary embodiment shows selection to a single result but the system may allow for partial word completion based list selection to be used to a selection of multiple results and then some other mechanism such as a scrolling list to perform the remaining manipulation. While the above example provided a "match indicator" as useful additional information for the user, this is not necessary to provide selection as described above.

A further enhancement to the basic function of partial word completion based selection aims to streamline further the selection of options from the screen by taking advantage of the user's familiarity with a QWERTY keypad or similar. A partial word completion based system presents menu options to be selected in an on-screen menu. This menu may be four options in a circular or star pattern for joystick input such as in FIGS. 22A and 22B or it may be a grid pattern for selection through a touch screen such as in FIG. 23 or it may be some other arrangement. With these systems, the user wants to be able to quickly find their desired option and in order to further streamline this process the system could position the options in locations as close as possible to where they would be in a traditional QWERTY keypad. For example if the system is a touch screen device presenting a grid of options to select from and an option string starting with "q" is to be presented then it should ideally be positioned at the top left of the grid of options, similarly a string starting with "b" should approximately be in the centre of the bottom row. This is particularly advantageous as it makes use of the user instinctively looking at a particular section of the grid for the desired letter based on training that has occurred through long periods on a QWERTY keyboard. Due to the fact that this system may determine that more than one menu option may be applicable to a particular location, some overflow logic will have to be applied to determine the best alternative location for one or more of these.

Figure 24:
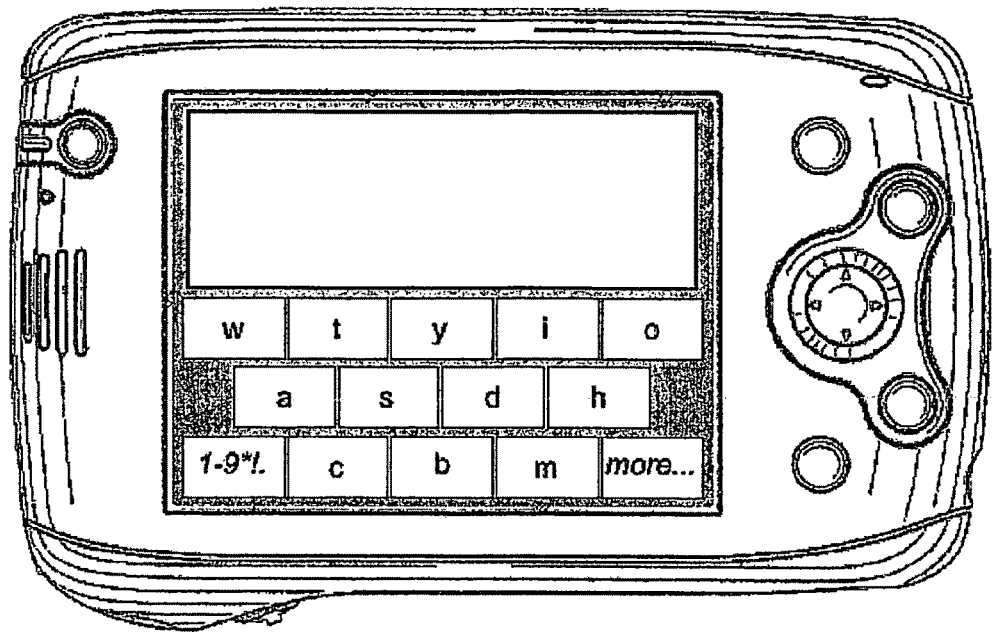
FIGS. 24 and 25 show a PDA touch screen system with options in optimised locations in accordance with an embodiment of the present invention.
Figure 25:
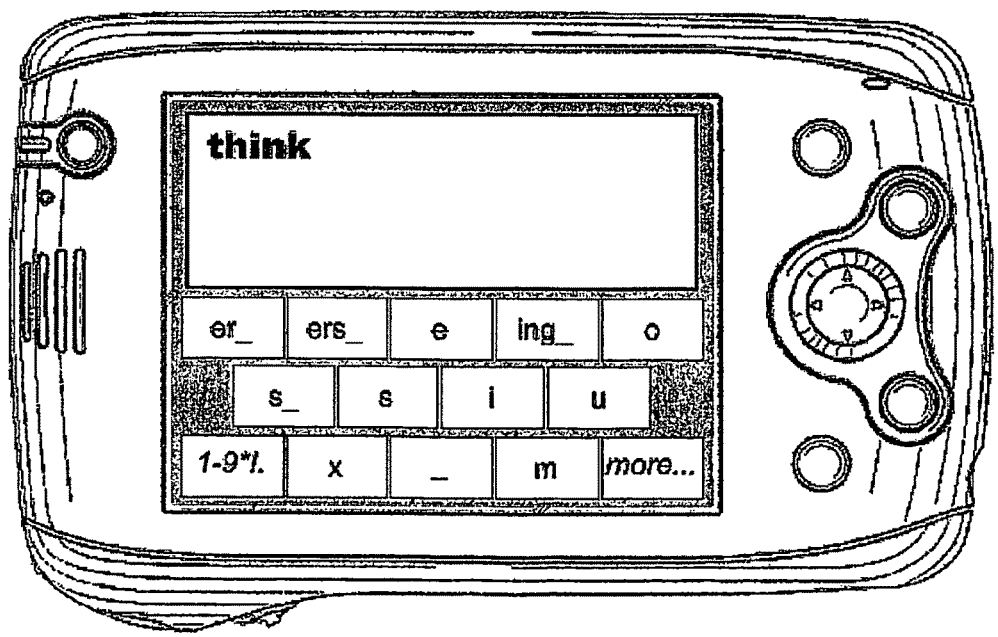

For instance, if strings starting with "q", "w" and "e" are to be presented the system may not be able to present all of them in the top, left region on the screen. When determining the location of an option the following rules could be applied: (1) options should be positioned in descending order of priority such that higher priority options should get preference over lower priority items that are trying to share the same location, (2) ideally the desired option should be at the expected location or within one key radius of the expected location so that the user can instantly register its presence and hit it by looking at the expected location and seeing it directly or slightly peripherally but not having to scan across all the options except rarely for obscure strings, (3) make the most likely options be closest to proper location on screen, (4) moving things off location horizontally is preferable to vertically, and (5) in multi-character options, when the first character position is filled, when determining which direction to relocate the option should go in the direction which moves toward the location of second character in the string, When the key is just space aim to place it in the middle of the bottom row. An example of the above logic is illustrated in FIGS. 24 and 25. The system illustrated in FIGS. 24 and 25 is a touch screen PDA system allowing for partial word completion based selection from a grid of 12 string options plus a button for numbers and symbols (bottom left) and a more option (bottom right). In FIG. 24 this may be the state of the system at the start of a selection showing the most likely 12 strings to start a selection. As can be seen, the options are located at approximately the location they would be on a QWERTY keyboard. For instance the "w" is in the top left and the "m" is in the bottom right. Also note that "d" may have had a lower priority than "a" and "s" as it has been moved further from its ideal location by the other two. In FIG. 25 the same system is now at a stage where the entry so far is "think" and the options for continuing the selection are being presented and as can be seen many of them are multi-character strings. Once again the options have been located in approximately the location they would be on a QWERTY keyboard but it can be seen that "i" and "u" have been shifted down a line due to a lower priority.

While the above embodiment describes applying location logic based on a standard QWERTY keyboard, the logic can also be based on any other comparable system Another example may be to match the position of letters on a phone keypad such that options starting with "p", "q", "r" or "s" may be position in the bottom left of a menu as this is where they reside on the "9" key on a phone keypad. It may also be advantageous for the system to remove items from a dictionary individually when the user selects that item. This may give the effect of a "checklist" whereby only items remaining in the list are selectable and once selected the item is removed from the list.

At any time the user can navigate throughout the menu tree to determine what are left and select items as they are completed. When the menu does not show any more options then the user would know that all the items in the list have been completed.

This system may be useful, for example, to work through a shopping list, checking off items as they are selected for purchase.

Many computing devices and/or applications on computing devices have a number of selectable items available to the user to operate the device or application. These selectable items (referred to as "items" in this document) include any item that can be selected to be activated, opened, changed, etc. in the process of using the device or application. Examples of such items include: functions of the device or application, e.g. make a phone call, take a picture, start a new email (may be indexed by function name); content items or files on the device or application, e.g. audio and video recordings, images, recordings of data such as variation of temperature over time (may be indexed by filename, stored description, keywords or other metadata such as artist, title, album, etc); documents, e.g. text notes, formatted documents, eBooks (may be indexed by title, author, keywords, text body); settings, options, preferences, etc., e.g. screen brightness, network password (may be indexed by setting name); a level in a hierarchical menu of items (e.g. rather than the item being a particular setting as in the above point, an "item" may also be the "Settings" menu level in the hierarchical menu tree from which the user can navigate by some other means to the desired item selection); local data fields, e.g. contact details in an address book, calendar items, to do items, application specific database content (may be indexed by defined index item such as surname and christian name, title, etc.); help topics from the on-device or in-application help system (may be indexed by help item heading and/or keywords); an online entity such as a web page, rss feed, blog, game, podcast, etc. (may be indexed by title, description, keywords, body text); and any other item available on, or accessible to, the computing device or application that the user may desire to select.

Often these functions are presented in menus to be selected through some user interface means. The user interface mechanism(s) used by the device depends on the type of device. Exemplary various device types may include: personal computers and laptop computers and other screen/mouse based devices for selection of items from an onscreen list by pointing using a mouse; personal music players, personal video players, video game devices (both portable and consoles), digital still or video cameras, fixed, wireless and mobile phones, televisions and television connected devices like cable set-top-boxes, personal video recorders, media center devices providing media viewing, streaming, recording and playback, navigation systems, personal computers and laptop computers with input via directional keys or some similar mechanism, and any other devices allowing user input through directional controls for Selection of function from an onscreen list through directional inputs from a directional input mechanism such as a joystick, wheel or directional keys; personal digital assistants (PDAs), some digital still or video cameras, some navigation systems, information kiosks, vending machines, and any other device allowing user input through a touch screen for selection of items displayed on a touch screen device by direct indication of the desired option by tapping the corresponding location on the screen with a stylus, finger or similar implement; and any other system allowing the user to select an item on a device through the system's user interface.

It is often the case that these items are presented in menus with a hierarchical structure. This is due to the desire to present a large total number of items without any particular menu stage being excessively large. For instance, a PC operating system may present a top level menu with the following items: Programs, Document, Settings, Search, Help, Log off, and Turn off. The first three options ("Programs", "Documents" and "Settings") may lead on to further lists of possible items such as (respectively) all the programs installed on the device; all the documents stored on the device, or all the settings that can be changed on the device. These further lists may also be broken down into hierarchies if there are still a large number of items to present.

In another exemplary embodiment, on a digital camera, for example, the user may want to set the "frame numbering" setting to "continuous". The traditional way for the user to do this would be traversing the menu tree in a manner such as: selecting the <Menu key>, selecting "options", selecting "set-up", selecting "frame numbering", and selecting "continuous", where any of the above selections may take one or more input actions such as button presses. This hierarchical system is very common in many of the device types listed earlier in this section. Whilst it provides more efficiency than a simple list of items it can still present a difficult selection process for the user, especially when the total number of options is large and/or the interface of the device is limited. Some of the difficulties encountered are due to a large number of items can result in large lists of options at a particular level which means the user has to scan a large number of items to find their desired one and/or if the list is too large for the available display they will have to operate a system of navigating the list, generally through directional keys to scroll or page up and down the list, in order to find their desired item. Additional difficulties are due to a large number of items can result in a hierarchical tree with many levels requiring the user to provide many control inputs to navigate around the levels and down through the levels to the desired options, and when there are a large number of items, it is often the case that it is not obvious which branch of the hierarchy of items should be entered to find the desired item. For instance, on a mobile phone a user may want to change a setting for transmitting images and in the settings menu hierarchy they may be presented with choice between "Communication Settings" and "Image Settings". At this point it is not obvious which option the user should take and a wrong choice may result in wasted effort on the part of the user as they will be searching the wrong branch until they realise their desired option is not there. Additional difficulties arise if a desired option is not available at all, this is not immediately apparent and the user may have to navigate several branches of the hierarchy which may be perceived to be potentially where the desired option may reside. Once the user fails to find the desired item and gives up, they may still not be certain that the item is not available, it may be on the device but they were not able to discover its location.

Some devices implement a solution to the above mentioned issues by allowing the user to directly access an item on the system through a textual search mechanism. With such systems the user is able to go directly to an item, by typing in a textual identifier for the desired item. This identifier is then compared against a stored index and if there is a matching item on the device, the computing device may open or activate the item for the user.

However, whilst the ideal scenario is that the search results in one matching item which is then opened or activated, there is also the possibility of other scenarios such as: zero results being found, and multiple results being found. If the search results in zero matches this could be for several reasons including: the item that is being searched for is not available on the device or application; or the item that is being searched for is not indexed within the search subsystem. For instance the user may be performing a search on a music player for a particular music track without realising that the search implementation does not index media content just the application's functions. Additionally, the user may have misspelled the text index that matches the desired item, e.g. the user may type in "settings" to find the settings menu; or the user may not be using the same text string as the system has applied to the desired option. For instance the user may have typed "settings" to change on-device settings but the system may use the term "preferences" instead.

In the above situations where the user is presented with a response of zero results matching the entered term, the user is often unable to discern the reason for this. It may be any of the reasons listed above or perhaps some other and as such they do not know whether they should try again with a different term or give up because the option is not available. This may result in several more attempts for the user before successfully finding the desired item or ascertaining that the item is not available or giving up unsure what the reason for failure to find the desired item is.

If the search results in multiple matches this is likely to be because the user has not been specific enough in their search term. For instance, a computing device may have several "screen" items, some possible values could be, for example, screen brightness, screen contrast, screen saver, junk email screening, and local movies currently screening.

In this case, if the user entered the search term "screen" they could be presented with the five results listed above as well as potentially many more. At this point the user must go through one or more subsequent search phases which may take the form of one or more of: specifying further search terms to refine the search further and repeat the process with hopefully less results, scanning through a list of search result items looking for their desired item, being fed into a hierarchical menu tree at a branch and navigating from there to a leaf of the tree that corresponds with the desired item by some other navigation means such with a joystick, and any other way of selecting the desired option from a list of multiple search results.

The above scenarios result in a complex sequence of actions for the user and, in the case where the desired item is either not available or unable to be found due to the complexity of the system, the sequence of actions may ultimately prove futile.

Another issue relating to the textual search process is that it requires the computing device to provide a facility for entering text in some form. Where a device has a full keyboard this is largely manageable although even a full keyboard can be problematic for text entry when used for some languages such as Asian languages.

Where a device does not have a full keyboard the text entry system may be cumbersome such as systems which are based on numeric keypads where text entry is achieved by assigning multiple letters, symbols, etc. to a key and having the user press the key multiple times depending on the desired letter. There are also other systems which try and improve on keypad text entry with some sort of predictive mechanism or more rapid selection of the desired letter by some other means. These systems may improve the process somewhat but generally the result is still an undesirable level of complexity and inefficiency in the process of text entry.

Where a device does not have a full keyboard or a keypad, text entry may be difficult or impossible. There are several mechanisms developed which allow text entry through a joystick interface or input actions through a revolving wheel movement, one such system is covered by a related patent [details of our text entry patent] but in general, when a device has a limited interface whether it is mildly limiting such as a with a keyboard, more limiting such as a with a keypad (e.g. mobile phones) or extremely limiting such as with just a screen and a joystick (e.g. music players, games devices, navigation systems)—a text based search process is hampered by the need for the user to enter text search parameters.

The most common methods of finding and activating items in a computing device are navigating a flat or hierarchical menu or through a text based search mechanism. Both these systems have inefficiencies that result in a less than optimum experience for the user. These inefficiencies become more pronounced when the number of selectable items available increases, and/or the user interface on the computing device become more limited. The present invention is an improved method of providing direct access to items on a computing device that is quick, efficient, less prone to errors and not hampered by a device having limited input means. The present embodiment provides a solution to the issues set out above by providing for direct access to items on a computing device and/or application via partial word completion based list selection. The present embodiment would provide selection of items which may be one or more types of selectable component of the system including functions, media files, settings, menu levels, etc (see a more complete list of possibilities in the text at the start of the description of this exemplary embodiment). The nature of the items made selectable will vary depending on the application and/or device When the user wants to access an item indexed in a system based on the present invention, they would perform some action to indicate they want to invoke the partial word completion based selection mechanism. At that point the system would present a partial word completion option menu as described above. From this menu the user would navigate their way through the options presented to build up the text string that corresponds to their desired item. For example, on a digital camera the user may want to set the "frame numbering" setting to "continuous". The traditional way for the user to do this could be traversing a hierarchical menu tree in the manner discussed above. Using Partial Word Completion the process may be selecting: <Menu key>; selecting "c", selecting "ontinuous", and selecting "frame numbering". Once the text string for the desired item was complete, the system would then invoke the item selected. The nature of the invocation will depend on the type of item and may also be influenced by preferences the user has specified to the system. For instance, if the selected item was a system setting, the user may be prompted for a new value; if the item was an audio file then the system might start that file playing; if the item was a text document, the system may invoke an editor to edit the document. The result would be an application which would provide direct access to an array of items in an application or on a device with specific characteristics. Exemplary characteristics may include, that there would be minimal inputs (e.g. key presses required), there would be no navigation down "dead end" paths, only items that exist in the index can be searched for, the presence of an item would be immediately apparent, selection would be based on a text description of an item, not a location within a hierarchical menu of items, all selection could be specified with minimal input means such as a screen and a joystick, an increase in the number of items does not result in a proportionate increase in the difficulty of selection so large to very large lists can still feasibly be selected from, and there is no need for text input so the system is fully functional on devices without keyboards or keypads.

The above embodiments provides a combination that provide a rapid, error free and low stress experience for a user even on a device with very minimal input capability. In order to implement a system for providing direct access to items via partial word completion the nature of the items that are to be made available through the partial word completion based system should be determined. Next, the system should determine the method by which text based indices will be assigned to the items to be selected by partial word completion. As described above, the indices may have a one to one relationship such that each index uniquely identifies one item. However there may also be a many to one relationship (in which case one or more text indices may result in the same item) or one to many (in which case a text string may result in multiple items which may then be narrowed down to one by further partial word completion text selection and/or some other mechanism like navigating the list of items and selecting with a key press). The system should also determine what the action(s) will be once an item has been selected via the system. Different types of items will have different actions invoked when the items are selected or the user may be presented with a choice of actions once an item has been selected (e.g. if a document item is selected the system may then provide the option of editing it, viewing it or deleting it and these additional options may be presented within the partial word completion selection as appended texts to the text index of the selected item). In order to efficiently present the partial word completion option menus the system may convert the list of indices of items to an internal structure to streamline determination of options on the fly. These structures (referred to as "dictionaries") may be dynamic (for situations where the options vary such as a list of music items in a music player) or static (for situations where the list of options varies minimally such as list of settings available for a device). Also there may be multiple dictionaries which would be navigated in parallel through the selection process.

For instance there may be a dictionary of device functions as well as a dictionary of media content and a dictionary of help items, all three of these dictionaries could be navigated simultaneously allowing for selection of any of the three types of items from the one partial word completion based selection system. Once the dictionaries have been built and stored ready for selection, the system would provide some means for the user to invoke the search mechanism and initiate the partial word completion based list selection process. Once the list selection process is invoked, the system would then manage the process of allowing the user to select their desired item by building up the text associated with it as partial texts presented in menus. Once the text identifier is complete an item is selected and the appropriate corresponding action for that item would be invoked.

In certain embodiments, the computing device, service or system described herein may incorporate more than one application. For example, in certain embodiments, a mobile phone may have an address book application for which the list selection described herein could be used to find a contact, a music player application for which the list selection described herein could be used to find a particular track to play, and the general functions, options, and applications which could be selected, activated and/or accessed by means of the list selection described herein. In such an embodiment, it may be beneficial to combine one or more of the list selections into a single list selection. This may be achieved by searching multiple dictionaries simultaneously or by using a composite dictionary, as discussed earlier.

In such an embodiment, it would be possible to provide access to multiple sources of data, content, applications, etc. Simultaneously which may, in certain embodiments, homogenise the user interface of those applications into a single interface and minimize the number of different modes and selections the user needs to perform to access any item.

For example, a user would no longer be required to navigate through a menu system to reach a contacts list. Instead, in these embodiments, if a computing device, service or system applied this type of a single interface design, content (e.g. music), data (e.g. contacts), functions, options, applications, etc. would be accessible from the list selection interface. Specifically, for example, it is common for a mobile phone device to provide a multi-level, hierarchical on-screen menu from which the user is asked to select the desired application or function or, alternatively, a "menu folder" which traverses the menu hierarchy to a subsequent level of menu items. Additionally, in conventional interfaces, many items may traditionally only be accessible from within an application once it has been invoked by a selection from the main device menu. For example, to play a music track may entail starting up the music application, then traversing the list of music tracks within that application to access one of the tracks for playback. However, in these embodiments, the functions, applications and options normally accessible by a conventional menu could be selected by name using the list selection methodology described herein. Therefore, in certain embodiments, a user, may be able to use the list selection methodology described herein to enter a contact name and view (or call, e-mail, etc.) the particular contact that is selected. Alternatively, but from the same level of the interface that a contact was selected, the user may be able to input and select a song from the music player's dictionary to play that song. It would not be necessary to navigate to a specific contacts interface or a specific music interface.

Although, there may be certain embodiments where the list selection described herein is applied as the overall interface for all of the available applications, there may be additional embodiments where the interface would be utilized as only a sub-part of the overall interface. For example, the list selection on a mobile phone may be used to invoke applications or functions but content such as music tracks may not be included in the lookup tree and may instead be accessed from within an application by some other means.

In addition to the examples discussed above related to using list selection to access local applications, functions, options, data, etc. list selection as described herein may also be desirable to include items from lists which reside outside the device such as in online services. For example the partial word completion lookup may include access to local contacts but in addition may also give access to a much larger online phone list for a company. Similarly it may be possible to select music stored locally but if a desired track name does not match a local track, the system may in addition include track names from an online music service such that the track can be streamed, downloaded and/or purchased.

In some embodiments, it may be desirable to have the user go through a multi-stage selection whereby the user first selects the type of item they are looking for and then select the actual item. For example if a user wants to find a music track, they would first select "music" from a list of all applications available, and then select the name of the track. This multi-stage selection may go through one or more categories of item type before selecting the desired item type. For example, to expand the music example above, the user may select "content" (to differentiate from other options such "applications" or "functions", then "music", then the track name. Each of the selections at each stage may be based on the list selection described herein or some other selection means.

In some embodiments, there may be items of several different types within the same lookup and it may be desirable to indicate by some means the type of item that the user desired. This indication may, for example, be applied once the selection is at the final string component of the selection or when all the remaining options are of the same type. The indication may be any means to differentiate item types such as, an additional text identifier, a distinct icon at the end of the string, distinct colours, typographic features such as underline, italic, etc. In certain embodiments, this may also assist in differentiating duplicate items which have the same identifying string but are of different types. For instance the system may have a video called "Cats" and a music track called "Cats", in this case the system could present each item for selection but one would terminate with a video icon (or similar identifier) and one would terminate with a music icon (or similar identifier).

A First Exemplary Embodiment

The following description of the present invention relates to selection of a contact from an address book of a mobile telephone. The invention is however not limited to this application and may be implemented on any device with computational processing ability on any list which has items composed of a series of components such as text. The conventional way of selecting a contact from an address book on a mobile telephone entails the user following the sequence: (1) The user starts the address book application and is presented with a the full list of all contacts in the address book, (FIG. 26); (2) Using the multi-tap feature on the device to enter characters with multiple presses of keypad keys, the user enters the first letter of the name they want to find; (3) This results in the list of names presented changing from the entire address book to only those names starting with the specified letter; (4) The user can now decided to use the joystick to move the selection to the desired contact and select it (FIG. 27), if however the list is still too long the user goes back to step 2 above to enter the next character and proceeds until the list is short enough to find the contact, and (5) Once the contact is selected, their information is presented and the user is given the option of calling them, emailing them, etc.

In an embodiment of the current invention the above process can be streamlined greatly by presenting the user with the following sequence: (1) The user starts the address book application which is implemented based on the present invention, the user is presented with 4 strings in a menu indicating the strings are selected by movements of the joystick in the directions left, right, up and down (FIG. 22A), these initial four options are the four most likely word section or string sections in the database at the start of a contact name based on an analysis of the frequency of words in the address book; (2) If the user sees the word section or string section that starts, or is a continuation of, the contact they want to select they move the joystick in the indicated direction to select that word section or string section, appending it to the name thus far specified. The next set of most likely word section or string sections which continue the name thus far specified are then presented (FIG. 22B), if the selection is not complete the user repeats this step 2; (3) If the word section or string section the user desires is not presented they activate the "more" function, in this case a press in of the joystick to be presented with the next most likely set of four options to continue the name thus far specified, the user then repeats step 2; and (4) Once the user has completed the name the user is then presented with their information and the user is given the option of calling them, emailing them, and so forth.

Figure 22A:
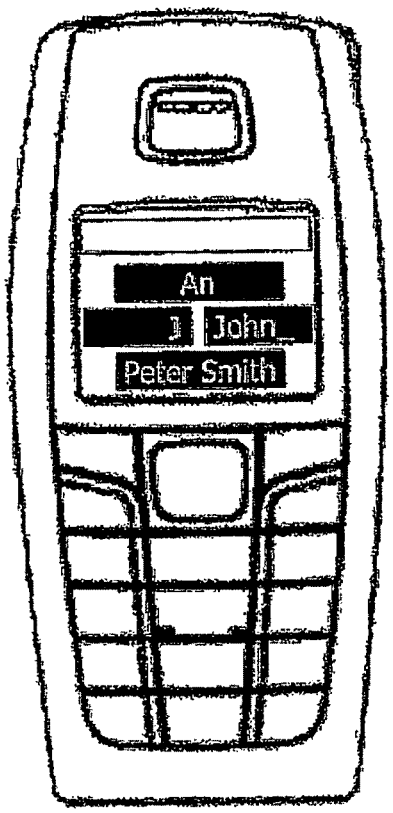
FIG. 22A is a representation of an opening joystick based selection menu in accordance with an embodiment of the present invention.
Figure 22B:
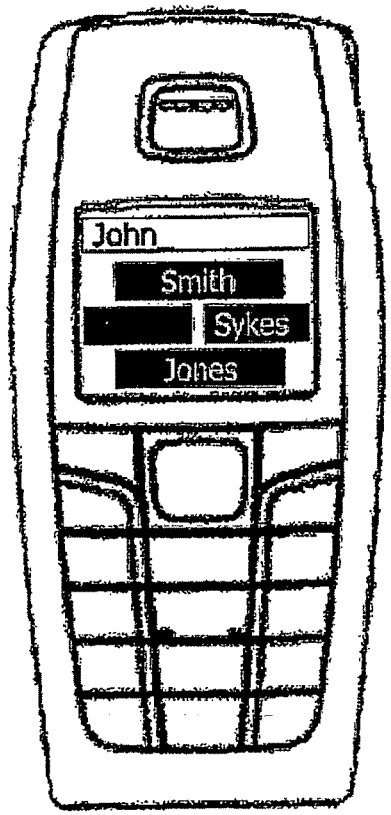
FIG. 22B is a representation name partially specified in accordance with an embodiment of the present invention.
Figure 23:
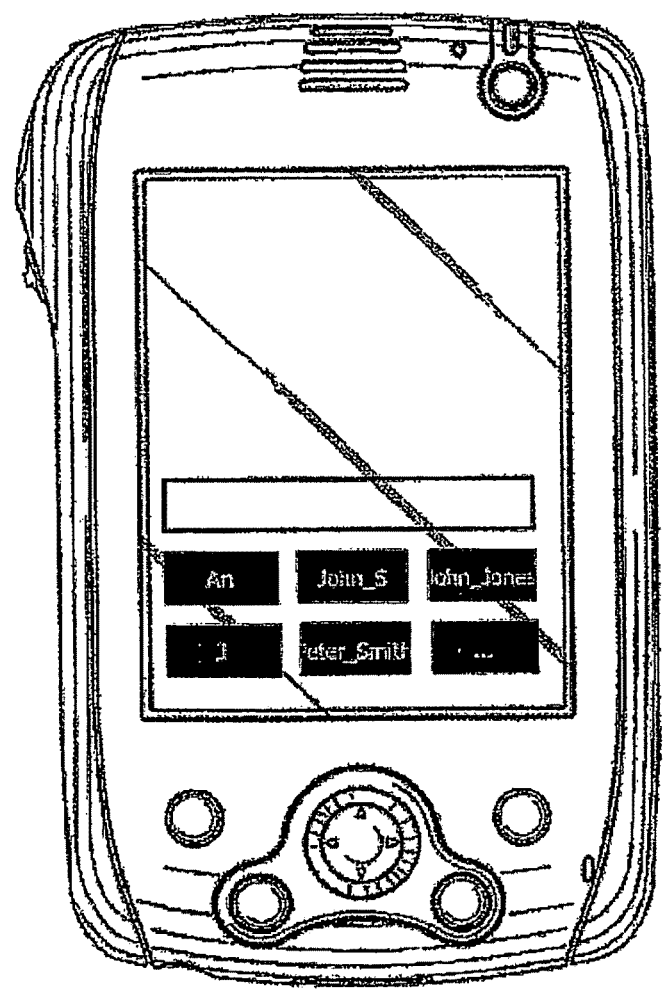
FIG. 23 is a representation of a touch screen option selection in accordance with an embodiment of the present invention.

Referring to FIGS. 22A and 22B, if the user wants to select the contact information for "John Smith" they would activate the partial word completion base contacts system which would initially present the menu shown in FIG. 22A. The user would then select the option "John_" by pressing the joystick to the right. The system would then change to the state show in FIG. 22B where the string " "John_' is shown as having been specified and the know continuations are presented as options for selection. The user would then select "Smith" by pushing the joystick up and thus complete their selection of "John Smith". The present invention has much broader application than just the example listed above, as well as a mobile phone, the present invention can be used to improve list selection on other devices including but not limited to personal computers, tablet PCs, PDAs, remote controls and small watch sized devices. Also, the present invention can be used to select an item from any list which is composed of items which can be built up as sequences of components. The list could be of any size from a handful of entries to a large database of thousands or even millions of entries A Second Exemplary Embodiment A partial word completion based music track selection function utilising a device in accordance with an embodiment of the present invention will now be described with reference to FIGS. 9A-9F. In this embodiment list selection is being provided through a 5-way joystick of a device. The on-screen menu shows 4 partial word completion options presented in a display with each of the four options being selectable by a movement of the joystick in the corresponding direction. This system also provides a "more" option through some other control means which may be a press "in" of the joystick. In addition the system may provide a "back" option by some other control means to allow the user to undo the last action(s). Movement of the joystick in the direction indicated in the menu selects that option. If the option is not visible and the "more" indicator shows " . . . ", then a click in of the joystick accesses the next most likely options. The example below simulates the selection of a particular song (in this case "Black or White" by Michael Jackson) from a library of approximately 1,000 songs. In FIGS. 9A-9F, the top zone shows the selection so far, the bottom zone shows the options that can be selected by joystick movements.

| Step | FIG. | Description |
| --- | --- | --- |
| 1. | FIG. 9A | This is the start of the selection with no part of the string entered yet (the top zone is empty) and the most likely 4 letters for the start of any song title (T, S, I and L) presented to be selected by a joystick movement in the corresponding direction. The letter we are looking for, "B" to start "Black or White", is not visible so we click the joystick in (the "more" function indicated by " . . . " in the middle menu position) to go to the next most likely four letters. |
| 2. | FIG. 9B | The desired letter "B" is visible so we move the joystick right to select it. |
| 3. | FIG. 9C | Note the selection so far ("B") appears in the top zone. We now select "l" by moving the joystick down. |
| 4. | FIG. 9D | We then select "a" by moving the joystick up. Note: The " . . . " symbol at the end of string options may be used to indicate that the string option extends past the limit of screen component it is displayed in. |
| 5. | FIG. 9E | We then complete the selection by moving the joystick up to append "ck Or White". Note: The ">>" symbol indicates that that string option finishes a selection. |

| Step | FIG. | Description |
|---|---|---|
| 6. | FIG. 9F | We have selected the song in 5 clicks. The application may then play the song or allow the user to perform other operations on it such as delete it from the library, add it to a play list, etc. |

A Third Exemplary Embodiment

Figure 29:
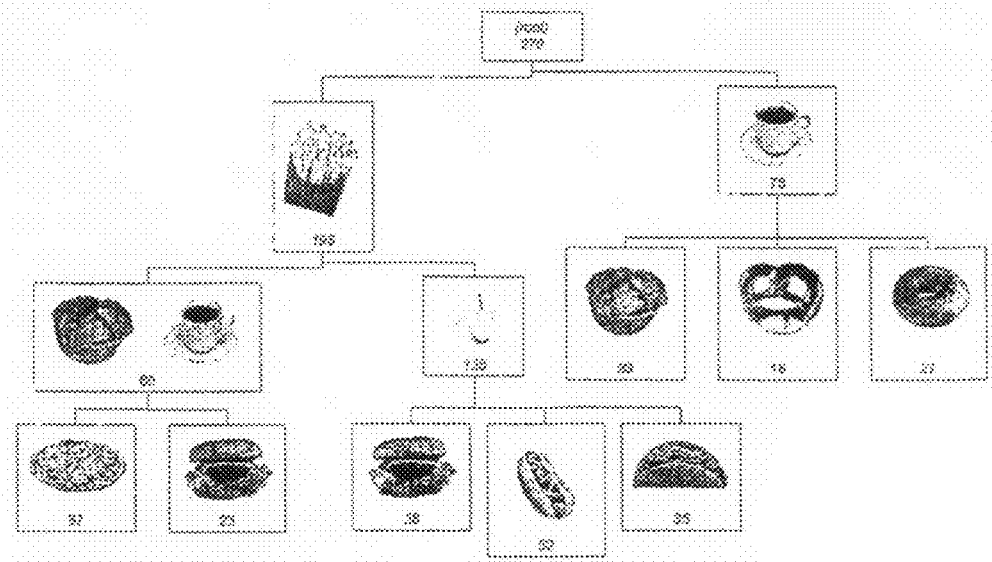
FIG. 29 is a possible tree structure for fast food items in the above table in accordance with an embodiment of the present invention.

Referring to FIG. 28 to FIG. 30C, a fast food system may have a list of meal options which are composed of a sequence of food items which are represented as images. FIG. 28 illustrates a possible list of such items (meals)—one per row. Each meal has a name, one or more graphical elements in sequence corresponding to meal components and a relative popularity figure reflecting the average number of times that the meal is ordered in a day and hence an approximation of the likelihood of that meal being ordered at any time. From the above list a partial word completion based tree structure can be built as described above except in this case, instead of each node containing a string of characters, each node contains a sequence of one or more graphical elements corresponding to images. Each node is also assigned a priority value which is based on the popularity figure for that meal. FIG. 29 illustrates how the tree structure may look based on the aforementioned list of items. Based on the structure in FIG. 29, standard partial word completion based processing can be applied except now the interface is providing the ability to select sequences of images rather than strings of characters. A joystick based Partial Word Completion based list selection system could then be implemented to make a selection from this data with menu options in four directions corresponding to movements of the joystick in those directions and a click in of the joystick indicating "more".

Figure 30A:
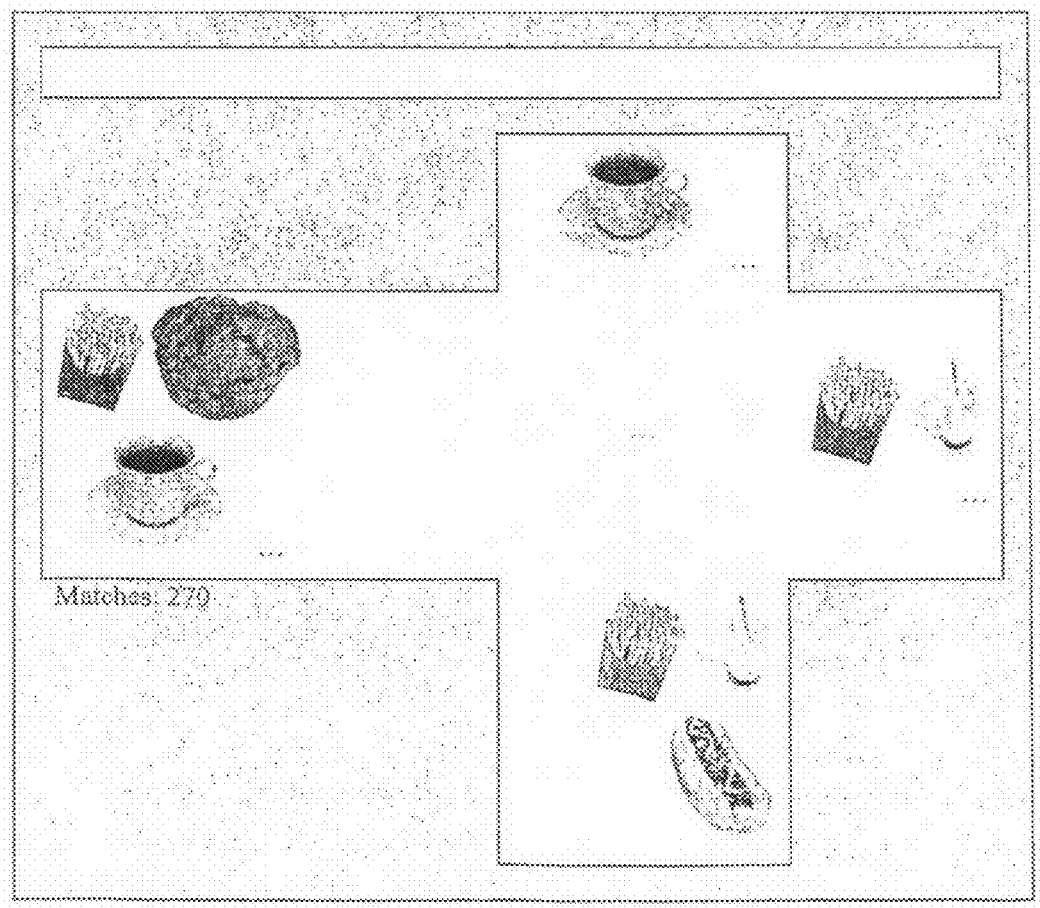
FIGS. 30A-30C show a menu sequence of joystick based Partial Word Completion menus to select a "Burger snack" through images in accordance with an embodiment of the present invention.
Figure 30B:
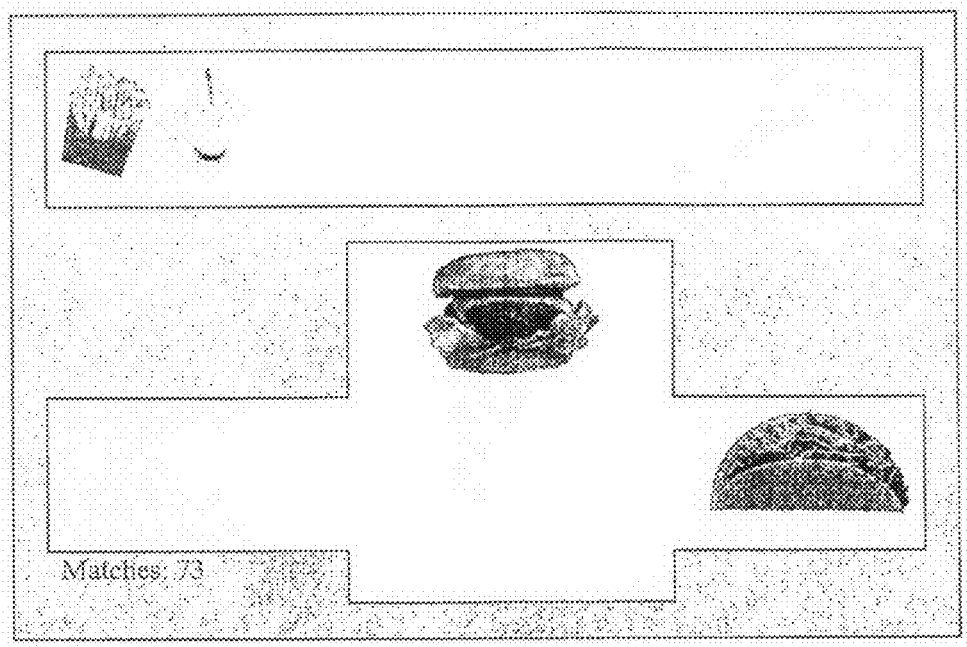
Figure 30C:
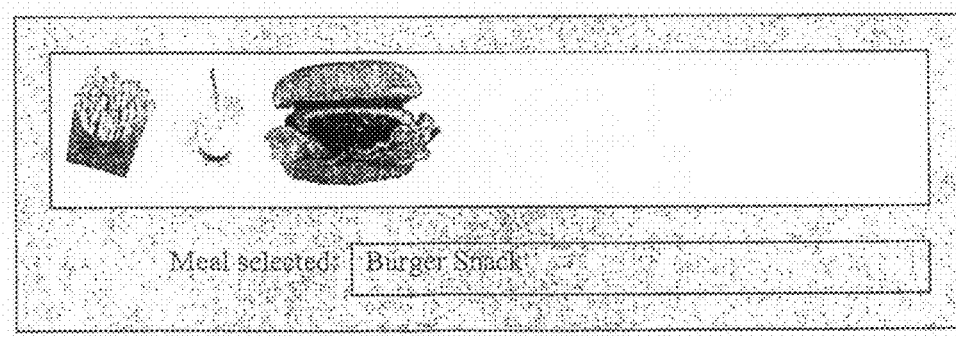

FIGS. 30A-30C illustrate how the menus may look on such a system in the process of selecting a "Burger snack" through graphical imagery. The menus present options in four directions to be selected by corresponding movements of a joystick in those directions. A press in of the joystick indicates that none of the presented options matches the desired selection. FIG. 30A could be the opening menu with the four most likely starts to a meal sequence. As "Burger snack" starts with fries and a drink (but not a hotdog) the user would press the joystick to the right to select the item on the right of the menu. This could then lead to the menu in FIG. 30B. In FIG. 30B the "entry so far" is fries and a drink. The user is presented with options to complete the meal with either a burger (up) or taco (left). The user would push the joystick up to select the burger which would complete the selection as shown in FIG. 30C.

The above example describes selection of items from the start of their sequence to the end, Partial Word Completion based list selection is not limited to this mode of selection as the system may provide selection based on keywords or other equivalents. However in this case, rather than words, the selection may be based on sequences of one or more components (whether they are images, sounds, etc) making up the identifier of each item. Referring to the example list of items in FIG. 18, the user could have selected their "Burger snack" via a keyword based list selection system as described herein by first selecting a burger image (which would narrow the search to two items ("Burger snack" and "Burger meal") and then selecting a drink image which would uniquely identify "Burger snack".

Other exemplary applications where items are made up of a sequence of components could include: music notes: select a song by inputting the music score; chess moves: recall past games or research tactics by selecting games based on moves made; choreography steps: recall dances by selecting based on sequences of movements; DNA sequence: choose an individual's DNA by selecting their gene sequence; Tones: select a song by choosing the tones in sequence that make up the song; or sign language: an on screen display could have animations of sign language words to select from to make up a sentence.

A Fourth Exemplary Embodiment

Figure 31A:
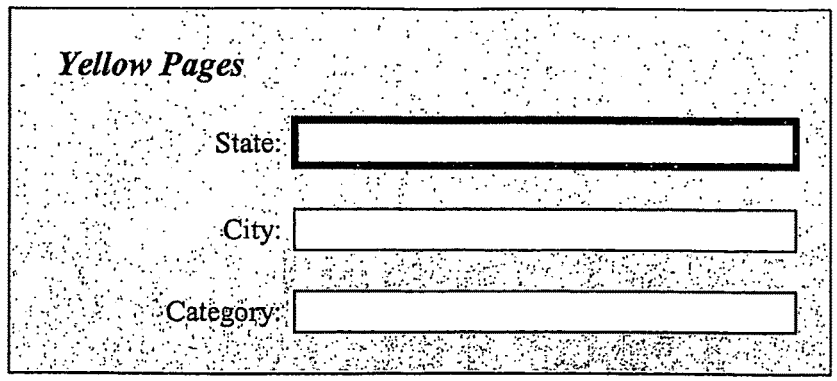
FIGS. 31A-33H illustrate an exemplary system for looking up Yellow Pages categories in accordance with an embodiment of the present invention.
Figure 31B:
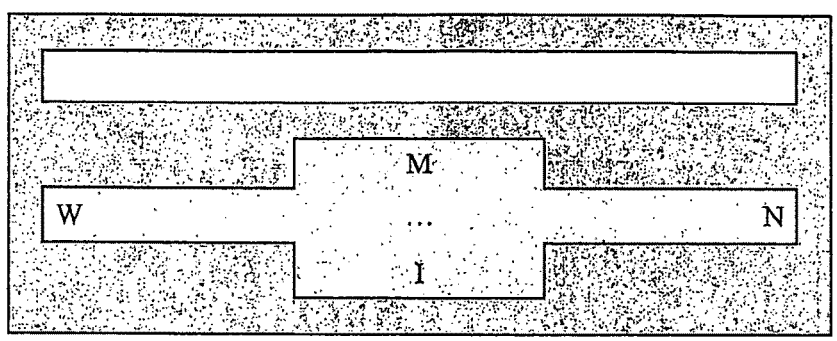
Figure 31C:
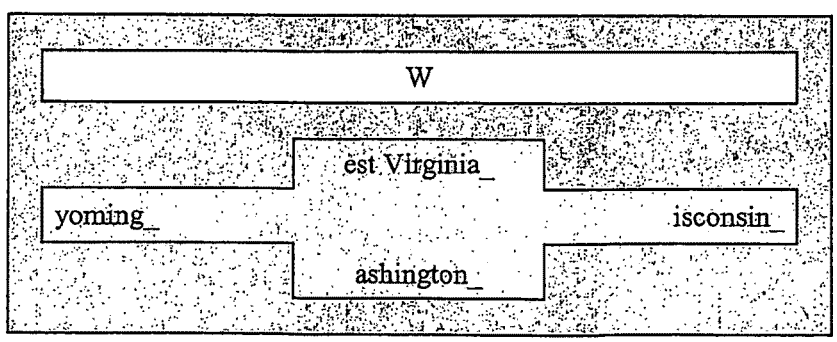
Figure 31D:
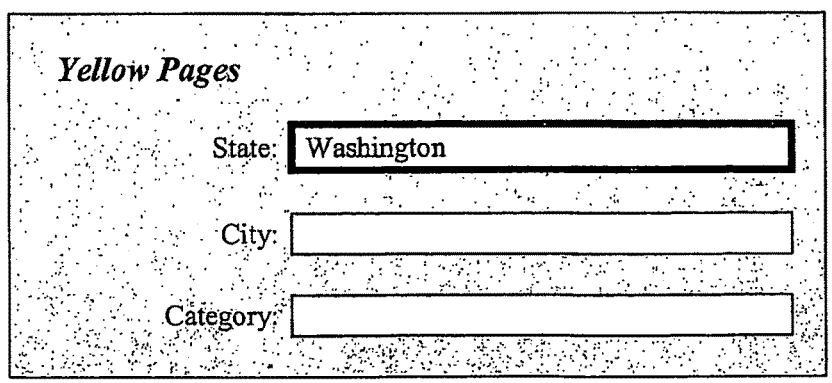

In this exemplary embodiment, the user wishes to find a Chiropractor in the Seattle (Washington) area. The user will use a "Yellow Pages" provider which allows one to retrieve a list of companies based on their location and category of business. The user will access the "Yellow Pages" service via the web browser on their mobile phone. The Yellow Pages provider has set up a web based front end to their service which is tailored to devices with limited interface and uses partial word completion based list selection to allow the user to select a US state, a city within that state and a business category. Given this information the Yellow Pages provider then responds with a list of businesses matching those criteria. In this case the interface component is running as code (possibly Java, JavaScript or AJAX) within the phone browser, taking and relaying user inputs to the engine component and displaying options that the engine component responds with. The engine component resides on an online server. The interface component running in the web browser of the mobile phone is communicating with the engine component using IP (Internet Protocol) communications over the wide area wireless connection of the phone to a base station and then via the wired connections of the mobile phone service provider and the general Internet to the server running the engine component. The sequence of selecting a state is illustrated in FIGS. 31A-31D:

| Step | FIG. | Description |
|---|---|---|
| 1. | FIG. 31A | This is the opening screen of the system with the fields for State, City and Category empty and needing specifying. The user highlights the "State" field and clicks on it to initiate partial word completion based selection. |
| 2. | FIG. 31B | This is the opening options menu for the partial word completion system providing selection of one of the 50 states of the United States. The most likely 4 letters to start the selection process are presented ("M", "N", "T" and "W"). The user selects "W" by pressing the joystick left. |
| 3. | FIG. 31C | Now "W" has been entered and the most likely continuations of the state name are presented. The user presses the joystick down to complete the selection of the state "Washington" |
| 4. | FIG. 31D | The selection of the state is complete and the value has been entered into the appropriate field. |

Figure 32A:
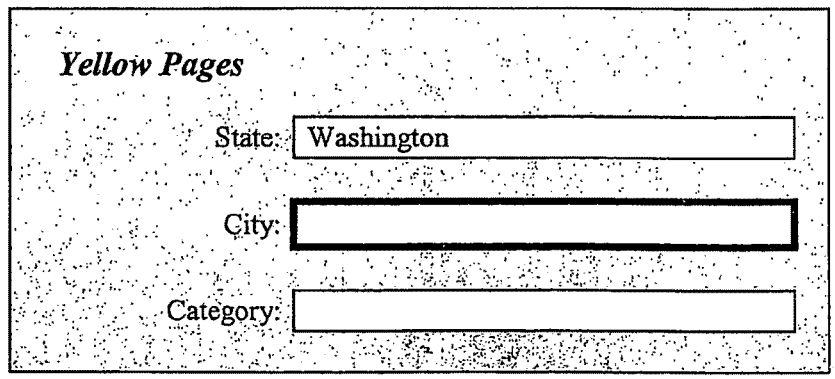

Next the user specifies the city "Seattle":

| Step | FIG. | Description |
|---|---|---|
| 1. | FIG. 32A | The user now navigates to the "City" field (or the system may have automatically selected it for them) and they click in to initiate the selection process. |

-continued

Figure 32B:
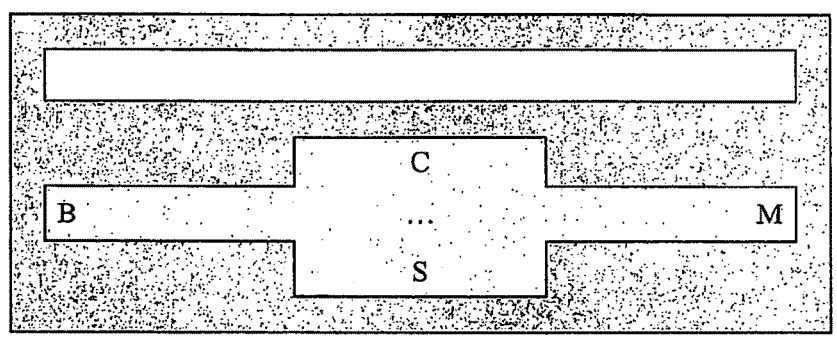
Figure 32C:
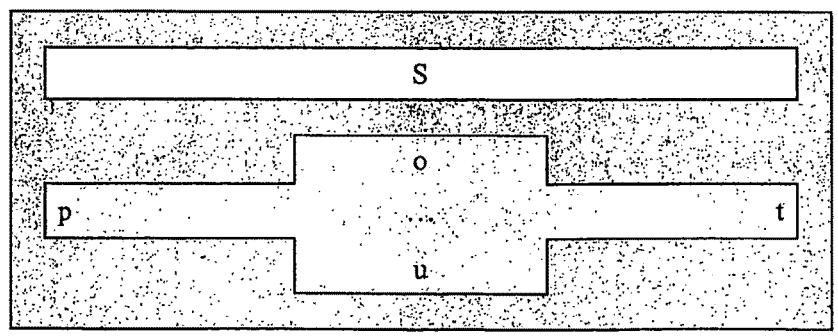
Figure 32D:
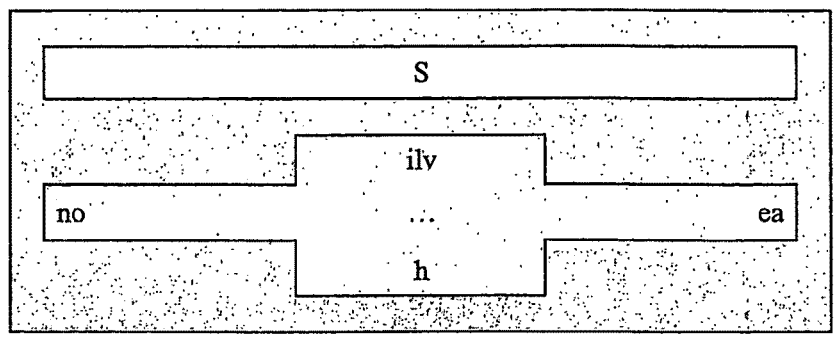
Figure 32E:
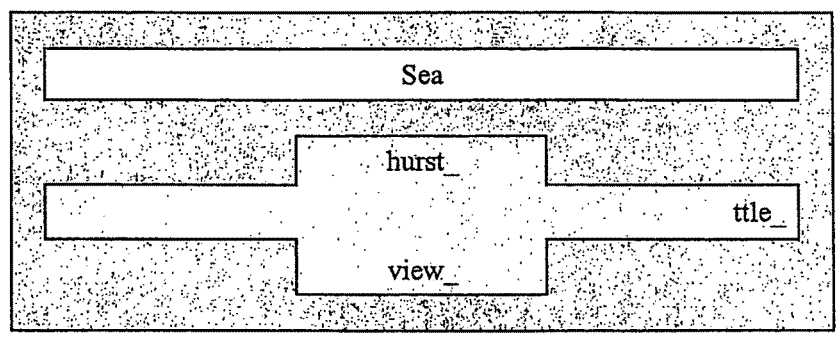
Figure 32F:
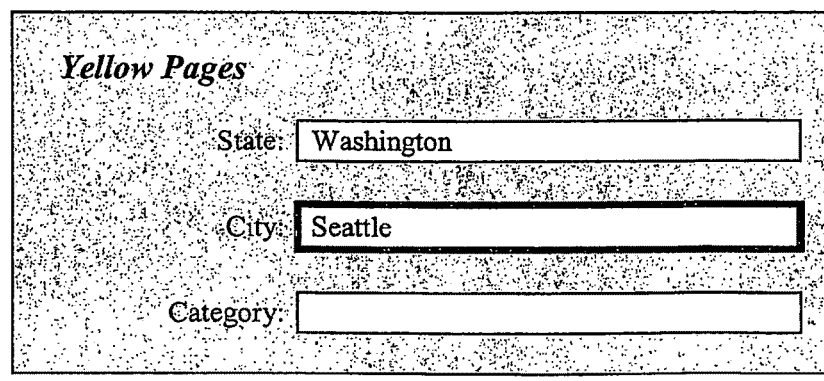

| Step | FIG. | Description |
|------|------|-------------|
| 2. | FIG. 32B | The system is now presenting partial word completion based selection of all the cities in Washington state. In this case the cities are prioritized by population so larger cities get priority over smaller ones on the assumption that they are more likely to be the desired selection. The most likely four letters are presented and the user selects "S" by pressing the joystick down. |
| 3. | FIG. 32C | In this menu "S" has been entered. The "e" needed to continue the selection is not there so the user clicks the joystick in to activate the "more" option to be presented with the next most likely letters. |
| 4. | FIG. 32D | The user is now able to push the joystick to the right and select "ea" to continue the selection. |
| 5. | FIG. 32E | The user now pushes the joystick to the right to complete the selection of "Seattle". |
| 6. | FIG. 32F | The selection of the city is complete and the value has been entered into the appropriate field. |

Figure 33A:
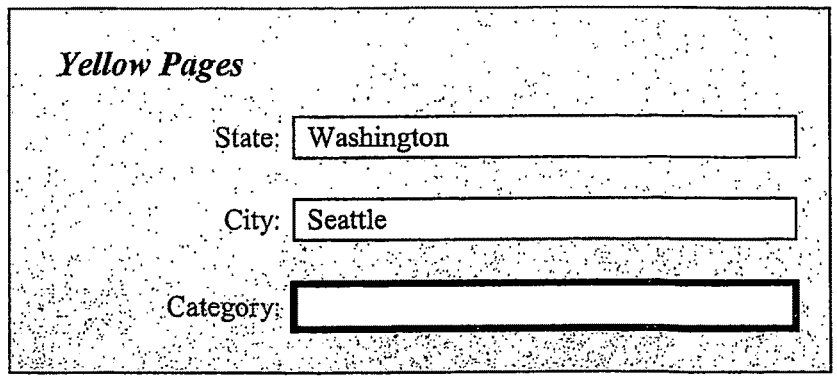
Figure 33B:
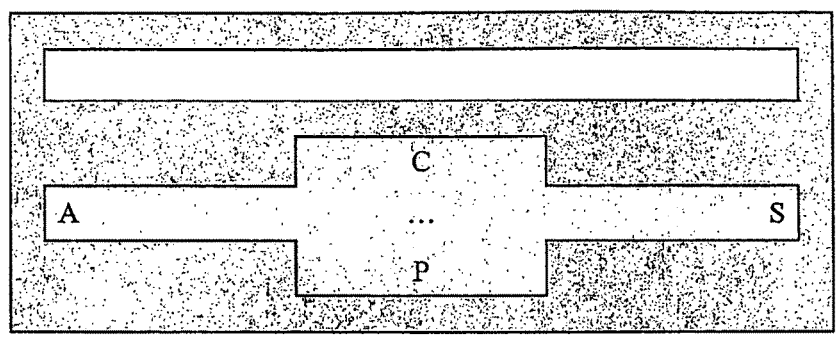
Figure 33C:
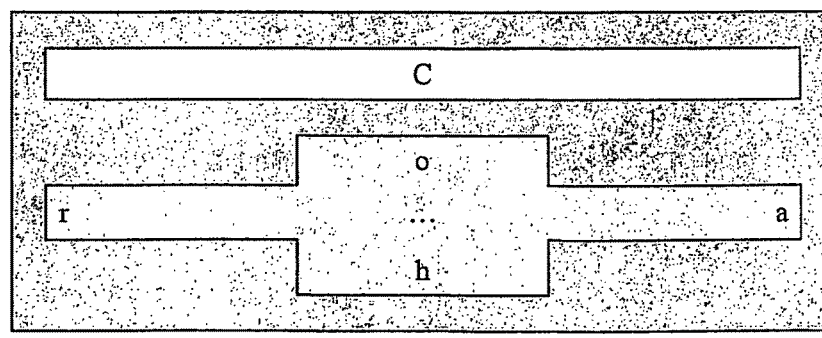
Figure 33D:
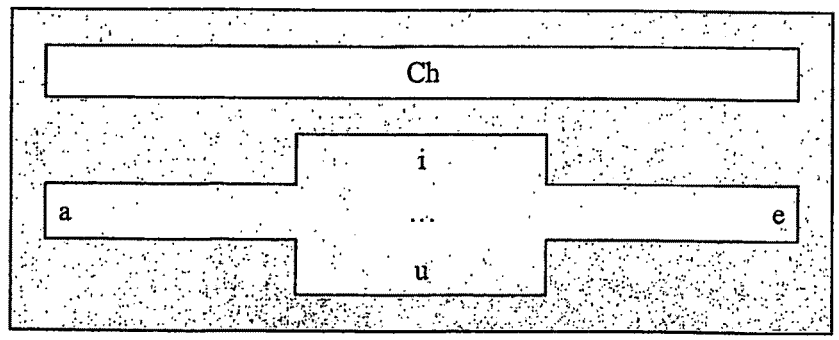
Figure 33E:
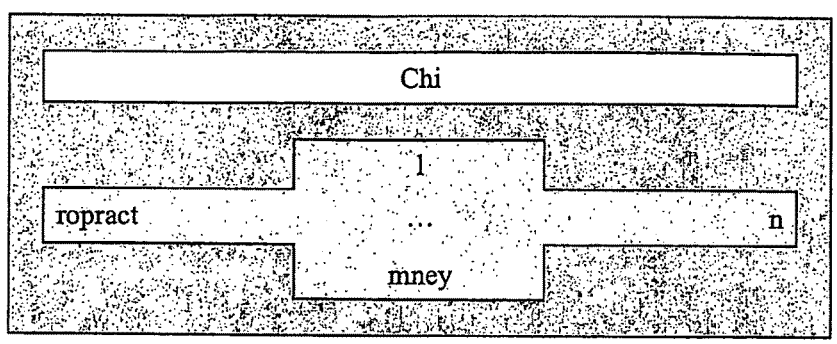
Figure 33F:
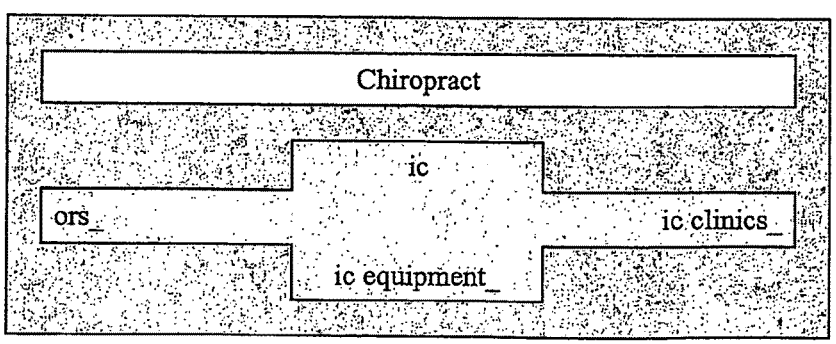
Figure 33G:
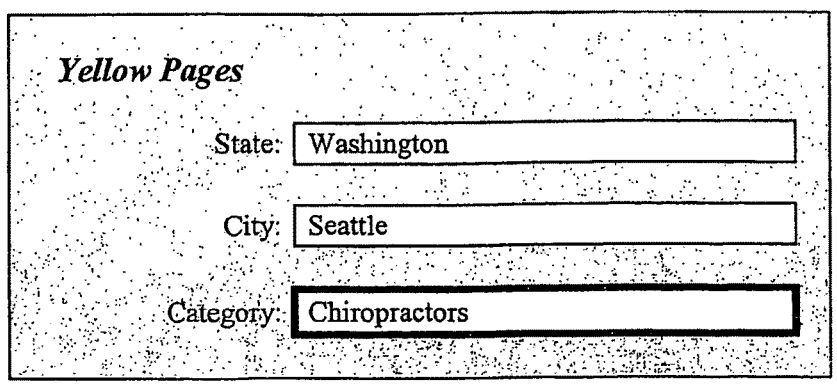
Figure 33H:
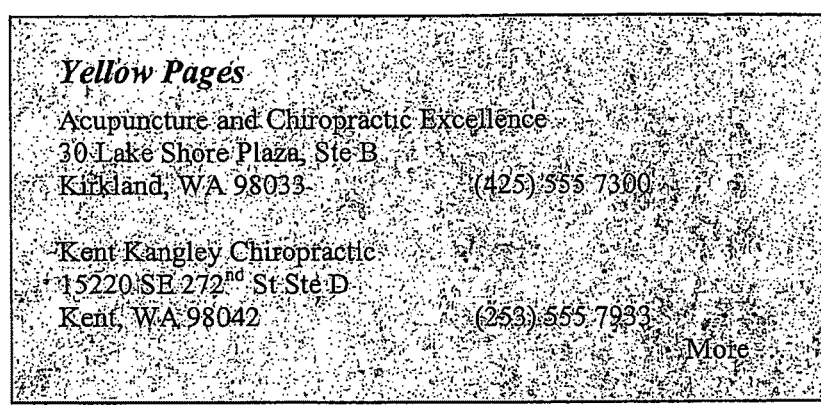

Next the user specifies the category of business they are looking for, in this example: "chiropractor":

| Step | FIG. | Description |
|------|------|-------------|
| 1. | FIG. 33A | The user now navigates to the "Category" field (or the system may have automatically selected it for them) and they click in to initiate the selection process. |
| 2. | FIG. 33B | The system is now providing partial word completion based selection of a Yellow Pages category out of a list of 8,747 values. The user presses the joystick up to select "C" and start the process of specifying "chiropractor". |
| 3. | FIG. 33C | The user then selects "h" (down) |
| 4. | FIG. 33D | The user then selects "i" (up) |
| 5. | FIG. 33E | The user then selects "ropract" (left) |
| 6. | FIG. 33F | The user then completes the selection by pressing the joystick left to select "ors" and complete the selection "chiropractors". |
| 7. | FIG. 33G | The selection of the category is complete and the value has been entered into the appropriate field. |
| 8. | FIG. 33H | The system then refers to its database and returns a list of the chiropractors in Seattle for the user to scroll through and choose from. |

In this example, the literal text of the category was "chiropractors" rather than "chiropractor". This was not an issue with the partial word completion based system as the actual value is immediately apparent to the user and no more effort to enter. In a system that required a search term to be typed in it is possible such a minor discrepancy could have result in a "zero results found" error. This example demonstrates several exemplary applications of partial word completion based list selection. For example, selection of geographic data. In this case a user narrowed down a selection of a particular US city in 6 clicks of the joystick. Similar processes can be used for other services or devices that need selection of geographic data such as navigation systems which can benefit from partial word completion based list selection applied to selection of city, street name, building name, etc. Additional applications include a remote engine component. The system had the partial word completion logic and data being carried out at a remote server allowing it to make use of the greater storage, security and processing power of this system. A further application includes selection from a finite list. In this case a list of 8,747 Yellow Pages categories. This same mechanism can be used to select from larger or smaller lists of items, some example lists to be selected from may include category of item, manufacturer or model of an item in an auction site, genre of music from a music library, movie category, food preference, job category, etc.

A Fifth Exemplary Embodiment

The above example shows selection from a list which is maintained online over some communications means. Such lists can range in size from small to very large but generally the selection process can be narrowed to one item, for instance a system which provided phone book look up for residents in the United States would have over 100 million items but with the search refined sufficiently will result in one individual as the desired result. Some alternative search processes generally do not result in a single item as an outcome, an example of this is general Internet search engines such as Google. In this case the user enters one or more search terms which could be words or phrases and the search engine responds with a list of items that it has determined are the most likely to relate to the concepts the user is searching for. The current example illustrates how such an operation may look based on partial word completion.

Figure 34A:
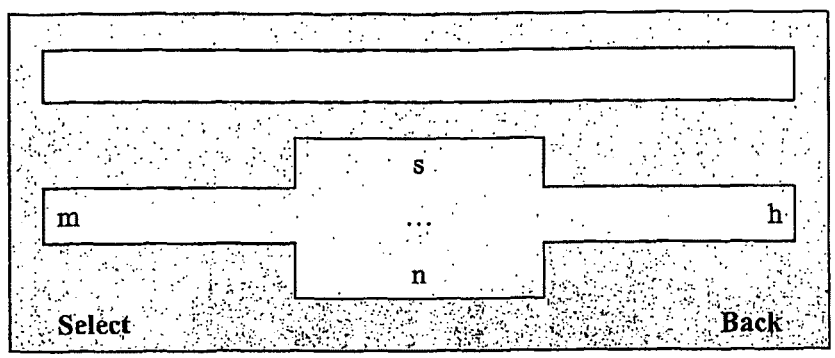
FIGS. 34A-34J illustrates an exemplary system for performing a general Internet search using keywords in accordance with an embodiment of the present invention.
Figure 34B:
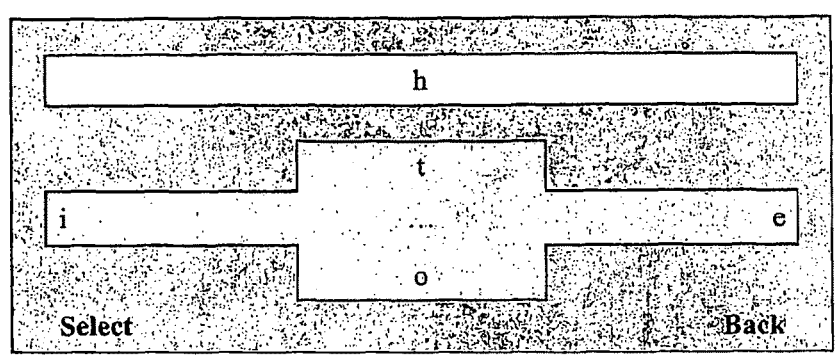
Figure 34C:
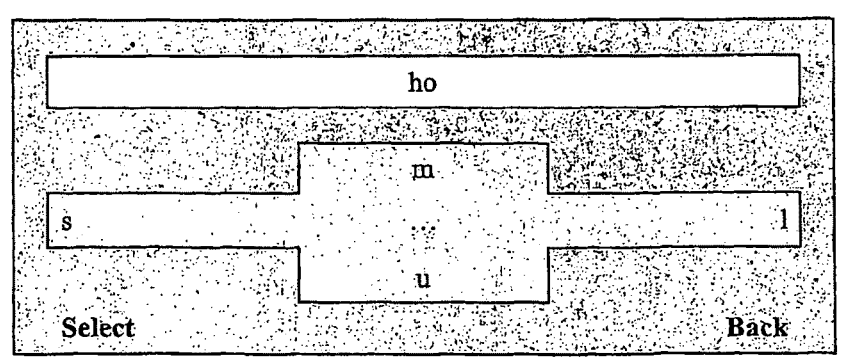
Figure 34D:
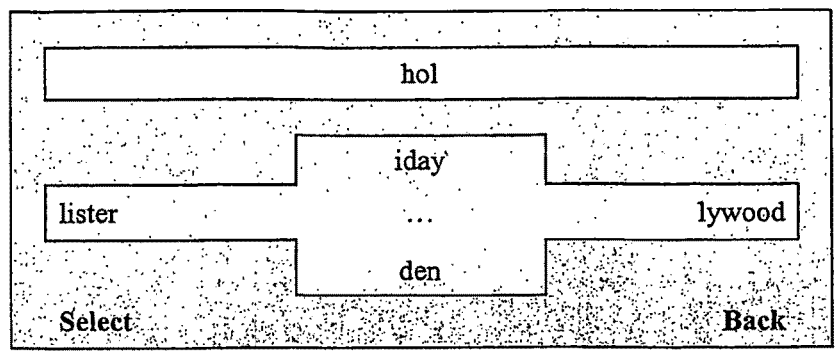
Figure 34E:
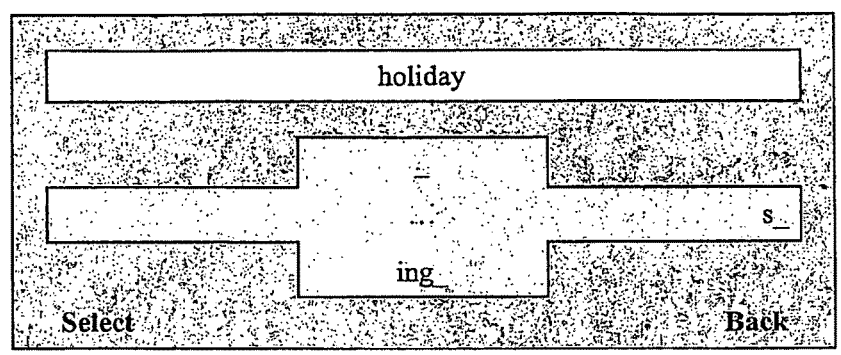
Figure 34F:
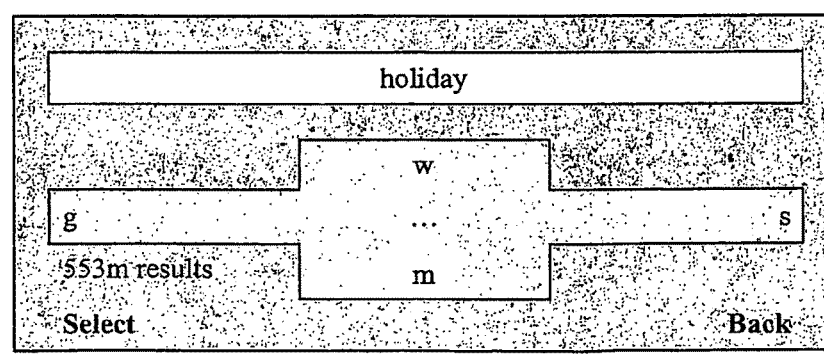
Figure 34G:
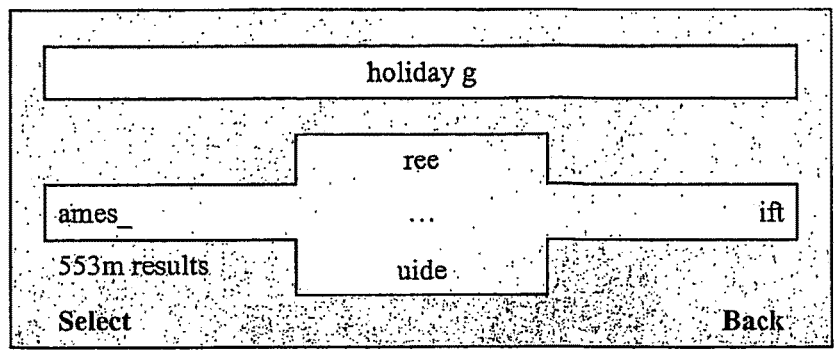
Figure 34H:
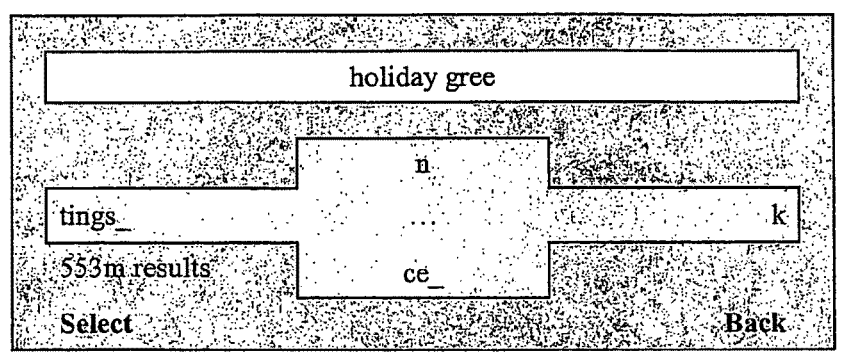
Figure 34I:
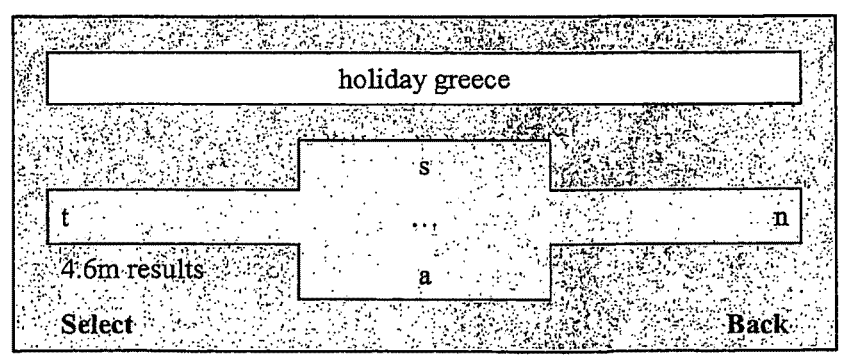
Figure 34J:
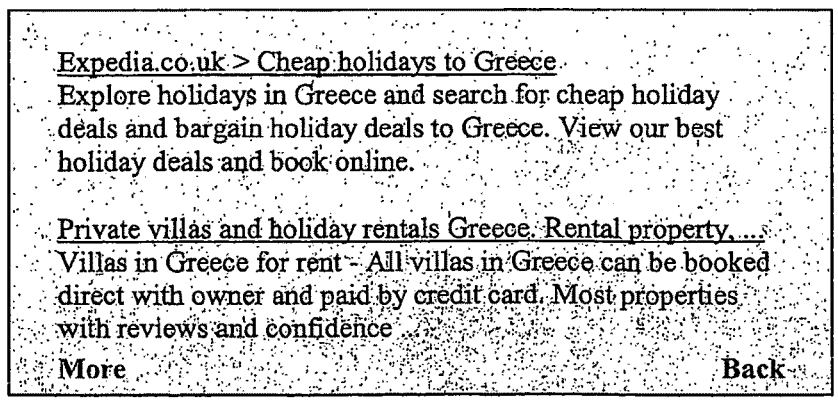

In this example the user wants to find information on holidays in Greece. For this search the two main concepts which the user will use as keywords are "holiday" and "Greece" and the search system should respond with any results which match these two keywords. The sequence of performing the search is illustrated in FIGS. 34A-34I which are described below:

| Step | FIG. | Description |
|------|------|-------------|
| 1. | FIG. 34A | This is the opening screen with nothing entered so far and the four most likely start strings for a keyword search ("s", "h", "n" and "m") presented in the menu. The user presses the joystick right to select "h" to start entry of the first keyword "holiday" |
| 2. | FIG. 34B | The user now presses the joystick down to select "o" |
| 3. | FIG. 34C | The user now selects "l" (right) |
| 4. | FIG. 34D | The user completes the word "holiday" by selecting "iday" (up on the joystick). |
| 5. | FIG. 34E | The user selects "_" to indicate that that is the end of that keyword (as opposed to continuing to enter "holidays" for instance). |
| 6. | FIG. 34F | The first keyword "holiday" has been completed and the system now reports that this will result in 533 m results. The user will now continue to refine the selection by entering the keyword "Greece". The four options presented now are different to those in FIG. 34a as this is now based on the most likely four strings to start a keyword based on all entries with "holiday" as keywords. The user selects "g" (a press of the joystick left) to start the entry of "Greece". |
| 7. | FIG. 34G | The user now selects "ree" (up) |
| 8. | FIG. 34H and I | The user now selects "ce_" (down) to complete the entry of the second keyword "Greece". The system now reports that there are 4.6 m items that match the current query (have both keywords "holiday" and "greece"). At this point the user opts to see the results rather than carry on to enter more keywords. This is indicated through the press of the left function key marked "Select". |
| 9. | FIG. 34J | The search system presents the results in a list with the best matches first. The user can now scan through the results and view the one(s) that have the desired information in them. |

Additional Exemplary Embodiments

Several devices can make use of partial word completion based list selection and may have applications associated with the device that would especially benefit from partial word completion based list selection. Mobile phones—Mobile phones can have a large number of functions and settings as well as media such as images, videos and audio tracks as well as potentially a large range of other selectable items. Access to these can prove complex whether the interface is through a joystick mechanism, wheel, side keys or touch screen. The present invention could provide a major improvement in speed and ease of selecting these items. In addition, if the device was able to communicate to a network based server which had compatible content available, the Partial Word Completion based selection system could include this content in the dictionaries included in the selection process allowing the user rapid access to this content for streaming, downloading, purchase, etc. These selections could be provided within the same option tree as local item access or as a separate selection process.

Digital cameras—The operation of digital cameras has become increasingly advanced and complex and so has the resultant menu structure. Whilst this structure can be navigated using the 5-way control this is often complex as the desired function can be many levels down in the tree, and it may not be immediately apparent the correct location of the desired function which can result in traversing several branches of the tree in search of the desired function. The present invention could streamline access to the device's functions and settings as well as streamline finding of content on the device. The latter case would be possible if the image content of the camera had textual descriptive data associated with it.

Digital video cameras—Digital video cameras can have a large number of functions and settings and access to them can prove complex whether the interface is through a joystick mechanism, wheel or touch screen. The present invention could streamline access to the functions and settings as well as streamline finding of content on the device. The latter case would be possible if the video content of the camera had textual descriptive data associated with the video recordings and/or sections of the video recordings.

Music players—Music players would benefit greatly from having a Partial Word Completion based selection system to provide rapid access to not only the device functions but also rapid access to the media content stored on the device. Music tracks are often categorised by artist, album, genre, title, etc. Each track on the device could be indexed by one, many or all of the available categorisations such that a selection could be made on any of these bases. For example, the user could first select an artist from the Partial Word Completion based selection system, this may result in multiple results which the user could then perform further Partial Word Completion based selection of based on the title of the track. Assuming this would be sufficient to establish a unique item, that item could then be selected and the invocation action for it may be to start the track playing. In addition, if the device was able to communicate to a network based server which had compatible content available, the Partial Word Completion based selection system could include this content in the dictionaries included in the selection process allowing the user rapid access to this content for streaming, downloading, purchase, etc. These selections could be provided within the same option tree as local item access or as a separate selection process.

Handheld games systems—Handheld games systems could benefit from the improved access to the device's functions and settings as they can have a complex array of operations available and limited means to specify a selection of an item. The device may have multiple games available to it as well as media and other items so the selection of these could be incorporated into the Partial Word Completion based selection system. In addition, if the device was able to communicate to a network based server which had compatible content available, the Partial Word Completion based selection system could include this content in the dictionaries included in the selection process allowing the user rapid access to this content for streaming, downloading, purchase, etc. These selections could be provided within the same option tree as local item access or as a separate selection process. Also, with the burgeoning market for online games, there are various times when partaking in these that the user may feel the need to select items, other users, game information, game functions, online character possessions, etc. These sorts of activities could benefit from Partial Word Completion based selection as either part of a single system for the whole device or a separate selection system for the online game activities.

Portable video players—Portable video players could benefit from the improved access to the device's functions and settings as they can have a complex array of operations available and limited means to specify a selection of an item. It could also benefit from rapid access to the media content stored on the device. Video recordings are often categorised by genre, title, actors, director, etc. Each video on the device could be indexed by one, many or all of the available categorisations such that a selection could be made on any of these bases. In addition, if the device was able to communicate to a network based server which had compatible content available, the Partial Word Completion based selection system could include this content in the dictionaries included in the selection process allowing the user rapid access to this content for streaming, downloading, purchase, etc. These selections could be provided within the same option tree as local item access or as a separate selection process.

Navigation systems—Navigation systems could benefit from the improved access to the device's functions and settings as they can have a complex array of operations available and limited means to specify a selection of an item. In addition, navigation systems require input of geographical information such as town, suburb, street, etc. in order to determine the location to navigate from or to. These items could be indexed in the Partial Word Completion based selection system. In addition, if the device was able to communicate to a network based server which had compatible content available, the Partial Word Completion based selection system could include this content in the dictionaries included in the selection process allowing the user rapid access to this content for navigation operations. These selections could be provided within the same option tree as local item access or as a separate selection process.

Auxiliary display—An auxiliary display on a laptop or similar computing device could benefit from the improved access to the device's functions and settings as they can have a complex array of operations available and limited means to specify a selection of an item. As auxiliary displays may provide access to some or all of the information present on a laptop computer this can result in an extremely broad array of functions and content (such as address book information, calendar information, etc.) all of which has to be selected via the screen and joystick of the auxiliary display. Thus a Partial Word Completion based selection system may vastly improve the efficiency of such operations.

"Lounge room" media devices—"Lounge room" media devices could benefit from the improved access to the device's functions and settings as they can have a complex array of operations available and limited means to specify a selection of an item. A "lounge room" media device may not only have a complex set of functions available but also a large array of local and online media to be selected for managing, playing, etc. And often these activities have to be carried out with an input device as limited as a standard TV style remote control. Thus a Partial Word Completion based selection system may vastly improve the efficiency of such operations. In addition, if the device was able to communicate to a network based server which had compatible content available, the Partial Word Completion based selection system could include this content in the dictionaries included in the selection process allowing the user rapid access to this content for streaming, downloading, purchase, etc. These selections could be provided within the same option tree as local item access or as a separate selection process.

Games consoles—Games consoles could benefit from the improved access to the device's functions and settings as they can have a complex array of operations available and limited means to specify a selection of an item. The device may have multiple games available to it as well as media and other items so the selection of these could be incorporated into the Partial Word Completion based selection system. In addition, if the device was able to communicate to a network based server which had compatible content available, the Partial Word Completion based selection system could include this content in the dictionaries included in the selection process allowing the user rapid access to this content for streaming, downloading, purchase, etc. These selections could be provided within the same option tree as local item access or as a separate selection process. Also, with the burgeoning market for online games, there are various times when partaking in these that the user may feel the need to select items, other users, game information, game functions, online character possessions, etc. These sorts of activities could benefit from Partial Word Completion based selection as either part of a single system for the whole device or a separate selection system for the online game activities.

Watch phone/PDAs—These wrist sized devices have particular issues with allowing selection of any options as the room available for input mechanisms is very limited. As such providing rapid access to all functions, settings, content, etc. on such a device purely through a joystick or some similar small limited means through use of the present invention could be extremely beneficial.

Eye level screen plus joystick—These "wearable" devices benefit greatly from limiting input to a joystick because that means that the user is able to maintain their gaze on the projected screen as a feedback mechanism. A common alternative would be input through a keypad or keyboard generally mounted on a sleeve or otherwise made accessible but this mode of input generally necessitates repeatedly redirecting ones gaze between the eye level screen and the input keypad and keyboard. With a Partial Word Completion based selection system the user would be provided a mechanism for accessing all function, settings, content, etc of the device whilst being able to maintain their gaze on the screen and a head up attitude to take in the environment around them.

Car system controllers (e.g. BMW iDrive)—In this case the Partial Word Completion based selection system could give access to all car functions through a single joystick/screen interface. As cars become more advanced, computerised and complex with various settings (such as cruise, sport, etc.) as well as inbuilt communication, entertainment and navigation systems—a Partial Word Completion based interface could make access to such functions more easy as well as potentially more safe for the operator.

Printers with screen and joystick for running menus—Modern printers can have many functions and settings which generally have to be navigated through as a hierarchical tree, in addition they may need to select media such as images from local or removable storage (such as a memory card or digital camera attached by cable)—a Partial Word Completion based selection system could streamline this process.

Communications system for disabled—As described in the summary of the invention there are many device which currently have multiple items selectable by the user and access to these is often through hierarchical menu and/or text based search. Also, as described these have many disadvantages involving complexity and inefficiency. These disadvantages can be greatly increased for people with disabilities as input actions can be very challenging for them so having to perform excess actions to make a selection is a severe impediment. The present invention's characteristics of providing rapid, efficient selection of any of a devices items through just a simple means such as a joystick could revolutionise access of such devices to the disabled population.

Heads-up display—A Partial Word Completion based list selection mechanism presented on a heads-up display could provide rapid access to in-car, in-plane, etc. systems This may be especially beneficial in complex systems such as aviation navigation and avionics with large numbers of functions.

Personal Computer input devices—As mentioned in the Background to the invention, a Partial Word Completion based list selection system could provide rapid access to all selectable items (functions, settings, content, etc.) of a personal computer. Despite the fact that these devices generally have full sized keyboard, the present invention could still be extremely beneficial to the process of selecting these items due to the advantages listed in the Summary of the invention section.

Vending machines—A Partial Word Completion based item selection system could provide rapid access to functions for maintenance via the limited front panel interface of a vending machine. In addition it could also provide a customer a Partial Word Completion based selection mechanism to choose the item that they want to purchase.

PDAs—Personal Digital Assistants are generally small handheld devices with generally limited interfaces often consisting of a touch screen plus a small number of additional controls. Despite this the devices can have a large array of selectable items (functions, settings, applications, content, etc.) thus a Partial Word Completion item selection system could greatly streamline access to this large range of options.

Kiosks (e.g. information devices for finding shops in malls)—A Partial Word Completion based item selection system could provide access to maintenance functions through the simple touch screen interface in addition a Partial Word Completion based selection mechanism could be presented to the user of the system to allow them to select the item that they want information on, directions to, etc.

Tablet PCs, UM (Ultra Mobile) PCs—Tablet PCs and UMPCS are generally small handheld or laptop devices with generally limited interfaces often consisting of a touch screen plus a small number of additional controls. Despite this the devices can have a large array of selectable items (functions, settings, applications, content, etc.) thus a Partial Word Completion item selection system could greatly streamline access to this large range of options.

Personal Computers—PCs generally have large amounts of functions and content, partial word completion based list selection could assist in accessing such items through the use of the direction keys, function keys, a wireless remote control style device, games controllers, etc.

Store check-out systems—Store check-out systems can often have a touch screen interface or some other limited means. On this interface the operator may have to perform a large range of activities including selecting an item to be charged for as well as general administrative functions such as configuring the system and financial functions such as taking payment by credit card, etc. This wide range of disparate functions could be streamlined through the provision of a Partial Word Completion based interface to select these items.

Medical devices—Many medical devices have a large range of complex functions and settings as well as possibly requiring selection of other data such as patient and physician profiles. This wide range of disparate functions could be streamlined through the provision of a Partial Word Completion based interface to select these items.

ATMs—A Partial Word Completion based system providing direct access to maintenance functions of the system through simple side key interface could enhance the usability of the administrative activities as well as customer activities of the Automatic Teller Machines.

Side key based aircraft systems—A Partial Word Completion based list selection mechanism presented on side key based aircraft systems could provide rapid access to in-plane systems, this may be especially beneficial in complex systems such as aviation navigation and avionics with large numbers of functions.

Car system controllers (e.g. Mercedes Command)—A Partial Word Completion based list selection mechanism presented on side key based car system controller could provide rapid access to in-car systems.

Dynamic display keyboards—A dynamic display keyboard could be used to present the Partial Word Completion options as displays on dynamic display keys. This would provide the benefits of allowing for Partial Word Completion selection of items on a PC as previously discussed but with the added enhancement of having the options presented on a key rather than on the screen.

Gesture based interface—A gesture based interfaces implemented through motion sensors of some sort could allow the selection of items through bodily movements. This may be desirable if there is no more convenient means to provide input to the system, or alternatively the user may prefer this method as it is more fun and/or it may provide some form of physical activity to improve health, coordination, etc.

Floor pads used to select options (e.g. Dance Dance Revolution)—Similar to the gesture based interface, the options in the Partial Word Completion based item selection system could be selected through foot presses on floor pads or hand presses on pads reachable by hands or some other similar movements. This may be desirable if there is no more convenient means to provide input to the system, or alternatively the user may prefer this method as it is more fun and/or it may provide some form of physical activity to improve health, coordination, etc.

3-dimensional input devices—Options for the Partial Word Completion based item selection may also be selectable through some form of 3 dimensional selection device. The options would have to be presented on some form of output mechanism which would make it clear which 3D movement would select which items. And there would be a corresponding 3D selection mechanism that the user would manipulate to indicate their desired selection.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of selecting items from at least two collections of items, said at least two collections of items being individually indexed by a list of respective item identifiers, the method comprising:
generating, on a device, an initial display including a plurality of parts of said item identifiers for selection, wherein said plurality of parts of said item identifiers include at least one part of an item identifier corresponding to a first collection of items and at least one part of an item identifier corresponding to a second collection of items;
enabling selection of one of said plurality of parts of said item identifiers;
identifying, based at least in part on the part of the item identifier selected, which of the at least two collections of items the selected part of the item identifier corresponds to;
generating, on said device, a display of a further plurality of parts of said item identifiers for selection in response to selection of said one of said plurality of parts of said item identifiers, wherein said further plurality of parts of item identifiers include at least one further part of said item identifiers corresponding to the one or more collections of items identified based on the selection of said one of said plurality of parts of said item identifiers; and
enabling selection of one of said further plurality of parts of said item identifiers in order to add to said selected one of said plurality of parts of said item identifiers to build a larger part or whole of said selected item identifier;
wherein generating said initial display comprises selecting said one or more parts of said item identifiers to be displayed based on a dynamic prioritization scheme that adjusts priorities of said item identifiers based on the number of times a particular item identifier from said list of item identifiers was previously selected.

2. The method according to claim 1, further comprising: enabling selection of additional parts of said item identifiers until said item identifier is completed, and enabling selection of the item identifier to select the item.

3. The method according to claim 1, wherein said item identifiers includes a sequence of one or more text symbols and said plurality of parts of said item identifier is a subsequence of text symbols.

4. The method according to claim 3, wherein said item identifiers are each a text string.

5. The method according to claim 4, wherein said text string is a word.

6. The method according to claim 5, wherein at least one collection of items is a collection of words from at least one language.

7. The method according to claim 5, wherein at least one collection of items is a collection of songs.

8. The method according to claim 5, wherein at least one collection of items is a collection of contacts.

9. The method according to claim 1, wherein said item identifiers includes a graphical depiction.

10. The method according to claim 9, wherein at least one collection of items is a collection of selections from a menu.

11. The method according to claim 1, wherein said method is performed in a computing device and the computing device is a mobile telephone.

12. The method according to claim 1, wherein said method is performed in a computing device and the computing device is a PDA.

13. The method according to claim 1, wherein selection of the one or more parts is enabled by way of a joystick.

14. The method according to claim 13, wherein said joystick is a five-way joystick.

15. The method according to claim 1, wherein selection of the one or more parts is enabled by way of a touch screen.

16. The method according to claim 1, wherein selection of the one or more parts is enabled by way of programmable keys.

17. The method according to claim 1, wherein the method is performed on a computing device and at least one collection of items is stored on said computing device.

18. The method according to claim 1, wherein the method is performed on a computing device and at least one collection of items is stored on a remote device.

* * * * *

(12) EX PARTE REEXAMINATION CERTIFICATE (12614th)
United States Patent
Dinn

(10) Number: US 9,697,264 C1
(45) Certificate Issued: May 31, 2024

(54) PROCESS AND APPARATUS FOR SELECTING AN ITEM FROM A DATABASE

(75) Inventor: Kevin W. Dinn, St Ives (AU)

(73) Assignee: KANNUU PTY. LTD., Mount Kuring-Gai (AU)

Reexamination Request:
No. 90/014,759, May 28, 2021

Reexamination Certificate for:
Patent No.: 9,697,264
Issued: Jul. 4, 2017
Appl. No.: 12/448,601
PCT Filed: Dec. 28, 2007
PCT No.: PCT/AU2007/002010
§ 371 (c)(1),
(2), (4) Date: Feb. 22, 2010
PCT Pub. No.: WO2008/080192
PCT Pub. Date: Jul. 10, 2008

Related U.S. Application Data

(60) Provisional application No. 60/960,345, filed on Sep. 26, 2007, provisional application No. 60/878,083, filed on Jan. 3, 2007.

(51) Int. Cl.
*G06F 16/26* (2019.01)
*G06F 3/023* (2006.01)
*H04M 1/2745* (2020.01)
*H04M 1/2748* (2020.01)

(52) U.S. Cl.
CPC ............ *G06F 16/26* (2019.01); *G06F 3/0237* (2013.01); *H04M 1/2748* (2020.01)

(58) Field of Classification Search
None
See application file for complete search history.

(56) References Cited

To view the complete listing of prior art documents cited during the proceeding for Reexamination Control Number 90/014,759, please refer to the USPTO's Patent Electronic System.

*Primary Examiner* — Dennis G Bonshock

(57) ABSTRACT

A method and apparatus for selecting items from a collection of items are indexed by a list of item identifiers. The item identifiers may be in the form of text, symbols, graphics, etc. An initial display is generated which includes on or more parts of the item identifiers. Selection of the one or more parts may be made and results in the generation of a display of further one or more parts for selection. The further one or more parts may be selected in order to the selected on or more parts to build a larger part or whole of an item identifier. Accordingly, selection from a large list of item identifiers may be carried out in a relatively short time period.

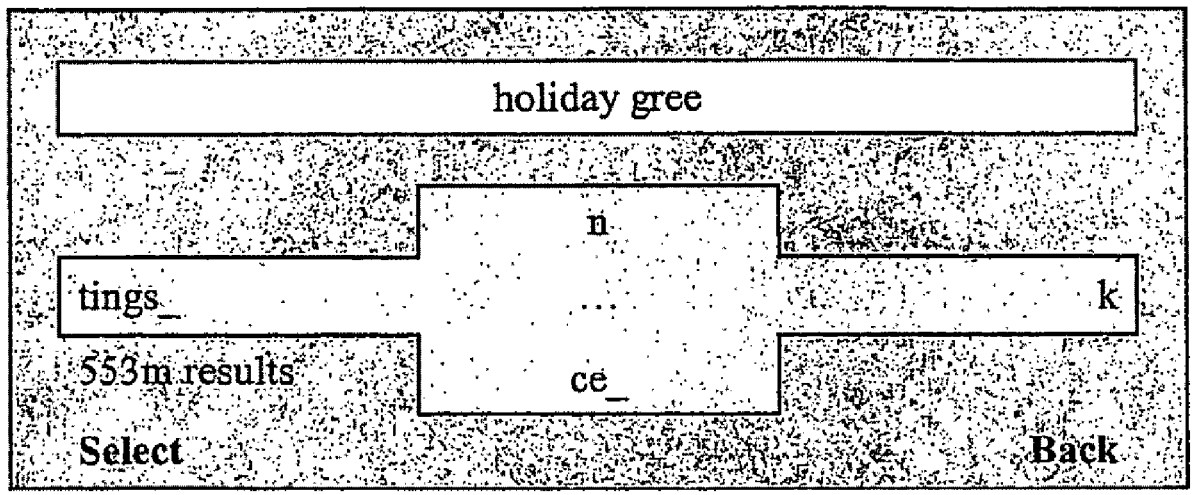

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-18 are cancelled.

\* \* \* \* \*